US007844908B2

(12) United States Patent (10) Patent No.: US 7,844,908 B2
Kodosky et al. (45) Date of Patent: Nov. 30, 2010

(54) DIAGRAM THAT VISUALLY INDICATES TARGETED EXECUTION

(75) Inventors: Jeffrey L. Kodosky, Austin, TX (US);
David W Fuller, III, Austin, TX (US);
Timothy J. Hayles, Austin, TX (US);
Jeffrey N. Correll, Cedar Park, TX (US); John R. Breyer, Austin, TX (US);
Jacob Kornerup, Austin, TX (US);
Darshan K. Shah, Austin, TX (US);
Aljosa Vrancic, Austin, TX (US)

(73) Assignee: National Instruments Corporation, Austin, TX (US)

( * ) Notice: Subject to any disclaimer, the term of this patent is extended or adjusted under 35 U.S.C. 154(b) by 710 days.

(21) Appl. No.: 11/776,196

(22) Filed: Jul. 11, 2007

(65) Prior Publication Data

US 2008/0034310 A1 Feb. 7, 2008

Related U.S. Application Data

(60) Provisional application No. 60/942,834, filed on Jun. 8, 2007, provisional application No. 60/869,221, filed on Dec. 8, 2006, provisional application No. 60/821,512, filed on Aug. 4, 2006.

(51) Int. Cl.
*G06F 13/00* (2006.01)
*G06F 15/00* (2006.01)
(52) U.S. Cl. ...................................... 715/762; 715/771
(58) Field of Classification Search .................. 715/736, 715/864, 125, 781, 763–765, 769–771; 717/105, 717/109
See application file for complete search history.

(56) References Cited

U.S. PATENT DOCUMENTS 5,237,691 A 8/1993 Robinson et al.

| | | | |
|---|---|---|---|
| 6,173,438 B1 | 1/2001 | Kodosky et al. | |
| 6,219,628 B1 | 4/2001 | Kodosky et al. | |
| 6,526,566 B1* | 2/2003 | Austin | 717/109 |
| 6,629,123 B1 | 9/2003 | Hunt | |
| 6,876,368 B2 | 4/2005 | Dove et al. | |
| 7,028,222 B2 | 4/2006 | Peterson | |
| 7,062,718 B2 | 6/2006 | Kodosky et al. | |
| 7,185,287 B2 | 2/2007 | Ghericioiu et al. | |
| 7,200,817 B2 | 4/2007 | Dove et al. | |
| 7,290,244 B2 | 10/2007 | Peck et al. | |
| 2005/0235290 A1 | 10/2005 | Jefferson et al. | |
| 2005/0257195 A1 | 11/2005 | Morrow et al. | |
| 2006/0036799 A1 | 2/2006 | Shah et al. | |
| 2006/0041859 A1 | 2/2006 | Vrancic et al. | |
| 2007/0088865 A1* | 4/2007 | Breyer | 710/22 |
| 2008/0034299 A1* | 2/2008 | Hayles et al. | 715/763 |

* cited by examiner

*Primary Examiner*—Cao (Kevin) Nguyen
(74) *Attorney, Agent, or Firm*—Meyertons Hood Kivlin Kowert & Goetzel, P.C.; Jeffrey C. Hood; Joel L. Stevens

(57) ABSTRACT

System and method for distributed execution of a graphical program. First and second icons associated with respective execution targets are displayed on a display. Each icon has an interior and specifies execution of a respective graphical program portion positioned in the interior of the icon on the respective execution target. First and second graphical program portions are respectively displayed in the interiors of the first and second icons, where each graphical program portion comprises a respective one or more interconnected nodes that visually indicate functionality of the graphical program portion. One or more wires connecting the first graphical program portion and the second graphical program portion are display. During execution of the graphical program, the first and second graphical program portions execute respectively on the first and second execution targets, and the first graphical program portion and the second graphical program portion communicate as specified by the one or more wires.

19 Claims, 23 Drawing Sheets

DIAGRAM THAT VISUALLY INDICATES TARGETED EXECUTION

PRIORITY INFORMATION

This application claims benefit of priority of: U.S. provisional application Ser. No. 60/942,834 titled "Diagram That Visually Indicates Targeted Execution" filed Jun. 8, 2007, whose inventors were Jeffrey L. Kodosky, David W Fuller III, Timothy J. Hayles, Jeffrey N. Correll, John R. Breyer, Jacob Kornerup and Darshan K. Shah;

U.S. provisional application Ser. No. 60/869,221 titled "System Diagram that Illustrates Programs in a Distributed System Having Multiple Targets" filed Dec. 8, 2006, whose inventor was Timothy J. Hayles; and U.S. provisional application Ser. No. 60/821,512 titled "Execution Target Structure Node for a Graphical Program", filed Aug. 4, 2006, whose inventors were Darshan K. Shah and Aljosa Vrancic. The above listed provisional applications are hereby incorporated by reference in their entirety as though fully and completely set forth herein.

FIELD OF THE INVENTION

The present invention relates to the field of graphical programming, and more particularly to a system and method for creating a graphical program having portions that execute on different execution targets.

DESCRIPTION OF THE RELATED ART

Traditionally, high-level text-based programming languages have been used by programmers in writing application programs. Many different high level text-based programming languages exist, including BASIC, C, C++, Java, FORTRAN, Pascal, COBOL, ADA, APL, etc. Programs written in these high level text-based languages are translated to the machine language level by translators known as compilers or interpreters. The high level text-based programming languages in this level, as well as the assembly language level, are referred to herein as text-based programming environments.

Increasingly, computers are required to be used and programmed by those who are not highly trained in computer programming techniques. When traditional text-based programming environments are used, the user's programming skills and ability to interact with the computer system often become a limiting factor in the achievement of optimal utilization of the computer system.

There are numerous subtle complexities which a user must master before he can efficiently program a computer system in a text-based environment. The task of programming a computer system to model or implement a process often is further complicated by the fact that a sequence of mathematical formulas, steps or other procedures customarily used to conceptually model a process often does not closely correspond to the traditional text-based programming techniques used to program a computer system to model such a process. In other words, the requirement that a user program in a text-based programming environment places a level of abstraction between the user's conceptualization of the solution and the implementation of a method that accomplishes this solution in a computer program. Thus, a user often must substantially master different skills in order to both conceptualize a problem or process and then to program a computer to implement a solution to the problem or process. Since a user often is not fully proficient in techniques for programming a computer system in a text-based environment to implement his solution, the efficiency with which the computer system can be utilized often is reduced.

To overcome the above shortcomings, various graphical programming environments now exist which allow a user to construct a graphical program or graphical diagram, also referred to as a block diagram. U.S. Pat. Nos. 4,901,221; 4,914,568; 5,291,587; 5,301,301; and 5,301,336; among others, to Kodosky et al disclose a graphical programming environment which enables a user to easily and intuitively create a graphical program. Graphical programming environments such as that disclosed in Kodosky et al can be considered a higher and more intuitive way in which to interact with a computer. A graphically based programming environment can be represented at a level above text-based high level programming languages such as C, Basic, Java, etc.

A user may assemble a graphical program by selecting various icons or nodes which represent desired functionality, and then connecting the nodes together to create the program. The nodes or icons may be connected by lines representing data flow between the nodes, control flow, or execution flow. Thus the block diagram may include a plurality of interconnected icons such that the diagram created graphically displays a procedure or method for accomplishing a certain result, such as manipulating one or more input variables and/or producing one or more output variables. In other words, the graphical program or block diagram includes a plurality of interconnected nodes that visually or graphically represents the functionality of the program.

In response to the user constructing a diagram or graphical program using the block diagram editor, data structures and/or program instructions may be automatically constructed which characterize an execution procedure that corresponds to the displayed procedure. The graphical program may be compiled or interpreted by a computer.

A graphical program may have a graphical user interface. For example, in creating a graphical program, a user may create a front panel or user interface panel. The front panel may include various graphical user interface elements or front panel objects, such as user interface controls and/or indicators, that represent or display the respective input and output that will be used by the graphical program, and may include other icons which represent devices being controlled.

Thus, graphical programming has become a powerful tool available to programmers. Graphical programming environments such as the National Instruments LabVIEW product have become very popular. Tools such as LabVIEW have greatly increased the productivity of programmers, and increasing numbers of programmers are using graphical programming environments to develop their software applications. In particular, graphical programming tools are being used for test and measurement, data acquisition, process control, man machine interface (MMI), supervisory control and data acquisition (SCADA) applications, modeling, simulation, image processing/machine vision applications, and motion control, among others.

In parallel with the development of the graphical programming model, distributed execution of programs has become increasingly used, where, for example, various portions of a program are distributed for execution on different platforms. For example, in a typical text-based application, e.g., in a C/C++, etc. application, one can target particular thread to a particular CPU if the operating system (OS) allows it. On some OS's, one can also target processes. However, currently there are no simple ways to selectively target a specific part of a graphical program diagram to a particular execution target or CPU. Currently, such distribution of graphical programs has generally been performed manually, and with a great deal of difficulty. For example, designing a distributed application with optimum load balancing among execution targets, with the least communication bandwidth requirement between nodes, and with loose binding between the distributed portions of the program is non-trivial even for small applications, and becomes substantially more difficult as the size and complexity of the graphical program increase. For example, as the application size and complexity change in scale (e.g., increase), the load balancing and bandwidth requirements or specification may also change, i.e., distributed component boundaries may require reconsideration. Typically, even for experts, an experimental trial and error approach is used in an iterative manner to properly distribute the application in a substantially optimal manner. In many cases, a small experimental change may force the user to modify many "broken" components to get the application running properly again. This may be made more difficult if the overall structure of the application is not apparent, due to experimental componentizations (partitioning graphical code portions for distribution) made in earlier iterations of the distribution specification process, e.g., retracting later changes may require starting the process over from the beginning.

Thus, improved systems and methods are desired for distributing graphical programs across multiple execution targets.

SUMMARY OF THE INVENTION

Various embodiments of a system and method for targeted or distributed execution of a graphical program are presented.

First, a first icon may be displayed on a display, e.g., a computer monitor. The first icon preferably has an interior, and may be associated with a first execution target, where the first icon specifies execution of a graphical program portion positioned in the interior of the second icon on the first execution target. It should be noted that in some embodiments, the icon may not be originally associated with a particular target, and may be subsequently configured with such an association, e.g., at edit time, e.g., in response to user input, or even dynamically, e.g., at runtime, as will be described in more detail below. Such icons may be referred to as execution target icons.

In one embodiment, the method may include configuring the first icon, e.g., in response to user input. Of course, any of various means may be used to configure the first icon. For example, the user may interact with a dialog box, property page, menu(s), or wizard to statically configure the first icon, e.g., the user may invoke a configuration dialog by invoking a "Configure" option (or its equivalent) on a context menu for the first icon or a configuration node, or by double-clicking on the border of the first icon or the configuration node. The user may then interact with the configuration dialog to specify information such as the execution target. In one embodiment the user may utilize the configuration dialog to specify other properties of the first icon as well, such as a name, and/or other information that may be useful for managing the first icon.

Thus, in one embodiment, configuring the first icon may include invoking a graphical user interface (GUI) with respect to the first icon, receiving user input to the GUI configuring the first icon, e.g., specifying the target for execution of any graphical code contained therein, and automatically configuring the first icon in accordance with the user input to the GUI. In various embodiments, the GUI may include one or more of: one or more dialogs, one or more property pages, one or more menus, and/or a wizard. For example, a configuration dialog or menu (or wizard) may be invoked on the first icon, e.g., via a project or environment menu or dialog invocation, which would be a static assignment of the configuration parameters. In other embodiments, the configuration may be automatic. Thus, in some embodiments, the first icon may be configured through the project in which the graphical program is developed. For example, the type and/or definition of the target may be defined in the project. In other embodiments, the icon may have a default configuration that specifies a default execution target for a graphical program portion positioned in the interior of the icon, which may be overridden as desired.

A first graphical program portion may be displayed in the interior of the first icon. The first graphical program portion may include a plurality of interconnected nodes that visually indicate functionality of the first graphical program portion. The first graphical program portion is preferably a portion of a graphical data flow program, although in other embodiments, the first graphical program portion may be of another type of flow diagram, such as a control flow, or execution flow diagram, or any other kind of graphical program, as desired.

The first graphical program portion may be created or assembled by the user arranging on a display a plurality of nodes or icons and then interconnecting the nodes to create the first graphical program portion. In response to the user assembling the first graphical program portion, data structures may be created and stored which represent the first graphical program portion. The first graphical program portion may be developed under a project (which itself may operate under a development environment), where the project is considered to reside and execute on a host system.

In an alternate embodiment, the first graphical program portion may be created by the user creating or specifying a prototype, followed by automatic or programmatic creation of the graphical program from the prototype. The graphical program portion may be created in other manners, either by the user or programmatically, as desired. The graphical program portion may implement a measurement function, an automation function, or a control function, among others, as desired.

In some embodiments, the user may drag and drop the graphical program portion onto the first icon, e.g., into the interior of the first icon using a pointing device, such as a mouse. In another exemplary embodiment, the user may draw the first icon around the first graphical program portion. For example, the user may invoke a special mode, e.g., a drawing mode or equivalent, and simply draw a boundary, e.g., a polygon, circle, or free-hand border, around the first graphical program portion. In one embodiment, the user may "drag" a (rectangular) bounding box (or circle or ellipse) around the first graphical program portion. Thus, displaying the first graphical program portion in the interior of the first icon may include displaying the first graphical program portion on the display, and drawing the first icon around the first graphical program portion.

Of course, any other means for displaying the first graphical program portion within the first icon may be used as desired. For example, in one embodiment, the user may invoke a menu on the first graphical program portion and/or the first icon, and may specify inclusion of the portion in the icon via menu selection. In another embodiment, the user may invoke a wizard, where the wizard leads the user through the process via a number of dialogs, whereby the user provides input specifying the inclusion and display of the graphical program portion in the icon.

In some embodiments, this may complete the specification or implementation of the graphical program. In other words, in some embodiments, the first graphical program portion may be the complete graphical program, where the graphical program is specified for execution on the execution target associated with the first icon. In other embodiments, further icons and graphical program portions may be specified, as described below.

A second icon may be displayed on the display, where, as with the first icon, the second icon has an interior. The second icon may be associated with a second execution target, where the second icon may specify execution of a graphical program portion positioned in the interior of the second icon on the second execution target. As described above with respect to the first icon, the second icon may also be configured. As noted above, each icon may be configured statically, e.g., at edit time, and/or dynamically, i.e., at runtime. This configuration may be performed in response to user input, e.g., via a GUI at edit time or at runtime, and/or programmatically. For example, in an exemplary embodiment with programmatic configuration, the graphical program may include a first node (e.g., a configuration node) connected to the first icon, where during execution, the first icon may be configured in response to configuration information received from the first node. Note that this means that the icons, and thus, the specified execution targets, may be reconfigured dynamically during program execution.

A second graphical program portion may be displayed in the interior of the second icon, where the second graphical program portion includes a plurality of interconnected nodes that visually indicate functionality of the second graphical program portion. Note that the above descriptions of the first graphical program portion and the first icon also apply to the second graphical program portion and the second icon. In some embodiments, the first and second icons may be referred to as execution target icons or nodes, although any other names or labels may be used as desired. Each of the icons may correspond to a respective hardware device (or a portion of a hardware device) having a processing element. It should be noted that any type of execution target or platform may be designated for or by each icon, i.e., any computing elements capable of executing code may be targeted as desired. Exemplary execution targets may include, for example, CPU-based systems, programmable hardware elements, e.g., field programmable gate arrays (FPGAs), digital signal processors (DSPs), micro-controllers, etc., as well as any combinations of the above, among others. For example, a target may include one or more FPGAs and one or more DSPs that may operate in conjunction.

One or more wires connecting the first graphical program portion and the second graphical program portion may be displayed. During execution of the graphical program, the first graphical program portion may execute on the first execution target, the second graphical program portion may execute on the second execution target, and the first graphical program portion and the second graphical program portion may communicate as specified by the one or more wires. The one or more wires connecting the first graphical program portion and the second graphical program portion may include one or more wires connecting at least one node in the first graphical program portion to at least one node in the second graphical program portion, and/or, the one or more wires connecting the icons themselves to each other, e.g., where communicative connections to particular nodes in the portions may be implicit.

In various embodiments, the wires may be of any of a variety of types. For example, in some embodiments, the one or more wires connecting the first graphical program portion and the second graphical program portion may include one or more of: a timing wire, operable to specify or transmit timing, triggering or synchronization information between the first graphical program portion and the second graphical program portion, or a data transfer wire, operable to transmit data between the first graphical program portion and the second graphical program portion or an event wire to transmit the occurrence of an event between the first graphical program portion and the second graphical program portion. Thus, the wires may facilitate communication of timing information (e.g., including triggering and synchronization information) and data and/or events between the two graphical program portions. Note that in some embodiments, the timing wires, the data transfer wires, and/or the event wires, may be configurable, e.g., for asynchronous or buffered communication. Such wires may be referred to as buffered wires, e.g., buffered timing wires and buffered data transfer wires.

In one embodiment, the method may further include executing the graphical program, including executing the first graphical program portion on the first execution target, and executing the second graphical program portion on the second execution target, where, as indicated above, the first graphical program portion and the second graphical program portion communicate as specified by the one or more wires.

In some alternate embodiments, one or more of the graphical program portions may be a single graphical program node. For example, in some embodiments, the first graphical program node may be a sub-VI, i.e., a single node that represents a plurality of interconnected nodes that visually indicate functionality of the first graphical program portion. In one embodiment, the single node may be expanded (e.g., in response to user input) to display the represented interconnected nodes. In other embodiments, the first graphical program node may be atomic, i.e., may not represent additional nodes, and so may not be expanded.

Thus, various embodiments of the present invention may facilitate distributed execution of portions (or nodes) of a graphical program on respective targets.

BRIEF DESCRIPTION OF THE DRAWINGS

A better understanding of the present invention can be obtained when the following detailed description of the preferred embodiment is considered in conjunction with the following drawings, in which.

Figure 1:
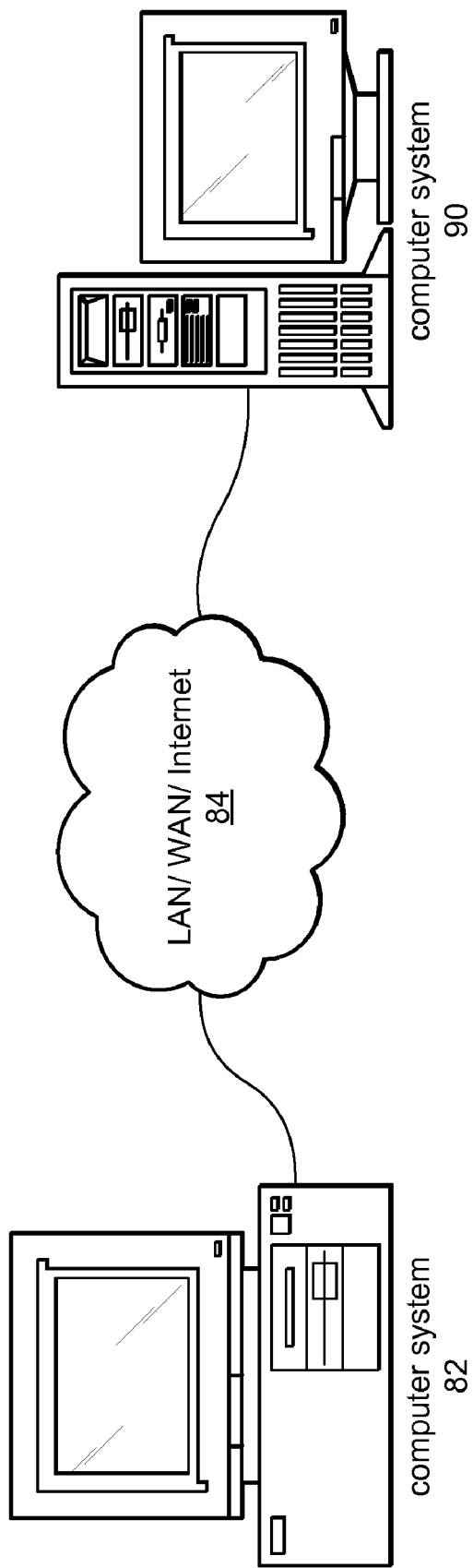
FIG. 1 illustrates a network system comprising two or more computer systems configured to implement embodiments of the present invention.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Incorporation by Reference

The following references are hereby incorporated by reference in their entirety as though fully and completely set forth herein:

U.S. Provisional Application Ser. No. 60/821,512, titled "Execution Target Structure Node For A Graphical Program", filed on Aug. 4, 2006.

U.S. Provisional Application Ser. No. 60/869,221, titled "System Diagram that Illustrates Programs in a Distributed System Having Multiple Targets", filed on Dec. 8, 2006.

U.S. Pat. No. 4,914,568 titled "Graphical System for Modeling a Process and Associated Method," issued on Apr. 3, 1990.

U.S. Pat. No. 5,481,741 titled "Method and Apparatus for Providing Attribute Nodes in a Graphical Data Flow Environment".

U.S. Pat. No. 6,173,438 titled "Embedded Graphical Programming System" filed Aug. 18, 1997.

U.S. Pat. No. 6,219,628 titled "System and Method for Configuring an Instrument to Perform Measurement Functions Utilizing Conversion of Graphical Programs into Hardware Implementations," filed Aug. 18, 1997.

U.S. Pat. No. 7,042,469, titled "Multiple Views for a Measurement System Diagram," filed Dec. 23, 2002.

U.S. Patent Application Publication No. 20010020291 (Ser. No. 09/745,023) titled "System and Method for Programmatically Generating a Graphical Program in Response to Program Information," filed Dec. 20, 2000.

U.S. Patent Application Publication No. 20050050515 (Ser. No. 10/892,829) titled "A Graphical Program Which Executes a Timed Loop", filed Jul. 16, 2004.

U.S. patent application Ser. No. 11/462,393 titled "Asynchronous Wires in a Graphical Programming System," filed Aug. 4, 2006.

U.S. Patent Application Publication No. 2007/0044030, titled "Graphical Programming Methods for Generation, Control and Routing of Digital Pulses," filed Aug. 8, 2006.

U.S. application Ser. No. 10/893,745, titled "Graphically Representing Timing in a Graphical Program", filed Jul. 16, 2004.

U.S. application Ser. No. 11/759,975, titled "Graphical Diagram Which Automatically Determines A Data Transport Mechanism For Wires Based On Configured Policies", filed Jun. 8, 2007.

U.S. application Ser. No. 11/760,006, titled "Execution Target Structure Node For A Graphical Program", filed Jun. 8, 2007.

Terms

The following is a glossary of terms used in the present application:

Memory Medium—Any of various types of memory devices or storage devices. The term "memory medium" is intended to include an installation medium, e.g., a CD-ROM, floppy disks 104, or tape device; a computer system memory or random access memory such as DRAM, DDR RAM, SRAM, EDO RAM, Rambus RAM, etc.; or a non-volatile memory such as a magnetic media, e.g., a hard drive, or optical storage. The memory medium may comprise other types of memory as well, or combinations thereof. In addition, the memory medium may be located in a first computer in which the programs are executed, or may be located in a second different computer which connects to the first computer over a network, such as the Internet. In the latter instance, the second computer may provide program instructions to the first computer for execution. The term "memory medium" may include two or more memory mediums which may reside in different locations, e.g., in different computers that are connected over a network.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Program—the term "program" is intended to have the full breadth of its ordinary meaning. The term "program" includes 1) a software program which may be stored in a memory and is executable by a processor or 2) a hardware configuration program useable for configuring a programmable hardware element.

Software Program—the term "software program" is intended to have the full breadth of its ordinary meaning, and includes any type of program instructions, code, script and/or data, or combinations thereof, that may be stored in a memory medium and executed by a processor. Exemplary software programs include programs written in text-based programming languages, such as C, C++, Pascal, Fortran, Cobol, Java, assembly language, etc.; graphical programs (programs written in graphical programming languages); assembly language programs; programs that have been compiled to machine language; scripts; and other types of executable software. A software program may comprise two or more software programs that interoperate in some manner.

Hardware Configuration Program—a program, e.g., a netlist or bit file, that can be used to program or configure a programmable hardware element.

Diagram—A graphical image displayed on a computer display which visually indicates relationships between graphical elements in the diagram. Diagrams may include configuration diagrams, system diagrams, physical diagrams, and/or graphical programs (among others). In some embodiments, diagrams may be executable to perform specified functionality, e.g., measurement or industrial operations, which is represented by the diagram. Executable diagrams may include graphical programs (described below) where icons connected by wires illustrate functionality of the graphical program. Alternatively, or additionally, the diagram may comprise a system diagram which may indicate functionality and/or connectivity implemented by one or more devices. Various graphical user interfaces (GUIs), e.g., front panels, may be associated with the diagram.

Graphical Program—A program comprising a plurality of interconnected nodes or icons, wherein the plurality of interconnected nodes or icons visually indicate functionality of the program. A graphical program is a type of diagram.

The following provides examples of various aspects of graphical programs. The following examples and discussion are not intended to limit the above definition of graphical program, but rather provide examples of what the term "graphical program" encompasses:

The nodes in a graphical program may be connected in one or more of a data flow, control flow, and/or execution flow format. The nodes may also be connected in a "signal flow" format, which is a subset of data flow.

Exemplary graphical program development environments which may be used to create graphical programs include LabVIEW, DasyLab, DiaDem and Matrixx/SystemBuild from National Instruments, Simulink from the MathWorks, VEE from Agilent, WiT from Coreco, Vision Program Manager from PPT Vision, SoftWIRE from Measurement Computing, Sanscript from Northwoods Software, Khoros from Khoral Research, SnapMaster from HEM Data, VisSim from Visual Solutions, ObjectBench by SES (Scientific and Engineering Software), and VisiDAQ from Advantech, among others.

The term "graphical program" includes models or block diagrams created in graphical modeling environments, wherein the model or block diagram comprises interconnected nodes or icons that visually indicate operation of the model or block diagram; exemplary graphical modeling environments include Simulink, SystemBuild, VisSim, Hypersignal Block Diagram, etc.

A graphical program may be represented in the memory of the computer system as data structures and/or program instructions. The graphical program, e.g., these data structures and/or program instructions, may be compiled or interpreted to produce machine language that accomplishes the desired method or process as shown in the graphical program.

Input data to a graphical program may be received from any of various sources, such as from a device, unit under test, a process being measured or controlled, another computer program, a database, or from a file. Also, a user may input data to a graphical program or virtual instrument using a graphical user interface, e.g., a front panel.

A graphical program may optionally have a GUI associated with the graphical program. In this case, the plurality of interconnected nodes are often referred to as the block diagram portion of the graphical program.

Data Flow Graphical Program (or Data Flow Diagram)—A graphical program or diagram comprising a plurality of interconnected nodes, wherein the connections between the nodes indicate that data produced by one node is used by another node.

Physical Diagram—A diagram which visually indicates physical connectivity between physical devices. For example, a physical diagram may visually indicate the connectivity of various physical components in a measurement system, e.g., a computer connected to a measurement device via an Ethernet network. Thus the wires in a physical diagram represent physical connectivity between devices. A physical diagram may show the corresponding "real world" physical system/devices.

Configuration Diagram—A diagram which indicates connectivity between real and/or virtual devices. A configuration diagram may visually indicate physical connectivity between physical devices as shown in a physical diagram. However, in some embodiments, one or more of the devices (or all of the devices) in the configuration diagram may be virtual or simulated devices. Thus, some or all of the devices in the configuration diagram may not be physically present in the system represented by the configuration diagram.

System Diagram—A diagram with one or more device icons and graphical program code, wherein the device icons are use to specify and/or visually indicate where different portions of graphical program code are deployed/executed. A system diagram may indicate where (i.e., on which system/device) programs or code may be executed. For example, the system diagram may include graphical indications showing where portions of the displayed graphical program code are executed. In some embodiments, various ones of the icons may represent processing elements which have associated programs for execution. At least one of the icons may represent logical elements (e.g., executable software functions or graphical program code). One or more of the device icons may represent configurable elements. Thus, the system diagram may provide a system view which allows a user to easily understand where graphical program code is deployed among the various devices in the system.

Node—In the context of a graphical program, an element that may be included in a graphical program. The graphical program nodes (or simply nodes) in a graphical program may also be referred to as blocks. A node may have an associated icon that represents the node in the graphical program, as well as underlying code and/or data that implements functionality of the node. Exemplary nodes (or blocks) include function nodes, sub-program nodes (sub-VIs), terminal nodes, structure nodes, etc. Nodes may be connected together in a graphical program by connection icons or wires. The term "logical element" is used herein to refer to a "node". For example, the term "logical element: may refer to a software program portion or code that is executable by (or implementable on) a processing element, and which is represented iconically on a display. Logical elements include virtual instruments (VIs), primitives, etc. Logical elements may be displayed in various ones of the diagrams described herein, e.g., in graphical programs, system diagrams, etc.

Wire—a graphical element displayed in a diagram on a display that connects icons or nodes in the diagram. The diagram may be a graphical program (where the icons correspond to software functions), a system diagram (where the icons may correspond to hardware devices or software functions), etc. The wire is generally used to indicate, specify, or implement communication between the icons. Wires may represent logical data transfer between icons, or may represent a physical communication medium, such as Ethernet, USB, etc. Wires may implement and operate under various protocols, including data flow semantics, non-data flow semantics, etc. Some wires, e.g., buffered data transfer wires, may be configurable to implement or follow specified protocols or semantics. Wires may indicate communication of data, timing information, status information, control information, and/or other information between icons. In some embodiments, wires may have different visual appearances which may indicate different characteristics of the wire (e.g., type of data exchange semantics, data transport protocols, data transport mediums, and/or type of information passed between the icons, among others).

Graphical User Interface—this term is intended to have the full breadth of its ordinary meaning. The term "Graphical User Interface" is often abbreviated to "GUI". A GUI may comprise only one or more input GUI elements, only one or more output GUI elements, or both input and output GUI elements.

The following provides examples of various aspects of GUIs. The following examples and discussion are not intended to limit the ordinary meaning of GUI, but rather provide examples of what the term "graphical user interface" encompasses:

A GUI may comprise a single window having one or more GUI Elements, or may comprise a plurality of individual GUI Elements (or individual windows each having one or more GUI Elements), wherein the individual GUI Elements or windows may optionally be tiled together.

A GUI may be associated with a diagram, e.g., a graphical program. In this instance, various mechanisms may be used to connect GUI Elements in the GUI with nodes or icons in the diagram/graphical program. For example, when Input Controls and Output Indicators are created in the GUI, corresponding nodes (e.g., terminals) may be automatically created in the diagram or graphical program. Alternatively, the user can place terminal nodes in the diagram which may cause the display of corresponding GUI Elements front panel objects in the GUI, either at edit time or later at run time. As another example, the GUI may comprise GUI Elements embedded in the block diagram portion of the graphical program.

Front Panel—A Graphical User Interface that includes input controls and output indicators, and which enables a user to interactively control or manipulate the input being provided to a program or diagram, and view output of the program or diagram, during execution.

A front panel is a type of GUI. A front panel may be associated with a diagram or graphical program as described above.

In an instrumentation application, the front panel can be analogized to the front panel of an instrument. In an industrial automation application the front panel can be analogized to the MMI (Man Machine Interface) of a device. The user may adjust the controls on the front panel to affect the input and view the output on the respective indicators.

Graphical User Interface Element—an element of a graphical user interface, such as for providing input or displaying output. Exemplary graphical user interface elements comprise input controls and output indicators Input Control—a graphical user interface element for providing user input to a program. Exemplary input controls comprise dials, knobs, sliders, input text boxes, etc.

Output Indicator—a graphical user interface element for displaying output from a program. Exemplary output indicators include charts, graphs, gauges, output text boxes, numeric displays, etc. An output indicator is sometimes referred to as an "output control".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

Measurement Device—includes instruments, data acquisition devices, smart sensors, and any of various types of devices that are operable to acquire and/or store data. A measurement device may also optionally be further operable to analyze or process the acquired or stored data. Examples of a measurement device include an instrument, such as a traditional stand-alone "box" instrument, a computer-based instrument (instrument on a card) or external instrument, a data acquisition card, a device external to a computer that operates similarly to a data acquisition card, a smart sensor, one or more DAQ or measurement cards or modules in a chassis, an image acquisition device, such as an image acquisition (or machine vision) card (also called a video capture board) or smart camera, a motion control device, a robot having machine vision, and other similar types of devices. Exemplary "stand-alone" instruments include oscilloscopes, multimeters, signal analyzers, arbitrary waveform generators, spectroscopes, and similar measurement, test, or automation instruments.

A measurement device may be further operable to perform control functions, e.g., in response to analysis of the acquired or stored data. For example, the measurement device may send a control signal to an external system, such as a motion control system or to a sensor, in response to particular data. A measurement device may also be operable to perform automation functions, i.e., may receive and analyze data, and issue automation control signals in response.

Processing Element—A hardware component or device which is operable to execute software, implement code (e.g., program code), be configured according to a hardware description, etc. Processing elements include various processors and/or programmable hardware elements (e.g., field programmable gate arrays (FPGAs)), or systems that contain processors or programmable hardware elements, among others. For example, a processing element may refer to an individual processor in a computer system or the computer system itself.

Configurable Elements—Systems or devices that provide configurable functionality but do not themselves includes processors that process data. Configurable elements may produce and/or consume data that may be provided to or received from various processing elements. A configurable element may have or receive configuration data that specifies functionality of the configurable element. Configurable elements comprise data acquisition (DAQ) devices and/or other sensors/devices.

FIG. 1—Networked Computer System

FIG. 1 illustrates a system including a first computer system 82 that is coupled to a second computer system 90, where one or both of the computers are operable to execute a system diagram, e.g., a graphical program, according to embodiments of the present invention. The computer system 82 may be coupled via a network 84 (or a computer bus) to the second computer system 90. The computer systems 82 and 90 may each be any of various types, as desired, the particular types shown in FIG. 1 being exemplary only. For example, in some embodiments, the second computer 90 may be a "computer on a card" in a chassis or even installed in the first computer 82. In another embodiment, the second computer may be a programmable hardware element, such as a field programmable gate array (FPGA), or other programmable logic.

As shown in FIG. 1, the computer system 82 (and/or 90) may include a display device operable to display the system diagram, e.g., that graphical program, as the system diagram is created and/or executed. The display device may also be operable to display a graphical user interface or front panel of the system diagram during execution of the system diagram. The graphical user interface may comprise any type of graphical user interface, e.g., depending on the computing platform.

The computer system 82 may include at least one memory medium on which one or more computer programs or software components according to one embodiment of the present invention may be stored. For example, the memory medium may store one or more graphical programs (or other types of programs) that are executable to perform the methods described herein. Additionally, the memory medium may store a development environment application, e.g., a graphical programming development environment application used to create and/or execute such graphical programs. The memory medium may also store operating system software, as well as other software for operation of the computer system. Various embodiments further include receiving or storing instructions and/or data implemented in accordance with the foregoing description upon a carrier medium.

The network 84 can also be any of various types, including a LAN (local area network), WAN (wide area network), the Internet, or an Intranet, among others. The computer systems 82 and 90 may execute a system diagram, e.g., a graphical program, in a distributed fashion. For example, in one embodiment, computer 82 may execute a first portion of the block diagram of a graphical program and computer system 90 may execute a second portion of the block diagram of the graphical program, as will be described in more detail below. As another example, computer 82 may display the graphical user interface of a graphical program and computer system 90 may execute the block diagram of the graphical program.

In one embodiment, the graphical user interface of the graphical program may be displayed on a display device of the computer system 82, and the block diagram may execute on a device coupled to the computer system 82. The device may include a programmable hardware element and/or may include a processor and memory medium which may execute a real time operating system. In one embodiment, the graphical program may be downloaded and executed on the device. For example, an application development environment with which the graphical program is associated may provide support for downloading a graphical program for execution on the device in a real time system. Of course, the graphical program may be distributed in other ways as desired. For example, various portions of the block diagram of the graphical program may be targeted for execution across multiple targets or platforms.

Exemplary Systems

Embodiments of the present invention may be involved with performing test and/or measurement functions; controlling and/or modeling instrumentation or industrial automation hardware; modeling and simulation functions, e.g., modeling or simulating a device or product being developed or tested, etc. Exemplary test applications where the graphical program may be used include hardware-in-the-loop testing and rapid control prototyping, among others.

However, it is noted that the present invention can be used for a plethora of applications and is not limited to the above applications. In other words, applications discussed in the present description are exemplary only, and the present invention may be used in any of various types of systems. Thus, the system and method of the present invention is operable to be used in any of various types of applications, including the control of other types of devices such as multimedia devices, video devices, audio devices, telephony devices, Internet devices, etc., as well as general purpose software applications such as word processing, spreadsheets, network control, network monitoring, financial applications, games, etc.

Figure 2A:
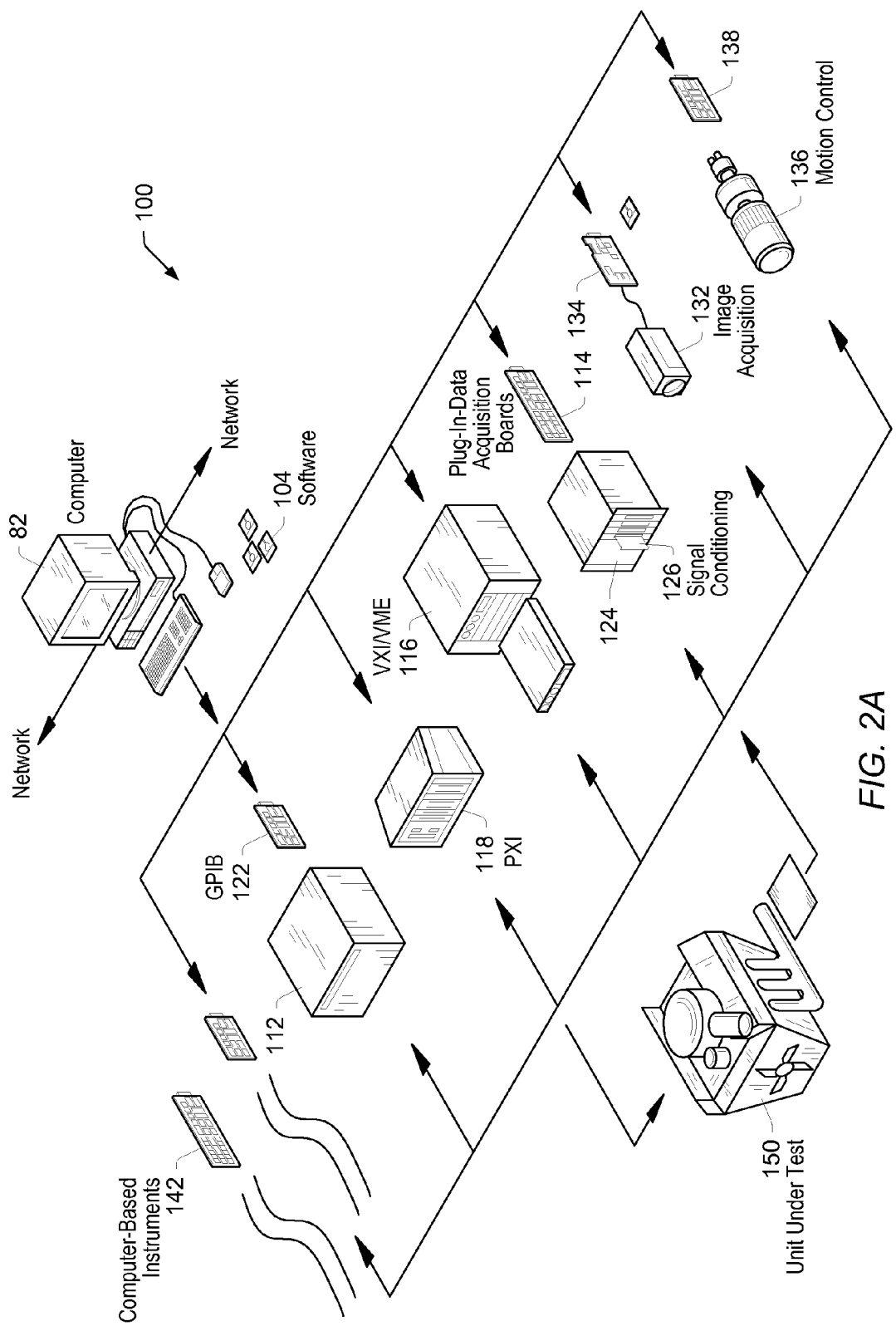
FIG. 2A illustrates an instrumentation control system according to one embodiment of the invention.

FIG. 2A illustrates an exemplary instrumentation control system 100 which may implement embodiments of the invention. The system 100 comprises a host computer 82 which couples to one or more instruments. The host computer 82 may comprise a CPU, a display screen, memory, and one or more input devices such as a mouse or keyboard as shown. The computer 82 may operate with the one or more instruments to analyze, measure or control a unit under test (UUT) or process 150.

The one or more instruments may include a GPIB instrument 112 and associated GPIB interface card 122, a data acquisition board 114 inserted into or otherwise coupled with chassis 124 with associated signal conditioning circuitry 126, a VXI instrument 116, a PXI instrument 118, a video device or camera 132 and associated image acquisition (or machine vision) card 134, a motion control device 136 and associated motion control interface card 138, and/or one or more computer based instrument cards 142, among other types of devices. The computer system may couple to and operate with one or more of these instruments. The instruments may be coupled to the unit under test (UUT) or process 150, or may be coupled to receive field signals, typically generated by transducers. The system 100 may be used in a data acquisition and control application, in a test and measurement application, an image processing or machine vision application, a process control application, a man-machine interface application, a simulation application, or a hardware-in-the-loop validation application, among others.

Figure 2B:
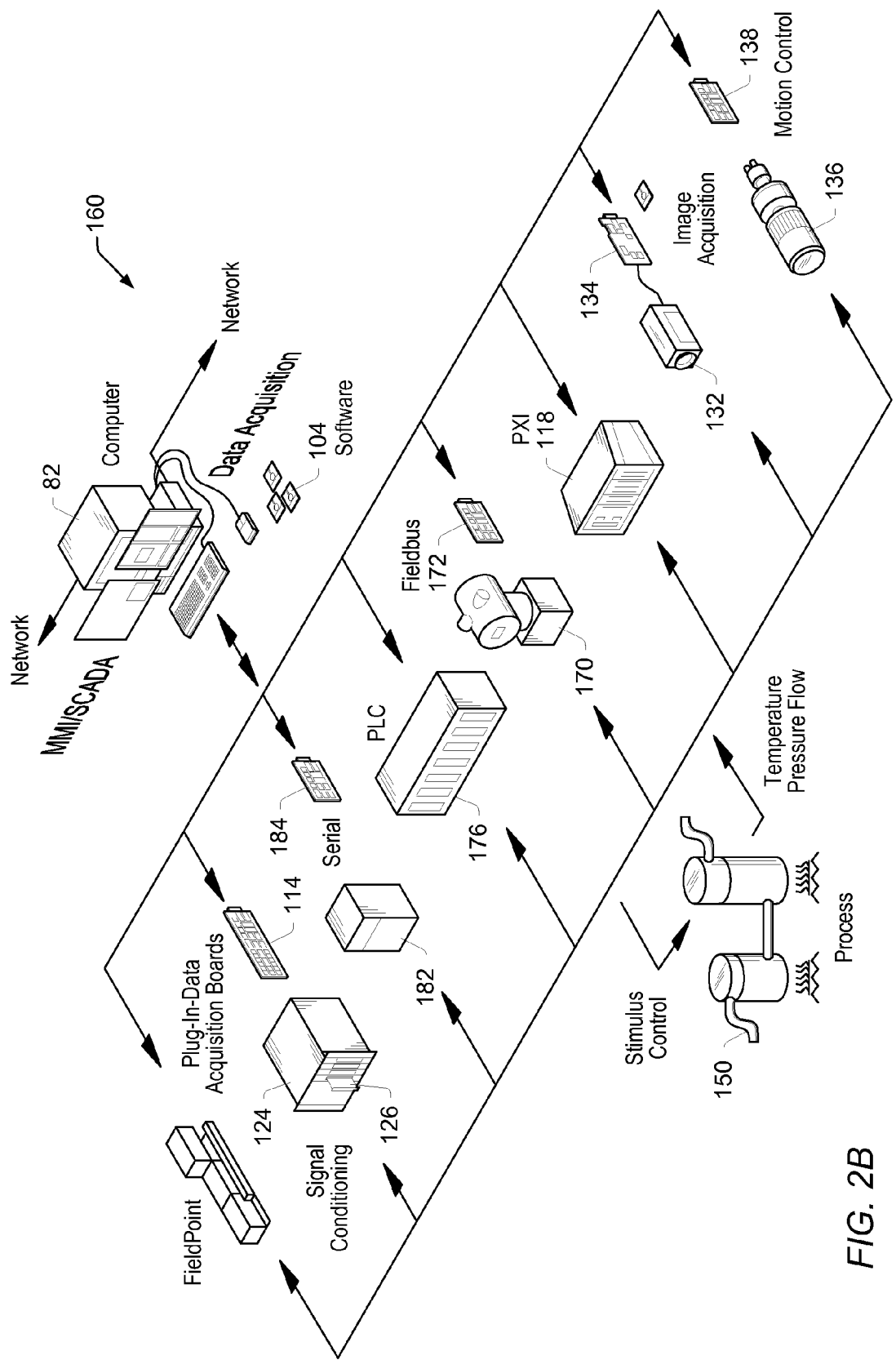
FIG. 2B illustrates an industrial automation system according to one embodiment of the invention.

FIG. 2B illustrates an exemplary industrial automation system 160 which may implement embodiments of the invention. The industrial automation system 160 is similar to the instrumentation or test and measurement system 100 shown in FIG. 2A. Elements which are similar or identical to elements in FIG. 2A have the same reference numerals for convenience. The system 160 may comprise a computer 82 which couples to one or more devices or instruments. The computer 82 may comprise a CPU, a display screen, memory, and one or more input devices such as a mouse or keyboard as shown. The computer 82 may operate with the one or more devices to a process or device 150 to perform an automation function, such as MMI (Man Machine Interface), SCADA (Supervisory Control and Data Acquisition), portable or distributed data acquisition, process control, advanced analysis, or other control, among others.

The one or more devices may include a data acquisition board 114 inserted into or otherwise coupled with chassis 124 with associated signal conditioning circuitry 126, a PXI instrument 118, a video device 132 and associated image acquisition card 134, a motion control device 136 and associated motion control interface card 138, a fieldbus device 170 and associated fieldbus interface card 172, a PLC (Programmable Logic Controller) 176, a serial instrument 182 and associated serial interface card 184, or a distributed data acquisition system, such as the Fieldpoint system available from National Instruments, among other types of devices.

Figure 3A:
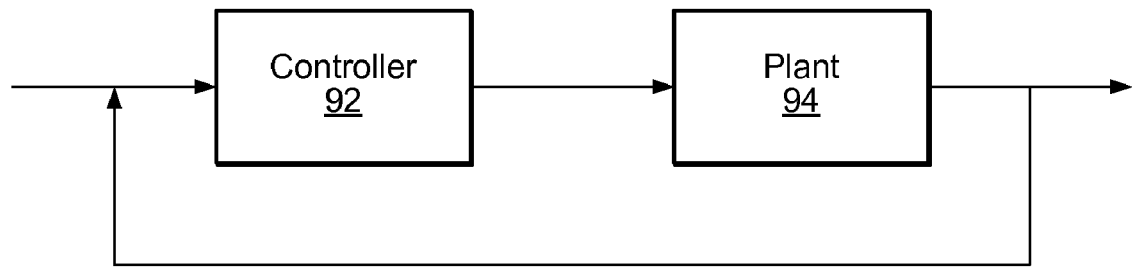
FIG. 3A is a high level block diagram of an exemplary system which may execute or utilize graphical programs.

FIG. 3A is a high-level block diagram of an exemplary system that may execute or utilize system diagrams, e.g., graphical programs. FIG. 3A illustrates a general high-level block diagram of a generic control and/or simulation system which comprises a controller 92 and a plant 94. The controller 92 represents a control system/algorithm the user may be trying to develop. The plant 94 represents the system the user may be trying to control. For example, if the user is designing an ECU for a car, the controller 92 is the ECU and the plant 94 is the car's engine (and possibly other components such as transmission, brakes, and so on.) As shown, a user may create a system diagram, such as a graphical program, that specifies or implements the functionality of one or both of the controller 92 and the plant 94. For example, a control engineer may use a modeling and simulation tool to create a model (graphical program) of the plant 94 and/or to create the algorithm (graphical program) for the controller 92.

Figure 3B:
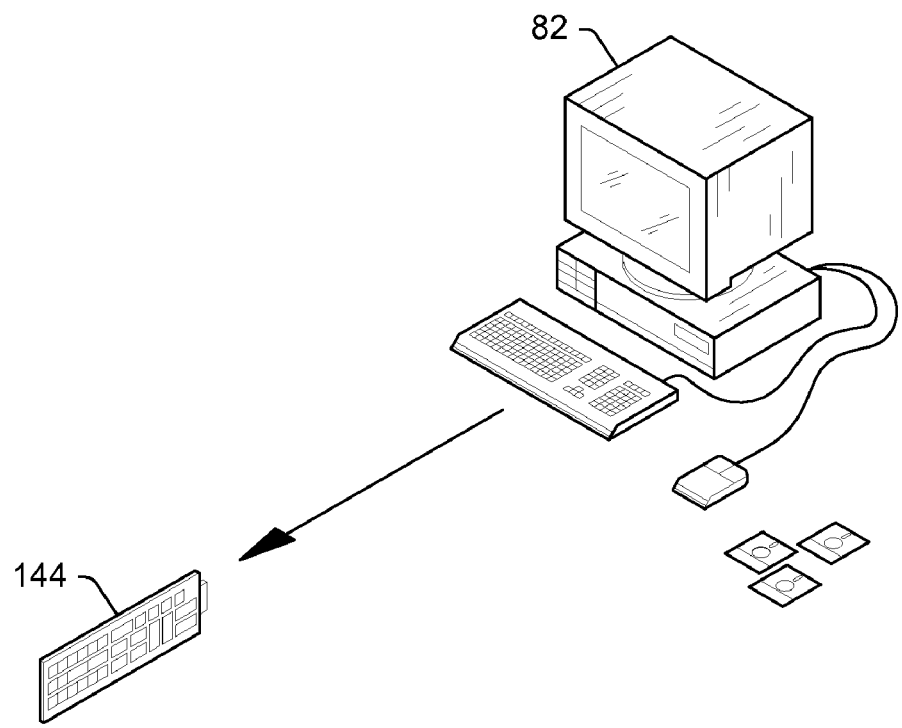
FIG. 3B illustrates an exemplary system which may perform control and/or simulation functions utilizing graphical programs.

FIG. 3B illustrates an exemplary system which may perform control and/or simulation functions. As shown, the controller 92 may be implemented by a computer system 82 or other device (e.g., including a processor and memory medium and/or including a programmable hardware element) that executes or implements a system diagram, e.g., a graphical program. In a similar manner, the plant 94 may be implemented by a computer system or other device 144 (e.g., including a processor and memory medium and/or including a programmable hardware element) that executes or implements a graphical program, or may be implemented in or as a real physical system, e.g., a car engine.

In one embodiment of the invention, one or more system diagrams, e.g., graphical programs, may be created which are used in performing rapid control prototyping. Rapid Control Prototyping (RCP) generally refers to the process by which a user develops a control algorithm and quickly executes that algorithm on a target controller connected to a real system. For example, the user may develop the control algorithm using a graphical program, and the graphical program may execute on the controller 92, e.g., on a computer system or other device. The computer system 82 may be a platform that supports real time execution, e.g., a device including a processor that executes a real time operating system (RTOS), or a device including a programmable hardware element.

In one embodiment of the invention, one or more system diagrams, e.g., graphical programs, may be created which are used in performing Hardware in the Loop (HIL) simulation. Hardware in the Loop (HIL) refers to the execution of the plant model 94 in real time to test operation of a real controller 92. For example, once the controller 92 has been designed, it may be expensive and complicated to actually test the controller 92 thoroughly in a real plant, e.g., a real car. Thus, the plant model (implemented by a graphical program) is executed in real time to make the real controller 92 "believe" or operate as if it is connected to a real plant, e.g., a real engine.

In the embodiments of FIGS. 2A, 2B, and 3B above, one or more of the various devices may couple to each other over a network, such as the Internet. In one embodiment, the user operates to select a target device from a plurality of possible target devices for programming or configuration using a system diagram, e.g., a graphical program. Thus, for example, the user may create a graphical program on a computer and use (execute) the graphical program on that computer or deploy the graphical program, or a portion of the program, to a target device (for remote execution on the target device) that is remotely located from the computer and coupled to the computer through a network. Embodiments of such distributed execution of a graphical program are disclosed below.

Graphical software programs which perform data acquisition, analysis and/or presentation, e.g., for measurement, instrumentation control, industrial automation, modeling, or simulation, such as in the applications shown in FIGS. 2A and 2B, may be referred to as virtual instruments.

Figure 4:
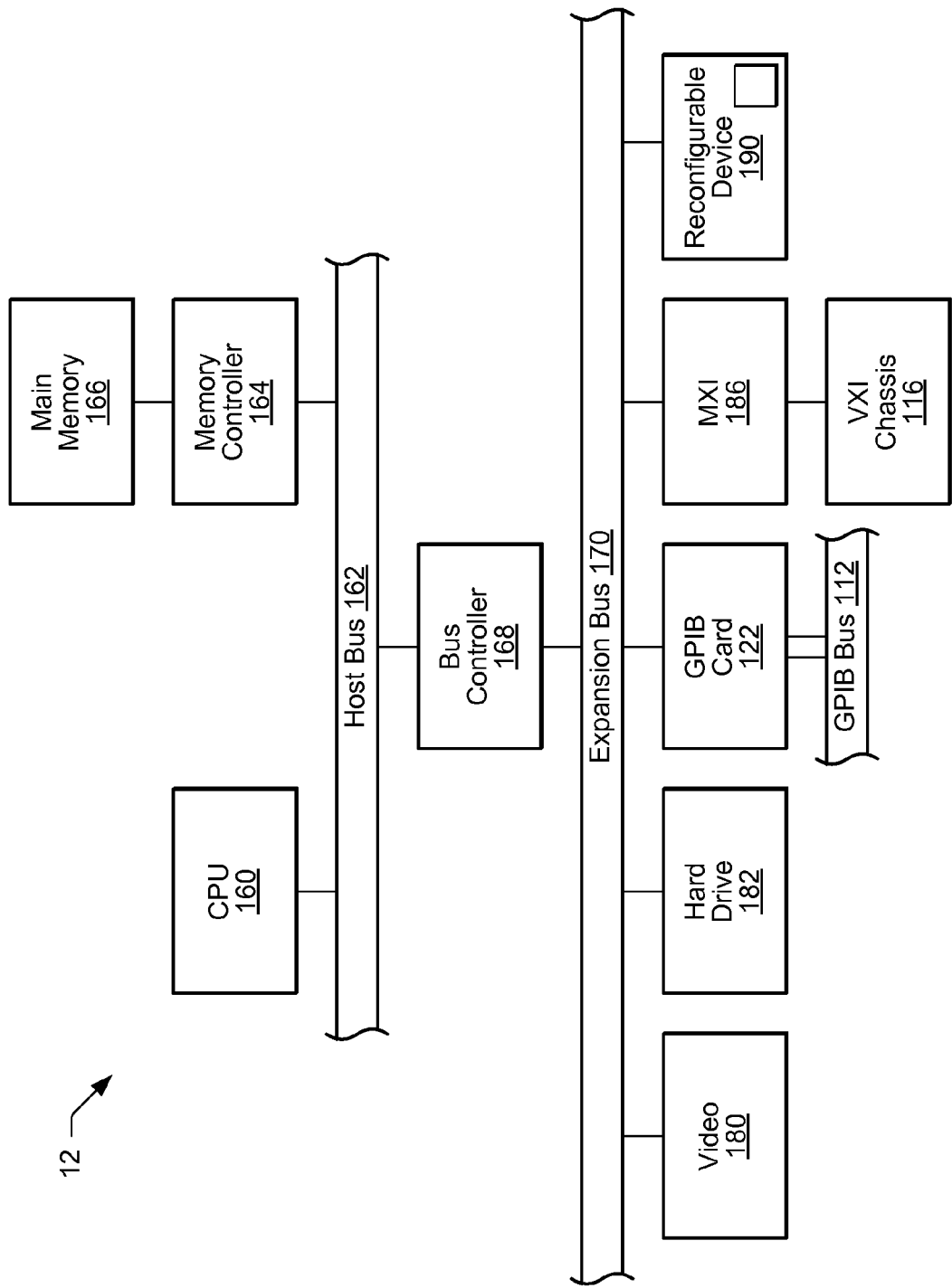
FIG. 4 is an exemplary block diagram of the computer systems of FIGS. 1A, 1B, 2A and 2B and 3B.

FIG. 4—Computer System Block Diagram

FIG. 4 is a block diagram representing one embodiment of the computer system 82 and/or 90 illustrated in FIG. 1, or computer system 82 shown in FIG. 2A or 2B. It is noted that any type of computer system configuration or architecture can be used as desired, and FIG. 4 illustrates a representative PC embodiment. It is also noted that the computer system may be a general-purpose computer system, a computer implemented on a card installed in a chassis, or other types of embodiments. Elements of a computer not necessary to understand the present description have been omitted for simplicity.

The computer may include at least one central processing unit or CPU (processor) 160 which is coupled to a processor or host bus 162. The CPU 160 may be any of various types, including an x86 processor, e.g., a Pentium class, a PowerPC processor, a CPU from the SPARC family of RISC processors, as well as others. A memory medium, typically comprising RAM and referred to as main memory, 166 is coupled to the host bus 162 by means of memory controller 164. The main memory 166 may store the graphical program operable to be distributed across multiple execution targets, as well as a development environment for creating the graphical program, and for specifying its distribution over multiple execution targets. The main memory may also store operating system software, as well as other software for operation of the computer system.

The host bus 162 may be coupled to an expansion or input/output bus 170 by means of a bus controller 168 or bus bridge logic. The expansion bus 170 may be the PCI (Peripheral Component Interconnect) expansion bus, although other bus types can be used. The expansion bus 170 includes slots for various devices such as described above. The computer 82 further comprises a video display subsystem 180 and hard drive 182 coupled to the expansion bus 170.

As shown, a device 190 may also be connected to the computer. The device 190 may include a processor and memory which may execute a real time operating system. The device 190 may also or instead comprise a programmable hardware element. The computer system may be operable to deploy a graphical program, or a portion of a graphical program, to the device 190 for execution of the graphical program on the device 190. The deployed graphical program may take the form of graphical program instructions or data structures that directly represents the graphical program. Alternatively, the deployed graphical program may take the form of text code (e.g., C code) generated from the graphical program. As another example, the deployed graphical program may take the form of compiled code generated from either the graphical program or from text code that in turn was generated from the graphical program. Below are described various embodiments of a method for specifying and implementing directed or distributed execution of a graphical program.

Figure 5A:
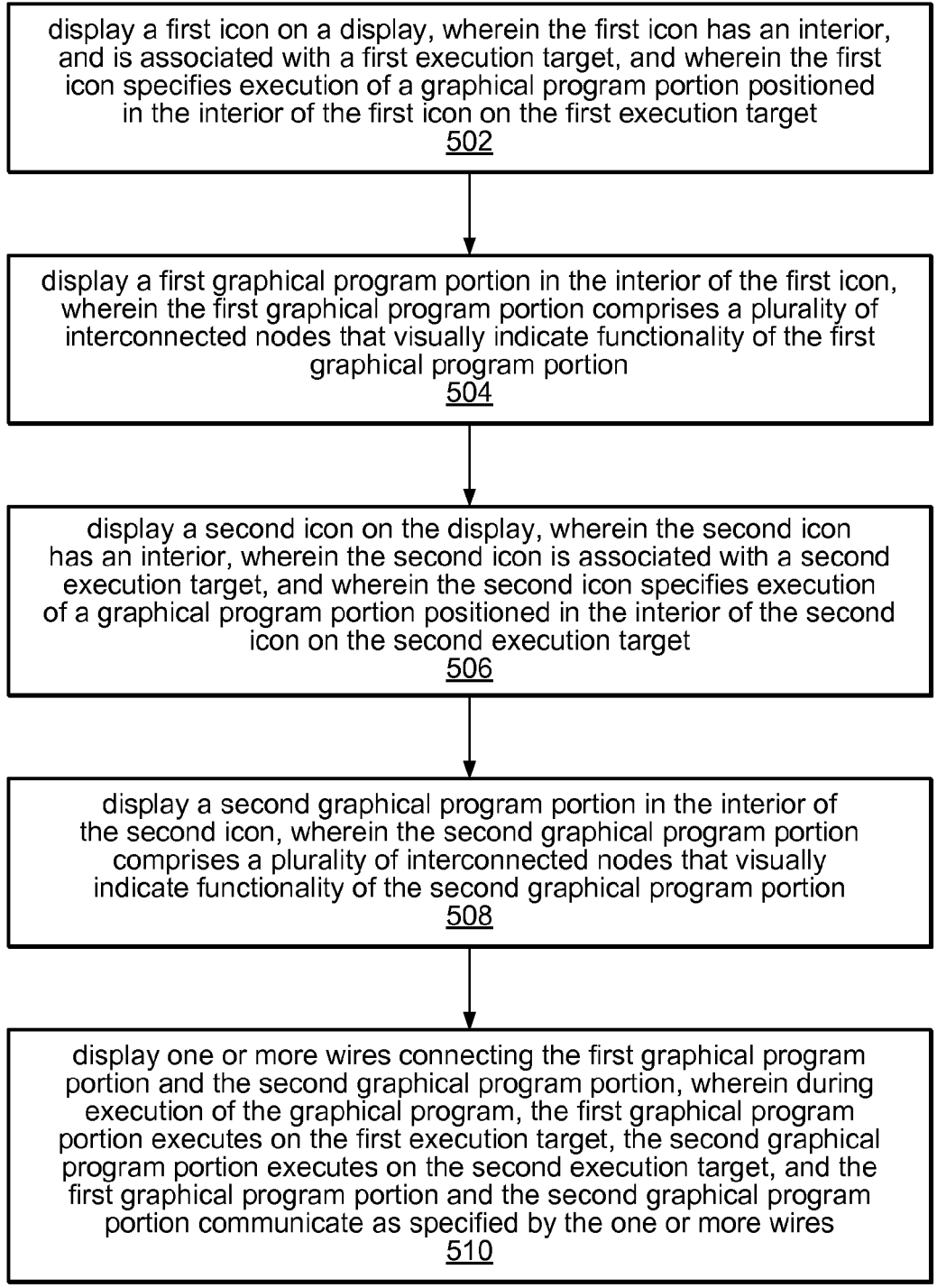
FIG. 5A is a flowchart diagram illustrating one embodiment of a method for specifying execution of graphical program portions on different targets.

FIG. 5A—Flowchart of a Method for Targeted or Distributed Execution of a Graphical Program FIG. 5A illustrates one embodiment of a method for targeted or distributed execution of a graphical program. The method shown in FIG. 5A may be used in conjunction with any of the computer systems or devices shown in the above Figures, among other devices. In various embodiments, some of the method elements shown may be performed concurrently, in a different order than shown, or may be omitted. Additional method elements may also be performed as desired. As shown, this method may operate as follows.

First, in 502, a first icon may be displayed on a display, e.g., a computer monitor. The first icon preferably has an interior, and may be associated with a first execution target, where the first icon specifies execution of a graphical program portion positioned in the interior of the second icon on the first execution target. It should be noted that in some embodiments, the icon may not be originally associated with a particular target, and may be subsequently configured with such an association, e.g., at edit time, e.g., in response to user input, or even dynamically, e.g., at runtime, as will be described in more detail below. Such icons may be referred to as execution target icons.

In one embodiment, the method may include configuring the first icon, e.g., in response to user input. Of course, any of various means may be used to configure the first icon. For example, the user may interact with a dialog box, property page, menu(s), or wizard to statically configure the first icon, e.g., the user may invoke a configuration dialog by invoking a "Configure" option (or its equivalent) on a context menu for the first icon or a configuration node, or by double-clicking on the border of the first icon or the configuration node. The user may then interact with the configuration dialog to specify information such as the execution target. In one embodiment the user may utilize the configuration dialog to specify other properties of the first icon as well, such as a name, and/or other information that may be useful for managing the first icon.

Thus, in one embodiment, configuring the first icon may include invoking a graphical user interface (GUI) with respect to the first icon, receiving user input to the GUI configuring the first icon, e.g., specifying the target for execution of any graphical code contained therein, and automatically configuring the first icon in accordance with the user input to the GUI. In various embodiments, the GUI may include one or more of: one or more dialogs, one or more property pages, one or more menus, and/or a wizard. For example, a configuration dialog or menu (or wizard) may be invoked on the first icon, e.g., via a project or environment menu or dialog invocation, which would be a static assignment of the configuration parameters. In other embodiments, the configuration may be automatic. Thus, in some embodiments, the first icon may be configured through the project in which the graphical program is developed. For example, the type and/or definition of the target may be defined in the project. In other embodiments, the icon may have a default configuration that specifies a default execution target for a graphical program portion positioned in the interior of the icon, which may be overridden as desired.

In 504, a first graphical program portion may be displayed in the interior of the first icon. The first graphical program portion may include a plurality of interconnected nodes that visually indicate functionality of the first graphical program portion. The first graphical program portion is preferably a portion of a graphical data flow program, although in other embodiments, the first graphical program portion may be of another type of flow diagram, such as a control flow, or execution flow diagram, or any other kind of graphical program, as desired.

The first graphical program portion may be created or assembled by the user arranging on a display a plurality of nodes or icons and then interconnecting the nodes to create the first graphical program portion. In response to the user assembling the first graphical program portion, data structures may be created and stored which represent the first graphical program portion. The first graphical program portion may be developed under a project (which itself may operate under a development environment), where the project is considered to reside and execute on a host system.

In an alternate embodiment, the first graphical program portion may be created by the user creating or specifying a prototype, followed by automatic or programmatic creation of the graphical program from the prototype. This functionality is described in U.S. patent application Ser. No. 09/587,682 titled "System and Method for Automatically Generating a Graphical Program to Perform an Image Processing Algorithm", which is hereby incorporated by reference in its entirety as though fully and completely set forth herein. The graphical program portion may be created in other manners, either by the user or programmatically, as desired. The graphical program portion may implement a measurement function, an automation function, or a control function, among others, as desired.

In some embodiments, the user may drag and drop the graphical program portion onto the first icon, e.g., into the interior of the first icon using a pointing device, such as a mouse. In another exemplary embodiment, the user may draw the first icon around the first graphical program portion. For example, the user may invoke a special mode, e.g., a drawing mode or equivalent, and simply draw a boundary, e.g., a polygon, circle, or free-hand border, around the first graphical program portion. In one embodiment, the user may "drag" a (rectangular) bounding box (or circle or ellipse) around the first graphical program portion. Thus, displaying the first graphical program portion in the interior of the first icon may include displaying the first graphical program portion on the display, and drawing the first icon around the first graphical program portion.

Of course, any other means for displaying the first graphical program portion within the first icon may be used as desired. For example, in one embodiment, the user may invoke a menu on the first graphical program portion and/or the first icon, and may specify inclusion of the portion in the icon via menu selection. In another embodiment, the user may invoke a wizard, where the wizard leads the user through the process via a number of dialogs, whereby the user provides input specifying the inclusion and display of the graphical program portion in the icon.

In some embodiments, this may complete the specification or implementation of the graphical program. In other words, in some embodiments, the first graphical program portion may be the complete graphical program, where the graphical program is specified for execution on the execution target associated with the first icon. In other embodiments, further icons and graphical program portions may be specified, as described below.

In 506, a second icon may be displayed on the display, where, as with the first icon, the second icon has an interior. The second icon may be associated with a second execution target, where the second icon may specify execution of a graphical program portion positioned in the interior of the second icon on the second execution target. As described above with respect to the first icon, the second icon may also be configured. As noted above, each icon may be configured statically, e.g., at edit time, and/or dynamically, i.e., at runtime. This configuration may be performed in response to user input, e.g., via a GUI at edit time or at runtime, and/or programmatically. For example, in an exemplary embodiment with programmatic configuration, the graphical program may include a first node (e.g., a configuration node) connected to the first icon, where during execution, the first icon may be configured in response to configuration information received from the first node. Note that this means that the icons, and thus, the specified execution targets, may be reconfigured dynamically during program execution.

In 508, a second graphical program portion may be displayed in the interior of the second icon, where the second graphical program portion includes a plurality of interconnected nodes that visually indicate functionality of the second graphical program portion. Note that the above descriptions of the first graphical program portion and the first icon also apply to the second graphical program portion and the second icon. In some embodiments, the first and second icons may be referred to as execution target icons or nodes, although any other names or labels may be used as desired. Each of the icons may correspond to a respective hardware device (or a portion of a hardware device) having a processing element. It should be noted that any type of execution target or platform may be designated for or by each icon, i.e., any computing elements capable of executing code may be targeted as desired. Exemplary execution targets may include, for example, CPU-based systems, programmable hardware elements, e.g., field programmable gate arrays (FPGAs), digital signal processors (DSPs), micro-controllers, etc., as well as any combinations of the above, among others. For example, a target may include one or more FPGAs and one or more DSPs that may operate in conjunction.

In 510, one or more wires connecting the first graphical program portion and the second graphical program portion may be displayed. During execution of the graphical program, the first graphical program portion may execute on the first execution target, the second graphical program portion may execute on the second execution target, and the first graphical program portion and the second graphical program portion may communicate as specified by the one or more wires. The one or more wires connecting the first graphical program portion and the second graphical program portion may include one or more wires connecting at least one node in the first graphical program portion to at least one node in the second graphical program portion, and/or, the one or more wires connecting the icons themselves to each other, e.g., where communicative connections to particular nodes in the portions may be implicit.

In various embodiments, the wires may be of any of a variety of types. For example, in some embodiments, the one or more wires connecting the first graphical program portion and the second graphical program portion may include one or more of: a timing wire, operable to specify timing information between the first graphical program portion and the second graphical program portion, or a data transfer wire, operable to transmit data between the first graphical program portion and the second graphical program portion. Thus, the wires may facilitate communication of timing information (e.g., including triggering information) and/or data between the two graphical program portions. Note that in some embodiments, the timing wires and/or the data transfer wires may be configurable, e.g., for asynchronous or buffered communication. Such wires may be referred to as buffered wires, e.g., buffered timing wires and buffered data transfer wires. For further information regarding timing wires, please see U.S. application Ser. No. 10/893,745, titled Graphically Representing Timing in a Graphical Program, which was incorporated by reference above.

The timing information may be or include a timing signal, e.g., a clock signal, and/or may include one or more data packets that include timing information or data, e.g., time stamps, delay measurements, or other timing or triggering specifiers or indicators, although any other timing information may be used as desired. This timing information may be usable to manage, synchronize or control execution of the first and second graphical program portions.

The data transfer wire(s) may facilitate or implement communication of data between the first and second graphical program portions, e.g., data produced by one graphical program portion that may be used by the other graphical program portion. In one embodiment, the data transfer wire may be or include a configurable buffered wire, that may be operable to implement or operate according to a specified protocol or specified semantics. For example, the wire may be configurable to implement data flow semantics, non-data flow semantics, asynchronous data transfer, and so forth. Additionally, the type or means of buffering for the wire may also be configurable. For example, the wire may be configurable to buffer data being transmitted via any of various data structures, such as, for example, a FIFO (first-in, first-out), a stack, tree, linked lists, arrays, etc., and so forth, as desired. Additional aspects may also be configured, e.g., maximum or minimum buffer sizes, maximum or minimum data values, rules of operation, e.g., overflow or underflow contingencies, data types allowed, etc., as desired.

In one embodiment, each of the one or more wires may have an appearance corresponding to the type of the wire. For example, in one embodiment, the data transfer wire may have a 3D tube-like appearance, although any other appearance may be used as desired. Similarly, the timing wire may have an appearance that indicates timing or triggering aspects, or that simply visually distinguishes from other wire types. In some embodiments, the directionality of a wire may also be indicated, e.g., via an arrow or multiple arrows, displayed on or near the wire, that indicates the direction of communications on the wire. In further embodiments, one or more labels displayed on or near the wire may be used to indicate an identity, type, or functionality of the wire as desired. Further information regarding such wires may be found in U.S. patent application Ser. No. 11/462,393 titled "Asynchronous Wires in a Graphical Programming System," filed Aug. 4, 2006, and U.S. Patent Application Publication No. 2007/0044030, titled "Graphical Programming Methods for Generation, Control and Routing of Digital Pulses," filed Aug. 8, 2006, and U.S. application Ser. No. 11/759,975, titled "Graphical Diagram Which Automatically Determines A Data Transport Mechanism For Wires Based On Configured Policies", which were incorporated by reference above.

In one embodiment, the method may further include executing the graphical program, including executing the first graphical program portion on the first execution target, and executing the second graphical program portion on the second execution target, where, as indicated above, the first graphical program portion and the second graphical program portion communicate as specified by the one or more wires.

Figure 5B:
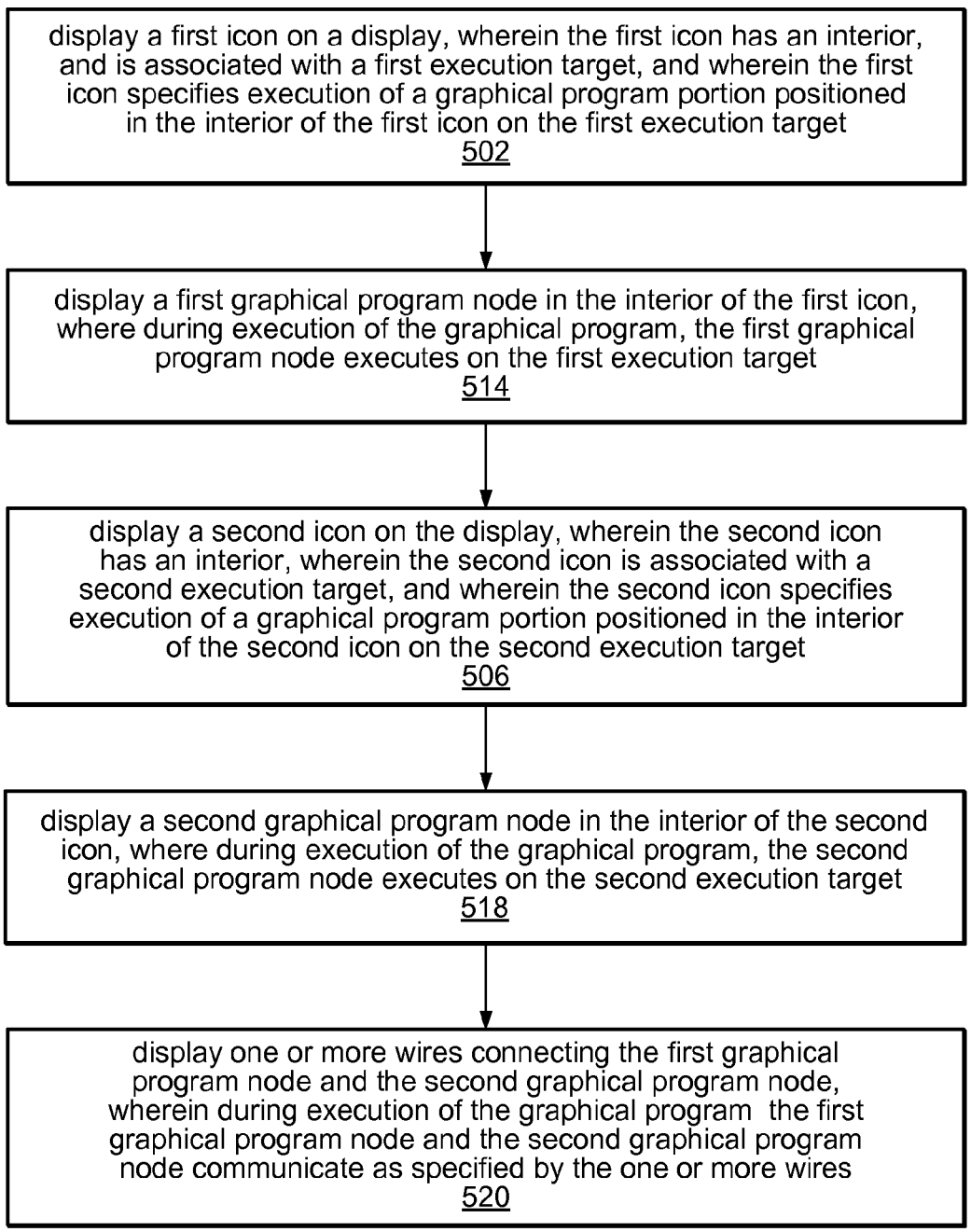
FIG. 5B is a flowchart diagram illustrating another embodiment of a method for specifying execution of graphical program portions on different targets.

FIG. 5B—Flowchart of Another Method for Targeted or Distributed Execution of a Graphical Program FIG. 5B illustrates another embodiment of a method for targeted or distributed execution of a graphical program. The method shown in FIG. 5B may be used in conjunction with any of the computer systems or devices shown in the above Figures, among other devices. In various embodiments, some of the method elements shown may be performed concurrently, in a different order than shown, or may be omitted. Additional method elements may also be performed as desired.

The primary distinction between the methods of FIGS. 5A and 5B is that in the method of FIG. 5B, rather than displaying multi-node graphical program portions in the execution target icons, single graphical program nodes are displayed in the icons. Note also that where method elements or salient details have been described previously (e.g., with reference to FIG. 5A), the descriptions have been abbreviated.

As shown, this method may operate as follows.

First, in 502, a first icon may be displayed on a display, e.g., a computer monitor, as described above with reference to FIG. 5A.

In 514, a first graphical program node may be displayed in the interior of the first icon. In some embodiments, the first graphical program node may be a sub-VI, i.e., a single node that represents a plurality of interconnected nodes that visually indicate functionality of the first graphical program portion. In one embodiment, the single node may be expanded (e.g., in response to user input) to display the represented interconnected nodes. In other embodiments, the first graphical program node may be atomic, i.e., may not represent additional nodes, and so may not be expanded.

The first graphical program node may be a complete or independent graphical program, or may be a portion of some larger graphical program. For example, the first graphical program node may be a portion of a graphical data flow program, although in other embodiments, the first graphical program portion may be of another type of flow diagram, such as a control flow, or execution flow diagram, or any other kind of graphical program, as desired.

Similar to the graphical program portions of FIG. 5A, the first graphical program node may be developed under a project (which itself may operate under a development environment), where the project is considered to reside and execute on a host system. In response to the user creating or instantiating the first graphical program node, data structures may be created and stored which represent the first graphical program node. In an alternate embodiment, the first graphical program node may be created or instantiated based on a user created or specified a prototype, followed by automatic or programmatic creation of the graphical program node from the prototype, as described above with reference to 502 of FIG. 5A. The graphical program node may be created in other manners, either by the user or programmatically, as desired. The graphical program node may implement a measurement function, an automation function, or a control function, among others, as desired.

Similar to the method of FIG. 5A, in some embodiments, the user may drag and drop the graphical program node onto the first icon, e.g., into the interior of the first icon using a pointing device, such as a mouse. In another exemplary embodiment, the user may draw the first icon around the first graphical program node. For example, the user may invoke a special mode, e.g., a drawing mode or equivalent, and simply draw a boundary, e.g., a polygon, circle, or free-hand border, around the first graphical program node. In one embodiment, the user may "drag" a (rectangular) bounding box (or circle or ellipse) around the first graphical program node. Thus, displaying the first graphical program node in the interior of the first icon may include displaying the first graphical program node on the display, and drawing the first icon around the first graphical program node.

Of course, any other means for displaying the first graphical program node within the first icon may be used as desired. For example, in one embodiment, the user may invoke a menu on the first graphical program node and/or the first icon, and may specify inclusion of the node in the icon via menu selection. In another embodiment, the user may invoke a wizard, where the wizard leads the user through the process via a number of dialogs, whereby the user provides input specifying the inclusion and display of the graphical program node in the icon.

In some embodiments, this may complete the specification or implementation of the graphical program. In other words, in some embodiments, the first graphical program node may be the complete graphical program, where the graphical program is specified for execution on the execution target associated with the first icon. In other embodiments, further icons and graphical program nodes may be specified, as described below.

In 506, a second icon may be displayed on the display, where, as with the first icon, the second icon has an interior, as described above with reference to FIG. 5A.

In 518, a second graphical program node may be displayed in the interior of the second icon, where, as with the first graphical program node, in various embodiments, the first graphical program node may be a sub-VI, or may be atomic.

Note that the above descriptions of the first graphical program node and the first icon also apply to the second graphical program node and the second icon. In some embodiments, the first and second icons may be referred to as execution target icons or nodes, although any other names or labels may be used as desired. Each of the icons may correspond to a respective hardware device (or a node of a hardware device) having a processing element. It should be noted that any type of execution target or platform may be designated for or by each icon, i.e., any computing elements capable of executing code may be targeted as desired. Exemplary execution targets may include, for example, CPU-based systems, including multi-core CPU systems, programmable hardware elements, e.g., field programmable gate arrays (FPGAs), digital signal processors (DSPs), micro-controllers, etc., as well as any combinations of the above, among others. For example, a target may include one or more FPGAs and one or more DSPs that may operate in conjunction.

In 520, one or more wires connecting the first graphical program node and the second graphical program node may be displayed. Similar to 510 above, during execution of the graphical program, the first graphical program node may execute on the first execution target, the second graphical program node may execute on the second execution target, and the first graphical program node and the second graphical program node may communicate as specified by the one or more wires. The descriptions of wires presented above in 510 apply. For example, in some embodiments, rather than connecting the two graphical program node explicitly, the one or more wires may connect the icons themselves to each other, e.g., where communicative connections to the first and second graphical program nodes may be implicit.

In one embodiment, the method may further include executing the graphical program, including executing the first graphical program node on the first execution target, and executing the second graphical program node on the second execution target, where, as indicated above, the first graphical program node and the second graphical program node communicate as specified by the one or more wires.

Thus, various embodiments of the above methods may be used for distributed execution of a graphical program.

OTHER EMBODIMENTS

In some embodiments, the displayed icons and graphical program portions may be referred to as a diagram, e.g., a system diagram. It should be noted that in some embodiments, additional icons and corresponding graphical program portions may also be included in the system diagram, as desired, where, during execution of the graphical program, each of the additional graphical program portions executes on a respective specified execution target. In some embodiments, executing the graphical program may comprise or compose executing the system diagram. In other words, in some embodiments, the system diagram, which includes both software components (e.g., graphical program nodes) and components representing hardware (the icons, e.g., execution target icons), may be an executable diagram, where, for example, execution of the system diagram invokes execution of the various graphical program portions on their respective execution targets.

Thus, in some embodiments, a diagram, e.g., a system diagram, may include a plurality of icons, where each icon may be represented as an outlined portion (e.g., as a box) with an interior portion within which a respective graphical program portion may be displayed, and which specifies execution of the respective graphical program portion on the execution target specified by or associated with the icon.

In some embodiments, each graphical program portion may or may not follow or implement data flow semantics. Note further that in some embodiments, each portion may follow data flow semantics, but the overall graphical program may or may not follow or implement data flow semantics. For example, in embodiments where two or more of the portions are connected by non-data flow wires, data flow semantics may not apply to the conjunctive execution of the portions, although each portion may (or may not) operate according to data flow semantics. In other words, in some cases, data flow semantics may apply to each graphical program portion, but may not apply between the graphical program portions. In some embodiments, the converse may also hold.

In one embodiment, a first graphical program node may be displayed in the interior of an icon, where during execution of the graphical program, the first graphical program node executes on the execution target. For example, the first graphical program node may be a sub-VI that represents a graphical program or graphical program portion (e.g., similar to a traditional sub-routine call). Alternatively, in some embodiments, the graphical program node may be truly singular or atomic, i.e., may not represent a more complex graphical program or graphical program portion, where it is desired that the functionality of the node be performed on a specific execution target. Thus, an icon may specify and implement targeted execution of a single or lone graphical program node.

However, in preferred embodiments, the system diagram includes a plurality of icons, where the interior portion(s) of the plurality of icons may indicate functionality of the hardware devices/processing elements represented by the plurality of icons. For example, as described above, each of the icons may indicate individual portions of a program (e.g., a graphical program) which may be executed by respective ones of the various hardware devices/processing elements (e.g., represented by the plurality of icons). Thus, the plurality of icons may be displayed in a system diagram and may visually indicate to the user which portions of the program may be executed by or on which execution targets.

In some embodiments, for at least a subset of the plurality of icons, the graphical program code may include a data flow diagram portion and a hardware icon portion. The hardware icon portion may include one or more icons that represent components of hardware devices. For example, the one or more icons may represent various analog/digital converters (ADCs), processing elements, configurable elements, input devices, memory mediums, FIFOs, buffers, and/or other components of the hardware device. Thus, the graphical program may visually indicate functionality of the hardware devices represented by the plurality of icons.

As also described above, in some embodiments, a timing wire connecting at least a subset of the plurality of icons (which each represent hardware device(s)) may be displayed. The timing wire may specify timing relationships of the graphical program code in the at least a subset of the plurality of icons. For example, in some embodiments, the timing wire may indicate the flow of clocking signals inside the system diagram. IN various embodiments, the timing wire may be connected to various ones of the icons representing the hardware devices or may connect directly to the inner portions of one or more of the plurality of icons. For example, a timing wire may be connected from an individual component (e.g., a clock source) displayed in the inner portion of a hardware device icon to an individual component (e.g., a memory medium used in a slave clock) of another hardware device icon. As indicated above, the hardware components of the hardware devices may be represented as hardware icons in the hardware device icons. Thus, the timing wire may specify (e.g., visually) timing relationships of the graphical program code in the plurality of icons representing hardware devices.

In some embodiments, as will be described below in more detail, graphical program code (i.e., a graphical program portion) that is not contained in an icon (e.g., an execution target icon) may be targeted for execution on a default execution target. For example, in one embodiment, such graphical program code may by default be specified for execution on the host computer, i.e., on the computer running the development environment/project. In one embodiment, this default execution target may be configured to specify some other execution target as desired.

Below are described several exemplary diagrams that illustrate various aspects of embodiments of the present invention, although it should be noted that the examples presented are meant to be exemplary only, and are not intended to limit the invention to any particular type, functionality, or appearance of the diagrams.

Example Diagrams

FIGS. 6A-9B illustrate various exemplary diagrams illustrating various features of embodiments of the present invention.

Figure 6A:
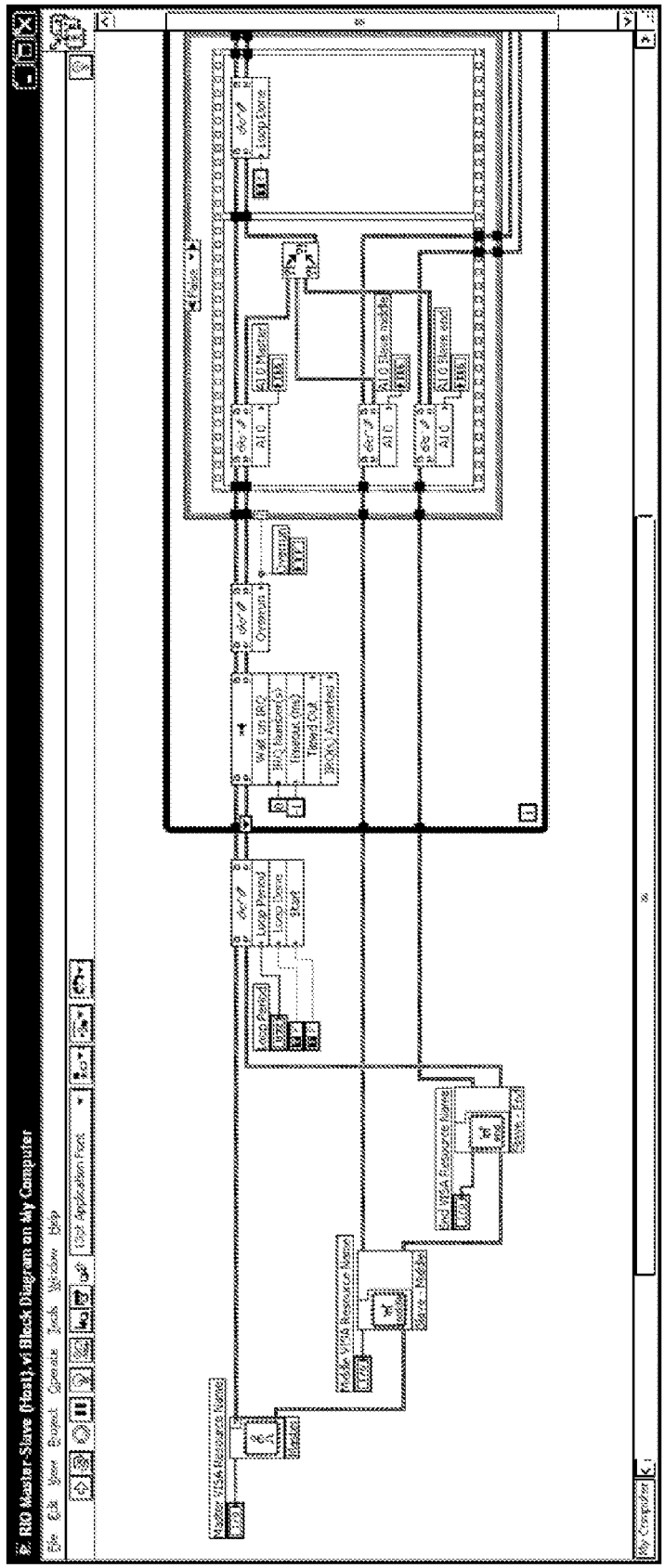
FIGS. 6A and 6B are screen shots of an exemplary graphical program according to one embodiment.
Figure 6B:
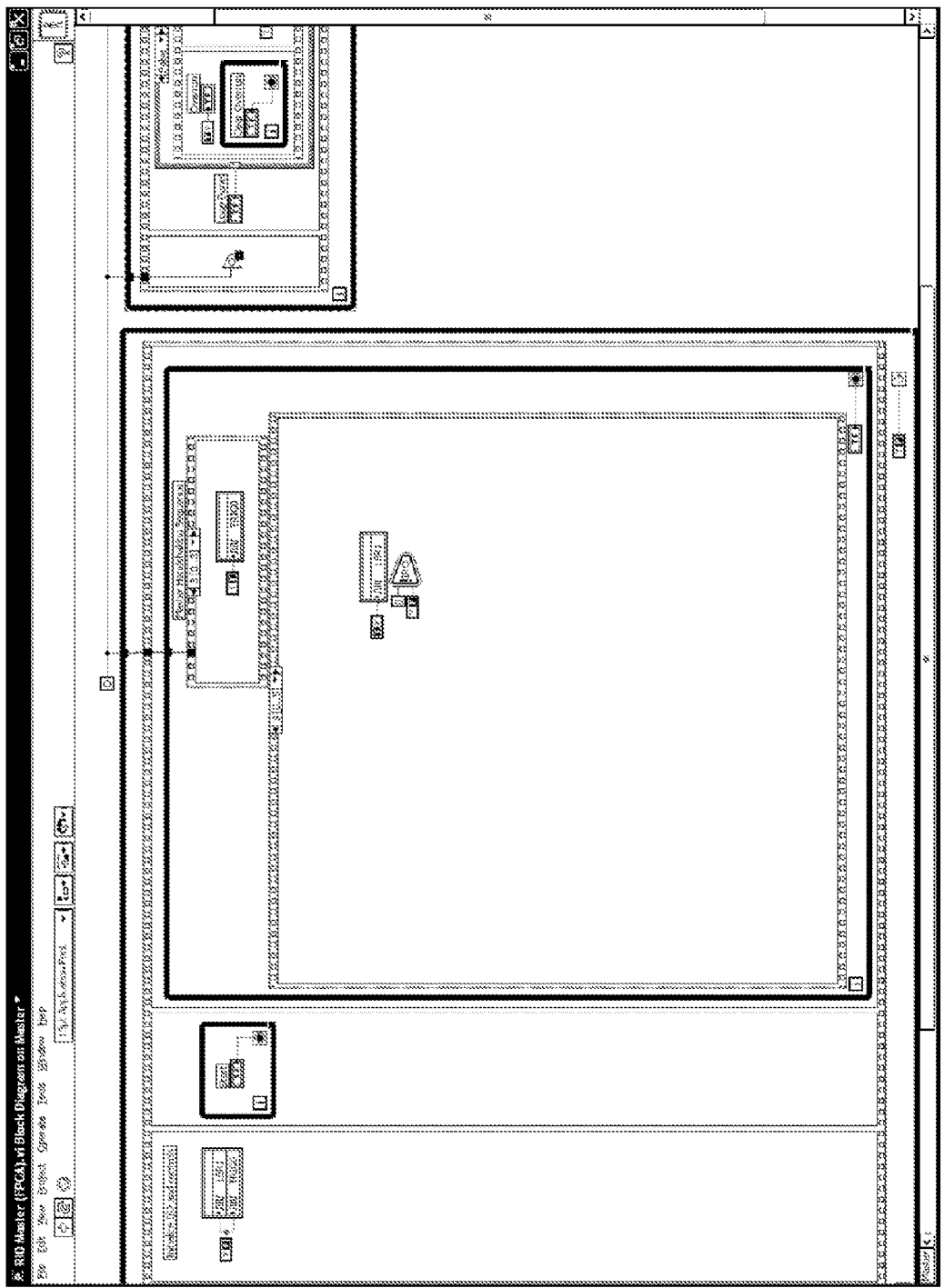

FIGS. 6A and 6B—Exemplary Graphical Programs

As described above, a graphical program may include a block diagram portion and a graphical user interface portion. In some embodiments, the graphical user interface portion may be comprised within the block diagram portion. The block diagram portion may include a plurality of interconnected nodes or icons which visually indicate functionality of the graphical program. Each of the nodes may have one or more inputs and/or outputs for accepting and/or providing data to other nodes in the graphical program. Each of the nodes in the graphical program may represent software functions or executable code. In other words, the nodes in the graphical program may represent or comprise logical elements (e.g., virtual instruments (VIs), primitives, etc.).

As also indicated above, the nodes in the graphical program may be interconnected by lines or wires which indicate that indicate that data are provided from a first node to a second node in the graphical program. In some embodiments, the wires may be connected to the terminals of nodes in the graphical program. The terminals may provide connection points for connecting the wires to a node, e.g., to individual inputs or outputs of the node. Additionally, as described herein, these wires may be configured (e.g., automatically or manually) to provide data synchronously or asynchronously using various data exchange semantics and/or data transfer mechanisms (among others). In some embodiments, wires which indicate transfer of data may be referred to as data transfer wires.

Note that references to configuration of wires (or similar remarks) may actually refer to the user providing input to the graphical representation of the wire on the display to configure the manner in which data is transferred during execution as represented by the wire. For example, configuration of a wire may actually refer to configuring software (code and/or data) represented by the wire (and/or associated icons). The configured software may then be executable to perform the specified functionality during diagram execution. In other words, during execution data transfer is performed according to the configuration of the wire. Additionally, references to the wire providing or conveying data between icons in the graphical program may actually mean that data is passed between two software entities executing on the same or different devices according to the placement of and/or configuration of the wire. Thus, the wire may indicate (e.g., visually) that data is passed among nodes in a graphical program during execution. Similar remarks apply to wires and icons in diagrams (e.g., system diagrams) described below. Additionally, further descriptions regarding configuration of wires are provided below and in various ones of the provisionals or patent applications incorporated by reference above.

Note that the wires may also be timing wires which may provide timing information (e.g., time stamps) between nodes in the graphical program. Note that in some embodiments, the timing wires may be configurable, e.g., for asynchronous or buffered communication. Such wires may be referred to as buffered timing wires or asynchronous timing wires. For further information regarding timing wires, please see U.S. application Ser. No. 10/893,745, titled Graphically Representing Timing in a Graphical Program, which was incorporated by reference above.

In some embodiments, the graphical program may include one or more structure nodes which indicate control flow among one or more nodes in the graphical program. For example, the graphical program may include a conditional structure node (e.g., to implement conditional branching, if statements, switch statements, signal routing, etc.), a looping structure node for implementing looping among one or more nodes (e.g., while loops, do while loops, for loops, etc.), and/or other control flow nodes.

Additionally, the graphical program may visually indicate where portions of the graphical program are executed. In one embodiment, the visual indication may include a rectangular box that contains a portion of graphical code. In some embodiments, this visual indication may be referred to as a target execution node or icon. The target execution node may have an interior portion where graphical program code that is targeted for execution on a device is contained. For example, a device icon that includes an interior portion that is designed to receive graphical program code may be referred to as a target execution node. Additionally, or alternatively, this node may be referred to as a execution target structure node, as described in U.S. Provisional Ser. No. 60/869,221 and incorporated by reference above. As described in this provisional application, the target execution node may include (e.g., may reference) contextual information that allows the graphical program code to be executed on a target device.

The graphical program may be created or assembled by the user arranging on a display (e.g., of the computer system 82) a plurality of nodes or icons and then interconnecting the nodes to create the graphical program. In some embodiments, the user may select icons and/or wires from various palettes shown in a development environment on the display. In response to the user assembling the graphical program, data structures may be created and stored which represent the graphical program. As noted above, the graphical program may comprise a block diagram and may also include a user interface portion or front panel portion. Where the graphical program includes a user interface portion, the user may optionally assemble the user interface on the display. As one example, the user may use the LabVIEW development environment to create the graphical program.

In an alternate embodiment, the graphical program may be created by the user creating or specifying a prototype, followed by automatic creation of the graphical program from the prototype. This functionality is described in U.S. patent application Ser. No. 09/587,682 titled "System and Method for Automatically Generating a Graphical Program to Perform an Image Processing Algorithm", which was incorporated by reference in its entirety above. Further descriptions regarding automatic creation of graphical programs can be found in U.S. Patent Application Publication No. 2001/0020291 which was also incorporated by reference above. Thus, the graphical program may be created in other manners, either manually (by the user) or automatically, as desired. The graphical program may implement a measurement function that is desired to be performed by one or more devices or instruments (e.g., indicated by target execution icons). In other embodiments, the graphical program may implement other types of functions, e.g., control, automation, simulation, and so forth, as desired.

FIGS. 6A and 6B illustrate exemplary portions of a graphical program according to one embodiment. As shown, the graphical program includes a plurality of interconnected nodes which visually indicates functionality of the graphical program.

Thus, the plurality of interconnected nodes may visually indicate functionality of the graphical program. In other words, during execution of the graphical program, the functionality represented by the plurality of interconnected nodes may be performed.

FIGS. 7A-7I—Exemplary System Diagrams

As described above, a system diagram may refer to a diagram comprising one or more device icons and graphical program code, wherein the device icons are use to specify and/or visually indicate where different portions of graphical program code are deployed/executed. A system diagram may include icons or nodes that are connected by lines or wires, e.g., device icons connected to other device icons, a first graphical code portion connected to a second graphical code portion.

In a system diagram, as described above, a first node or icon may provide data on an output and a wire may connect the output of the node to an input of a second node. Similar to descriptions above, an icon or node providing data on an output may refer to a device executing code represented by the icon or node resulting in transferal of data to between or among the software representing the nodes. Note that the program code or functions represented by the icons may be executing on one device or among a plurality of devices. For example, a first device may be executing code of the first node and a second device may be executing code of the second node, and data may be transferred between the devices as indicated by the nodes and/or wires connecting the nodes.

Thus, the icons (nodes) in the system diagram may represent logical elements such as, for example, software functions or virtual instruments. Similar to the graphical programs described above, graphical indications may be displayed on the diagram which visually indicate where code represented by the various icons execute. For example, target execution icons may visually outline one or more of the icons and indicate that software represented by those icons execute on a specified target or device. Thus, a target execution icon may include one or more icons or nodes (e.g., in the interior portion of the target execution icon) and may indicate where the one or more icons or nodes are executed. For example, where the target execution icon represents a computer system, the icons or nodes inside the target execution icon may be executed by the computer system. Note that target execution icons may be automatically populated in the system diagram based on discovery of available devices, as desired. Alternatively, the user may include target execution icons by selecting types of devices (or classes of devices) or including template target execution icons and then configuring the target execution icons.

Note that the target execution icon may be "bound" or associated with a specific device. For example, the target execution icon may refer to a single device with a known address (e.g., IP address, bus address, etc.) and that icons or nodes within the target execution icon may be executed by that specific device during execution. The user may choose the specific device by selecting the device from a list of available devices (e.g., as automatically populated or detected by the development environment). For example, the user may configure the target execution icon (e.g., as described above) to select the appropriate device. Further embodiments regarding selection of execution devices for the target execution icons are described below. Note that when a specific device is selected for the target execution icon, the target execution icon may be automatically displayed in the diagram with resources of the specific device visually represented. For example, if a specific microprocessor is selected, the available DMA channels of the processor may be automatically displayed in or on the target execution icon. For example, one or more terminals or wires may be displayed connected to or on the target execution icon which indicate the available DMA channels of the processor. Alternatively, or additionally, the resources of the execution device may be displayed in a palette, and the user may select and associate the resources with nodes in the target execution icon. The palette may indicate whether the resources are available (e.g., by being present or active) or not available (e.g., by not being present or being "greyed out" (or otherwise indicated)).

However, in some embodiments, the target execution icon may be bound or associated with a class of devices. For example, the target execution icon may be associated with any type of processing element available, e.g., during deployment, or for a specific class of devices, e.g., embedded systems or programmable hardware elements (among others). In some embodiments, the target execution icon may be configured to automatically choose a type of device during deployment or prior to run time based on the available devices to the system. Thus, the target execution icons may be associated with specific devices or classes of devices, as desired.

Note that priorities may be assigned or configured into the target execution icon such that the nodes are deployed and run on available devices according to the priority. In one embodiment, the user may be able to assign the priorities to different types of devices when the selection occurs. For example, the user may have a portion of code that is specified to be run on some device that is to be determined at run time or deploy time. The user may then assign a priority for selection of the devices or processing elements to execute or implement the code. For example, the priority may specify execution of the code by a processor, DSP, or FGPA (in this case, in that order), which means the code should be executed on a processor if available first, a DSP if the processor isn't available, or in the last case, an FPGA. Note that the code may also be executed on any available device if none of the processing elements selected are available. In some embodiments, priorities may be assigned among the priorities of the target execution icons, such that if two target execution icons both have a processor at the top of their respective priorities and only one processor is available, the target execution icon with the highest priority may deploy on the available processor. Note that any of a variety of schemes for selecting available processing elements (for a single execution target icon or among a plurality of execution target icons) may be used.

Note that in some embodiments, one or more icons or nodes may be displayed outside of target execution icons. In such embodiments, the one or more icons or nodes may be executed by a default device, system, and/or processing element. For example, nodes outside of any target execution icons (or nodes/software functions not associated with target execution icons) may be executed by a controlling computer system or other processing element. The default processing element may be referred to as the implicit context or execution device of the diagram, whereas target execution icons explicitly define the context or execution device for nodes associated therewith.

In system diagrams, the icon or node providing data may refer to devices (such as processing elements and configurable elements) transferring data according to configurations of the wire and/or icons. Thus, the icons may represent devices and the wire may indicate that the devices are configured to operate to provide data as indicated by the wires and/or icons in the system diagram. Thus, the wire may visually indicate that data from the first node is provided to the second node (e.g., the device(s) executing the first and second nodes). Similar to above, the wire may be configured using various methods described herein.

As indicated above, the system diagram may include icons which represent devices of the system diagram (virtual or physically present, as desired). In one embodiment, the system diagram may include icons which represent configurable devices. In such embodiments, similar to target execution icons, the configurable devices may be represented by a configurable device icon which may have associated graphical code, e.g., displayed in an interior portion of the configurable device icon. The graphical code inside the configurable device icon may indicate how the device should be configured, e.g., during deployment or execution of the system diagram.

The graphical code in the configurable device icon may only include resources of the configurable device, e.g., available clocks, analog/digital converters, memory, etc. However, the configurable device may also include other code for specifying the configuration of the device, e.g., software functions, nodes, etc. In one embodiment, the graphical code in the configurable device may also allow for other custom logic, e.g., for determining how to configure the configurable device or for deploying the configuration on the configurable device. When a specific configurable device is selected or specified in the system diagram, the configurable device icon may be automatically displayed in the system diagram. The configurable device icon may be displayed with all of the resources that are available already inside the interior portion of the configurable device icon. Alternatively, or additionally, a palette of available resources may be used (e.g., by the user) during configuration or specification of graphical code of the configurable device. Note that a configurable device may include a processing element. Correspondingly, the configurable device icon may include an execution icon within the configurable device icon indicating that the code is executed on the particular processing device of the configurable device. Other hierarchies are envisioned.

Thus, as noted above, the system diagram may also include icons which represent various devices, e.g., configurable or processing elements. In some embodiments, priorities or ordering may be assigned (e.g., by the user) among the various devices in the system diagram for various processes. For example, the order of deployment (e.g., of graphical code or configuration information), starting executing, stopping execution, committing various changes or values, or other processes may be ordered. For example, a user may stipulate that a first device be deployed with code for a master clock before a second device is deployed with code for receiving the clock signals. In the same system, the user may stipulate that the second device start executing before the first device in order to ensure that the second device begin receiving signals at a known time (e.g., the first transmission of the clock from the first device). These orders or priorities may be assigned by invoking configuration dialogs for the execution/configuration icons or by specifying the order graphically, e.g., by connected wires to dialogs displayed on or in the icons.

In one embodiment, configuration of the execution/configuration icons may be performed by code associated with one or more configuration or execution target icons in the system diagram. For example, the graphical code or configuration of a first icon may be used to (possibly automatically) configure a second icon in the system diagram. As a specific example, the user may specify graphical code in a first execution icon which, when connected with a second execution icon in the system diagram, may specify an execution order, deployment order, beginning or ending of execution, or any other configurations as desired. Similar remarks apply to configurations of a first icon to configure a second icon in the system diagram. Thus, the orders or priorities (or other configurations) may be assigned via various methods.

In some embodiments, the devices represented in the system (e.g., processing elements, configurable elements, and/or other devices) may be physically present in the system or may be virtual (e.g., the devices may be simulated during execution of the system diagram) as desired. Additionally, these devices may operate according to the functionality visually represented by the icons in the system diagram which represent the devices. Note that the virtual devices of the system diagram may have an underlying model which is usable (e.g., executable) to simulate behavior of a real device corresponding to the virtual device. For example, the underlying model may be a graphical program or other executable code. Alternatively, or additionally, the virtual devices may represent devices that are desired and/or required for the system (e.g., according to user input).

Additionally, as described above regarding graphical programs, one or more GUIs may be associated with the system diagram (e.g., logical or physical components of the system diagram) which may be used during execution of the system diagram. In some embodiments, the GUI(s) may be associated with the graphical program portions that are executed by the various processing elements/devices. Thus, the GUI(s) may act as a front panel to the system diagram during execution (e.g., for receiving user input and displaying information regarding various variables, functions, devices, and/or sensors (among others) that execute or operate during execution of the system diagram).

Thus, the system diagram may allow for a logical view of a system as well as indications regarding execution targets of code represented in the system diagram. Further, in some embodiments, the system diagram may also indicate physical layouts of the system (e.g., physical connectivity as well as indications regarding execution of the logical elements of the diagram). In primary embodiments, the system diagram at least includes interconnected icons representing software (e.g., graphical program code) and one or more graphical indications (e.g., target execution icons) which indicate where these logical elements execute.

Similar to the descriptions above regarding assembly of a graphical program, system diagrams may be assembled manually (e.g., where the user selects icons and connects the icons using wires) or automatically (e.g., in response to user input specifying a desired functionality), as desired. Thus, a system diagram may be assembled manually or automatically and may include logical elements, processing elements, and/or configurable elements, as desired.

Figure 7A:
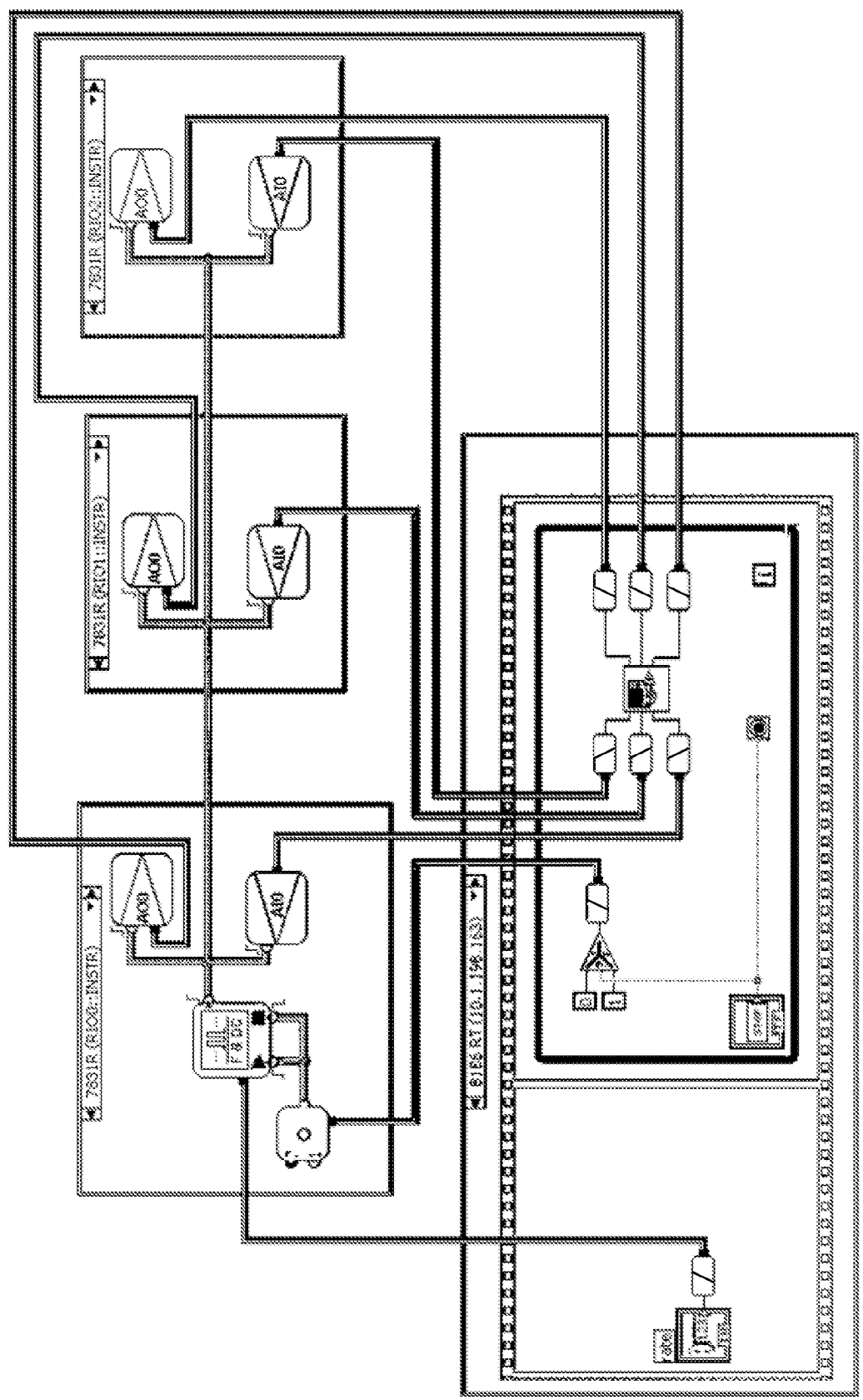
FIG. 7A is a screen shot of an exemplary system diagram which corresponds to FIGS. 6A and 6B.

As shown, FIGS. 7A-7H illustrate exemplary system diagrams according to one embodiment. More specifically, FIG. 7A illustrates an exemplary system diagram which corresponds to the portions of the graphical program shown in FIGS. 6A and 6B. As shown, FIG. 7A includes a plurality of interconnected icons which visually indicate functionality of the system diagram. Additionally, the system diagram of FIG. 7A includes target execution icons which indicate where portions of the graphical program are executed.

Figure 7B:
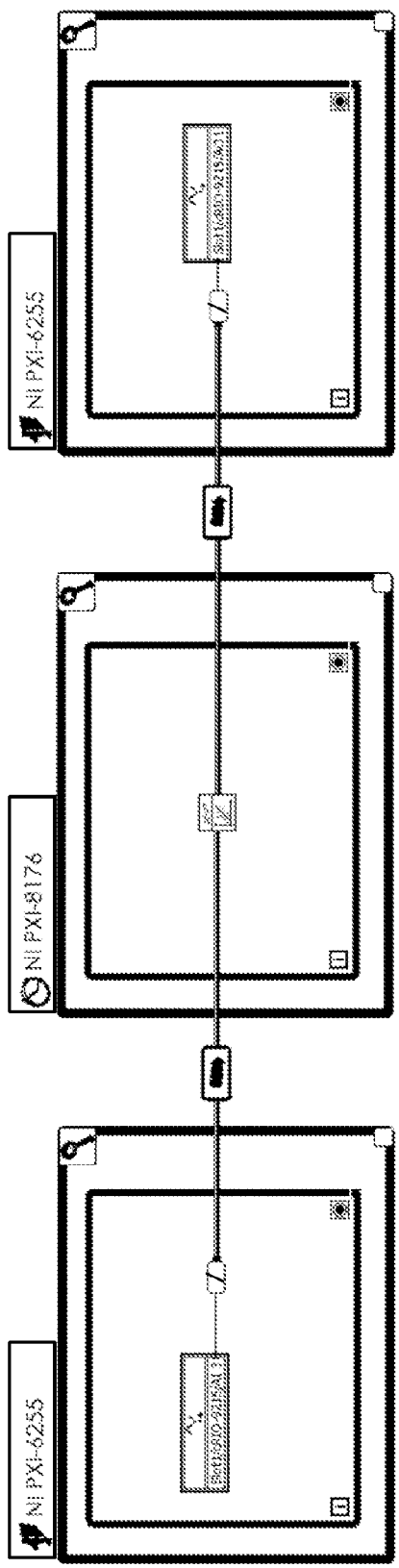
FIGS. 7B-7E are screen shots of an exemplary system diagram according to one embodiment.
Figure 7C:
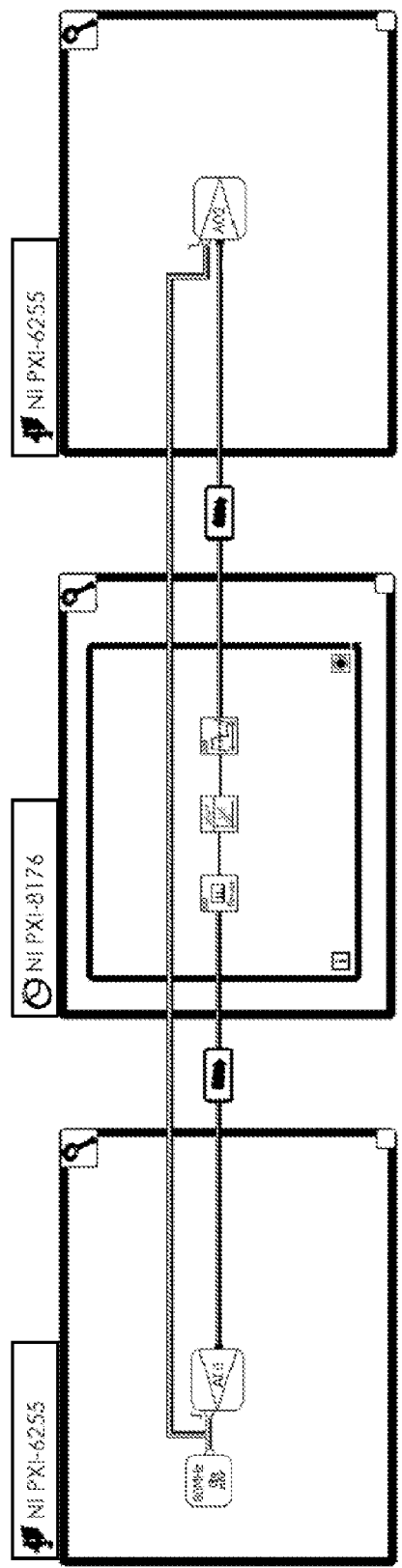
Figure 7D:
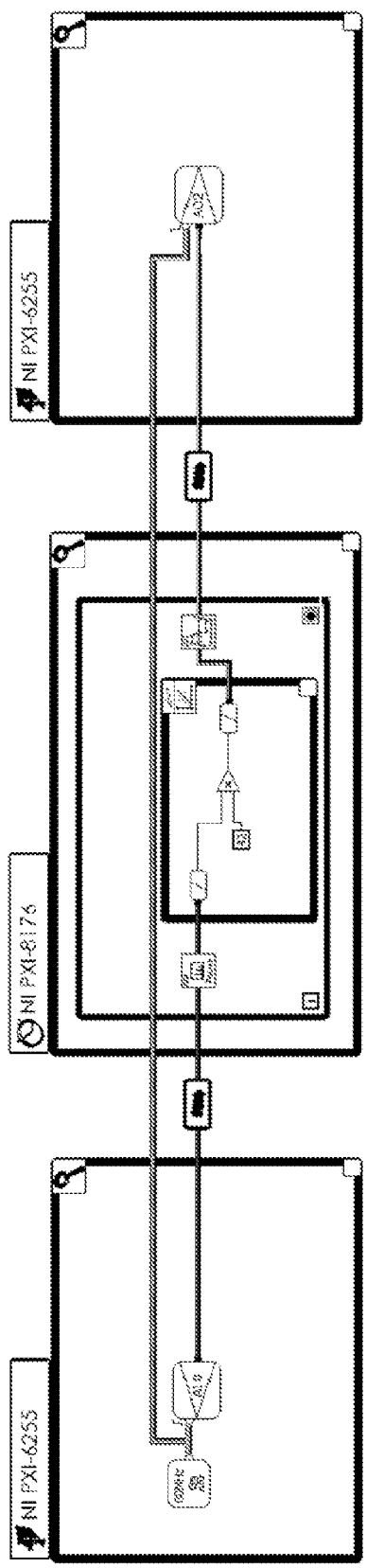
Figure 7E:
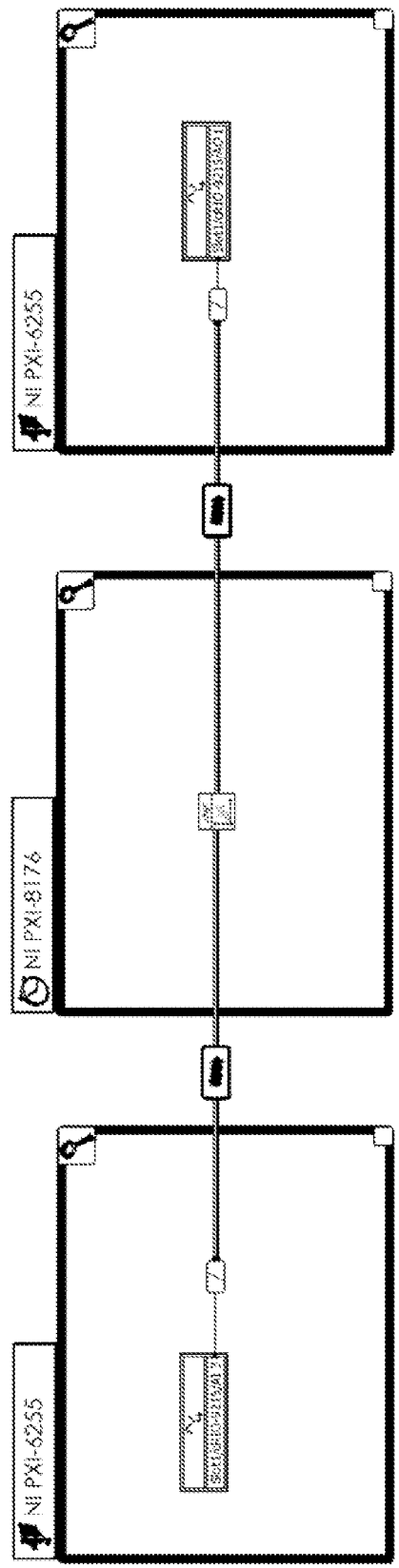

FIG. 7B illustrates an exemplary system diagram with two configurable device icons (representing the same device, NI PXI-6255) are connected to a target execution icon (representing the execution device, NI PXI-8176). As shown, each target execution icon/configurable device icon includes a single node (except for the icon in NI PXI-8176 which is displayed inside a while structure), and where the icons are interconnected by lines. The icon in each target execution icon may represent a plurality of icons which may be interconnected (e.g., the icon of the execution icon may be a VI or sub-VI). FIG. 7C illustrates an exemplary system diagram where the icons of the target execution icons are expanded, and where the ADC's in the NI PXI-6255 are connected by timing wires, and FIG. 7D illustrates an exemplary system diagram where a further sub-VI is expanded. FIG. 7E illustrates an exemplary system diagram where each target execution icon includes a single node, which, similar to FIG. 7B, may represent a plurality of icons that may be interconnected (e.g., the icon of the execution icon may be a VI or sub-VI).

More specifically, FIGS. 7B-7E illustrate system diagrams where a first device (NI PXI-6255) stores a first portion of a graphical program that represents configuration of the device for communication with a second device (NI PXI-8176). In these cases, the second device then provides data (during execution) back to the first device. Thus, FIGS. 7B-7E show both physical and logical relationships among graphical program portions executing on two devices.

Figure 7F:
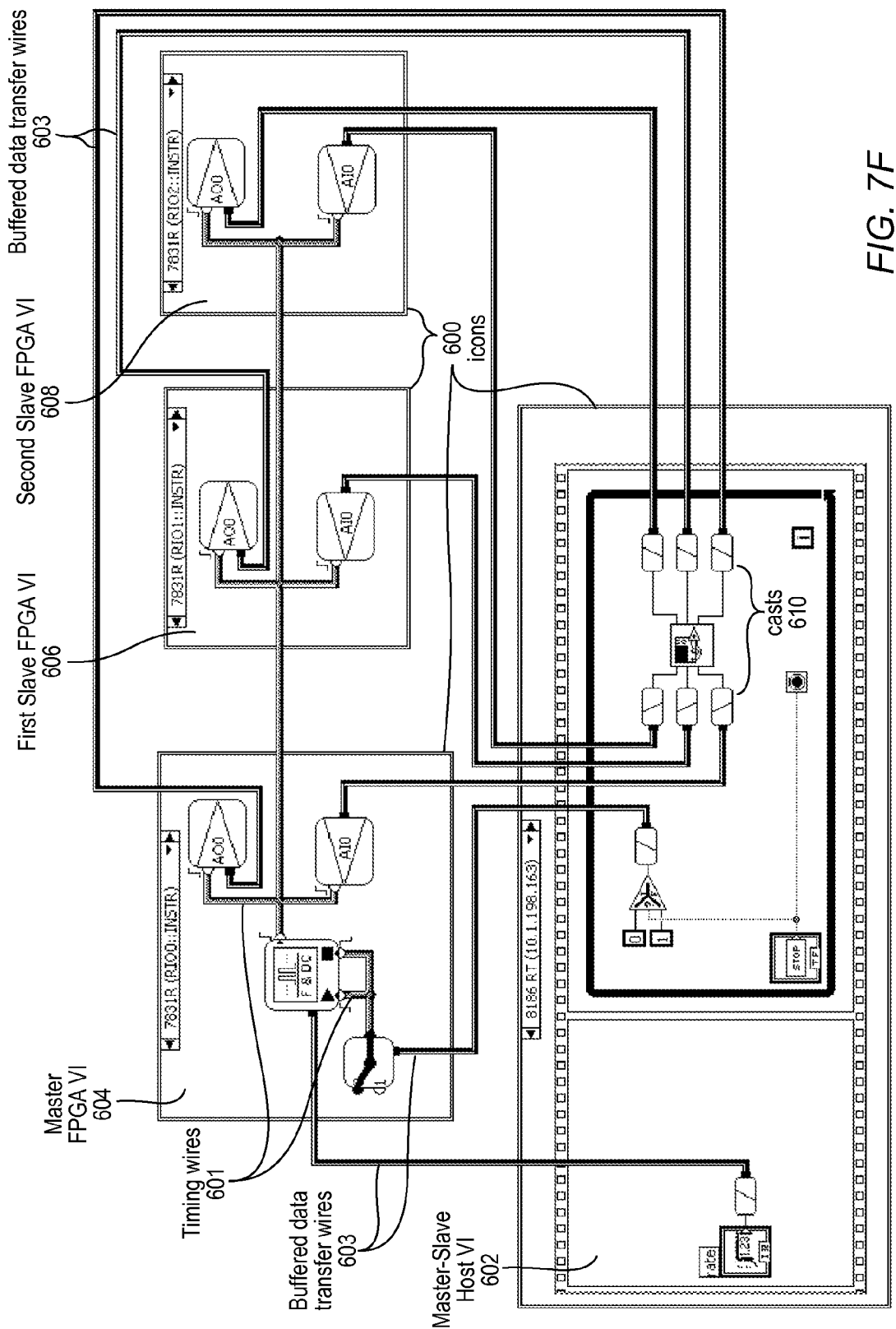
FIG. 7F illustrates an exemplary system diagram with icons specifying execution of graphical program portions on respective execution targets, according to one embodiment.

FIG. 7F is an example system diagram directed to a system that includes four different execution targets, specifically, a host computer and three FPGAs. Each of these targets is represented by a respective icon 600 (e.g., an execution target icon) that contains a respective graphical program or graphical program portion, in this embodiment, written in "G", the graphical programming language of the LabVIEW graphical development environment provided by National Instruments Corporation, and referred to as a virtual instruments (VI), although it should be noted that the "G" used may be an extended version in accordance with the techniques and features disclosed herein.

As FIG. 7F indicates, a Master-Slave Host VI 602 is shown targeted for execution on host computer (e.g., controller) "8186 RT (10.1.198.163)", as the lower "box" or icon is labeled. This host computer preferably executes a real time execution engine, such as LabVIEW RT, as the "RT" indicates. The Master-Slave Host VI is coupled to respective VIs targeted for execution on respective DAQ boards, specifically, R-Series DAQ boards, as provided by National Instruments Corporation. These three VIs are shown contained in respective icons (e.g., execution target icons), where the icon labeled "7831R (RIO0::INSTR)" contains a Master FPGA VI 604, "7831R (RIO1::INSTR)" contains a first Slave FPGA VI 606, and "7831R (RIO2::INSTR)" contains a second Slave FPGA VI 608. Thus, the icons (e.g., execution target icons) may partition the diagram into regions or portions with targeted execution.

In an exemplary application, the host process (the Master-Slave Host VI executing on host computer "8186 RT (10.1.198.163)") controls performance of data acquisition operations (reads/writes) by the three DAQ boards executing their respective VIs, e.g., stimulating and capturing responses from three units under test (UUT). In one exemplary embodiment, the execution targets may be implemented on respective PXI cards in a PXI chassis, although other implementations may be used as desired.

As FIG. 7F indicates, the Master-Slave Host VI specifies a clock rate via the leftmost node labeled "rate", and sends this rate via a buffered data transfer wire 603 to a clock node in the Master FPGA VI (in "7831R (RIO0::INSTR)"), labeled "F & DC", which operates to generate and send a logical or Boolean clock signal (a sequence of T/F values) to respective Analog Input and Analog Output nodes in 7831R (RIO0::INSTR)", "7831R (RIO1::INSTR)", and "7831R (RIO2::INSTR)", where the Analog Input nodes are each labeled "AI0", and the Analog Output nodes are each labeled "AO0". Note that on/off control of this clock signal generation is via a switch node (shown just below and to the left of the clock node, which is itself controlled by the Master-Slave Host VI, as may be seen. As FIG. 7F shows, timing wires 601 connect the clock node to the switch node and to the Analog Input and Output nodes.

As FIG. 7F further shows, each of the Analog Input and Analog Output nodes is triggered on a rising edge of the clock signal, as indicated by rising signal edges displayed near the terminals of the nodes. On each rising edge of the clock signal, each Analog Output node may operate to receive a value from the Master-Slave Host VI and generate a corresponding analog signal that may, for example, be provided to a respective UUT. As may be seen, the Analog Output nodes are each coupled via a buffered data transfer wire 603 to a node, e.g., a function or analysis node, referred to simply as a function node for brevity, positioned in a while loop in the Master-Slave Host VI, where these three wires exit the VI on the right. Note that the while loop determines the rate that new data values are supplied to the Analog Output nodes (by the function node). The times when the Analog Output nodes consume this data and generate voltages corresponding to these data are controlled by the timing wire. If the time comes to consume a value and none is there, the Analog Output node may not produce a new voltage but rather may retain its previous output state.

Also on this rising edge of the clock signal, each Analog Input node may receive an analog signal, e.g., from the UUT, digitize the signal, and send the value (or values) to the Master-Slave Host VI. Similar to the Analog Output nodes, each Analog Input node is coupled to the function node via a respective wire, where, as may be seen, the wires enter from the top of the VI and couple to the node from the left.

Thus, the function node may both control signals to be provided to the UUTs and receive (and possibly process and/or analyze) signals returned from the UUTs.

Note the (six) intervening lozenge-shaped elements 610 coupling the wires to the function node. These elements, which may be referred to as "semantic casts" or simply "casts", may operate as interfaces between nodes that operate in accordance with data flow semantics and wires that do not operate in accordance with data flow semantics. For example, in the system diagram of FIG. 7F, the wires connecting the Analog I/O nodes to the function node are buffered data transfer wires, where data placed on the wire may be stored in a temporary data structure, e.g., a FIFO, before being read from the wire. Thus, the data on or in the wire is buffered. This is in direct contrast to data flow wires, where the data placed on a wire in one cycle must be consumed (read) that same cycle. These casts may be configured to implement specified rules governing reads and writes of data on the wires. For example, in the case that the buffered data transfer wires use FIFOs, in the case where a FIFO is empty, the function node may be prevented from attempting to read from the wire, and so the cast may impose the rule that when a FIFO is empty, the while loop containing the function node may be halted until data are available again, although it should be noted that is but one example of such a rule.

In the prior art approach to executing these distributed VIs in conjunction, a handshaking sequence is used that begins with the right-most (end) slave process (executing on the execution target labeled "7831R (RIO2::INSTR)" telling its neighbor process on the left (middle slave, executing on the execution target labeled "7831R (RIO1::INSTR)") that it is done, followed by the middle slave process telling its master (on its left, executing on the execution target labeled "7831R (RIO0::INSTR)") that it's done. This 'I'm done' sequence is used to prevent the master from interrupting the host before all the FPGA targets are finished.

The handshaking (e.g., I'm done) sequence is followed by a reverse path where the master process tells the middle process and the middle process tells the end process to prepare for another sample. The bottom process, executing on the execution target labeled "8186 RT (10.1.198.163)", is the host process, and the execution target is a host controller or computer running a real-time execution engine. This 'prepare for the next one' sequence is used so that the next sequence isn't begun until the host has read all the data.

However, the use of buffered data transfer wires (with specified data transfer semantics) obviates the 'I'm done' sequence described above because the enforced semantics prevent data from being read until the data arrives. The use of buffered data transfer wires similarly obviates the above 'get ready for the next one' sequence because the enforced semantics prevents data from being overwritten before it is read. Thus, the use of buffered data transfer wires to communicate between graphical program portions executing on respective execution targets may simplify the coordination of such distributed execution, e.g., particularly when portions of a graphical program that operate according to data flow semantics operate conjunctively in a non-data flow manner. Note that the timing and buffered data flow wires used in the present invention may serve to decouple the graphical program portions both temporally and spatially, thus facilitating such distributed execution of graphical programs.

Figure 7G:
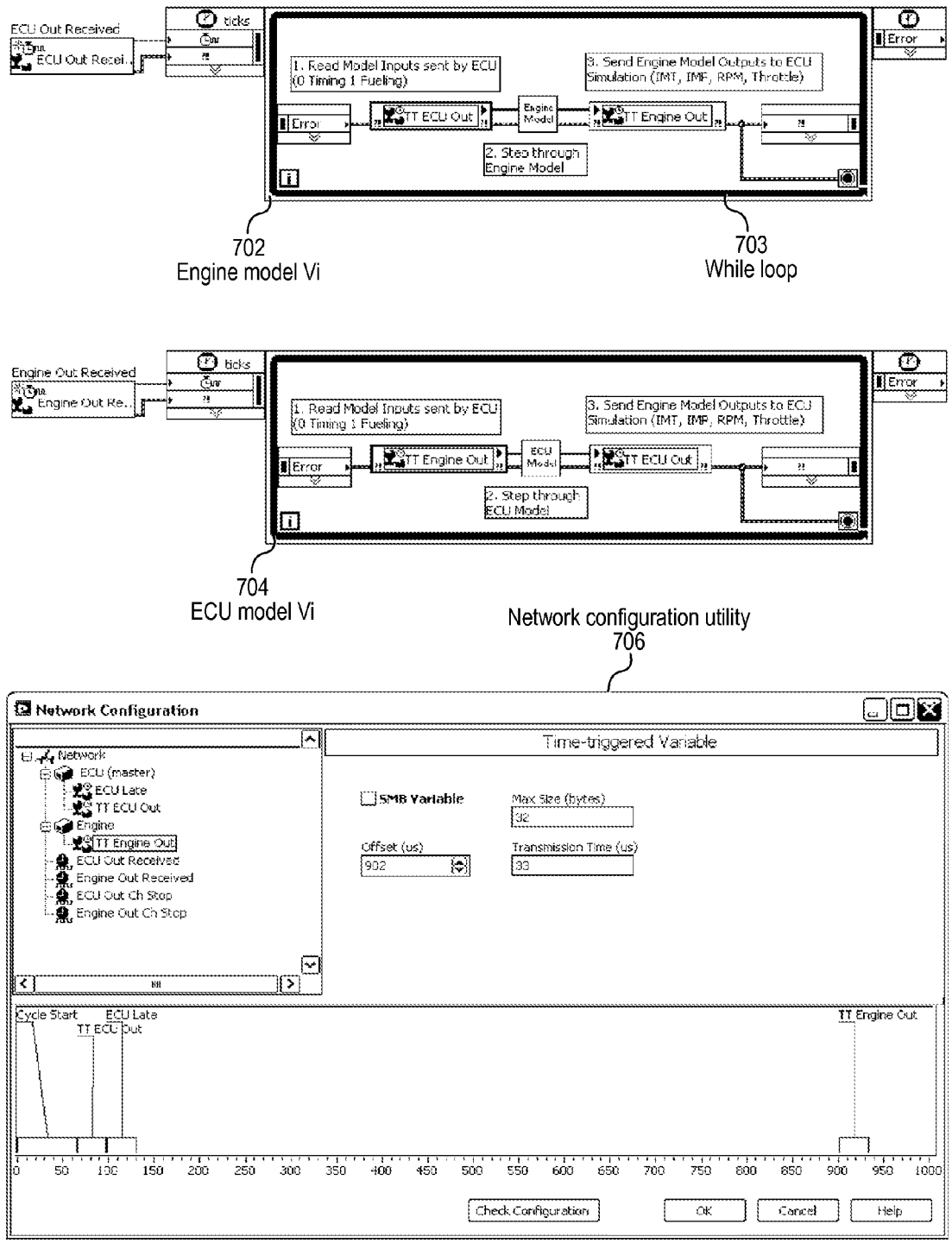
FIG. 7G illustrates an exemplary graphical program with distributed execution, according to the prior art.
Figure 7H:
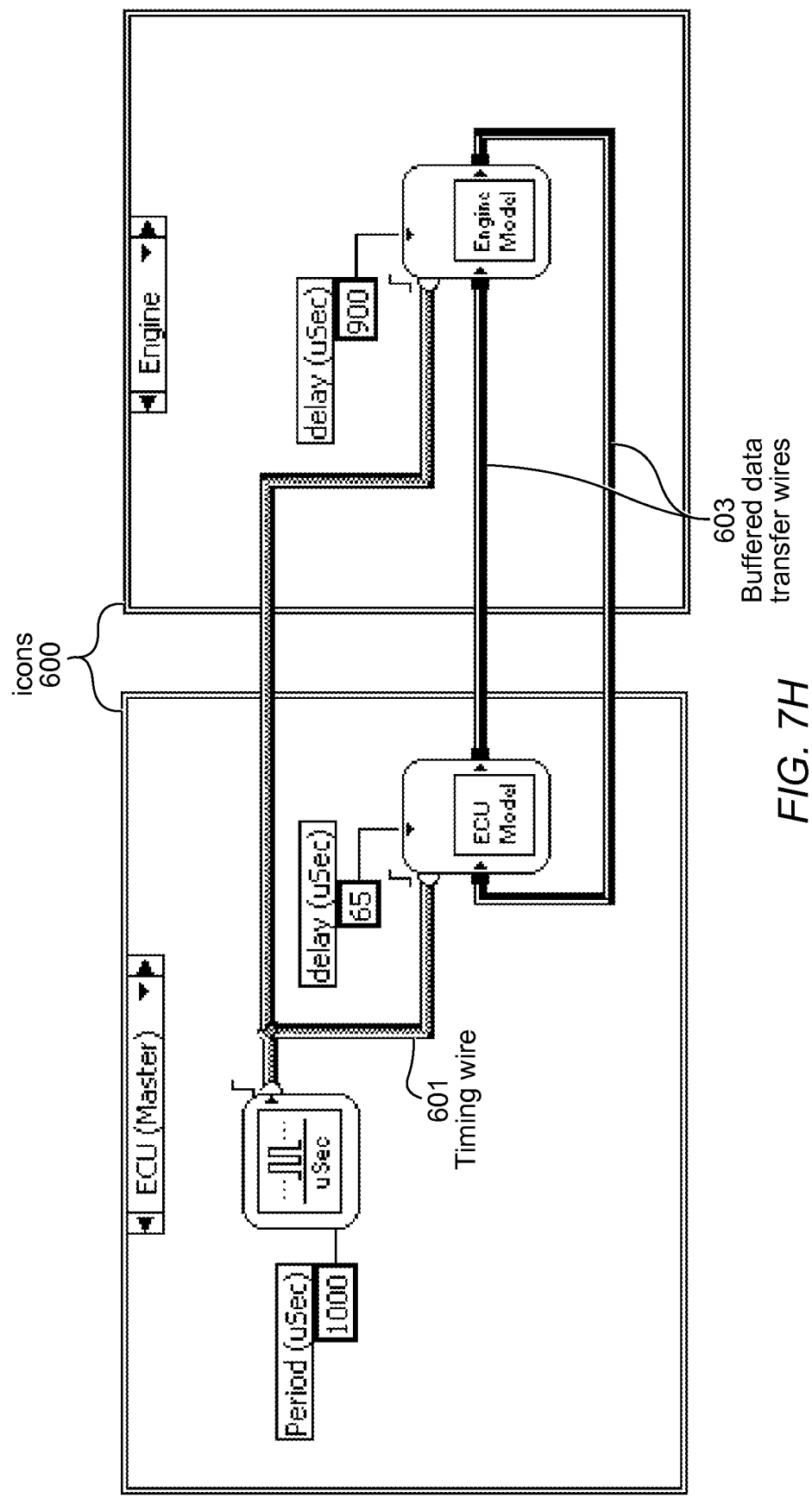
FIG. 7H illustrates an exemplary system diagram that specifies distributed execution of a graphical program, according to one embodiment of the present invention.

FIGS. 7G and 7H illustrate another exemplary application that demonstrates aspects of some embodiments of the present invention. More specifically, the application is directed to running a model of an internal combustion engine on one execution target, and a model of an Engine Control Unit (ECU) on another execution target.

FIG. 7G illustrates a prior art approach, where each model is implemented by a separate graphical program or VI, and where communication between the VIs is implemented via a time-triggered network, which provides deterministic communication between RT targets over an Ethernet connection with 'loop rates' from 100 ms down to 100 us (microseconds), and synchronization between execution targets to within +/−5 us. A time-triggered network may use a second Ethernet adapter in each execution target to create a private network. As FIG. 7G shows, an engine model VI 702 includes an engine model node, labeled "Engine Model", that represents or interfaces with an engine model, positioned inside a while loop 703 (rectangular arrow that surrounds the elements in the VI). Below this VI is shown an ECU (engine control unit) model VI 704, that includes an ECU model node, labeled "ECU Model", that represents or interfaces with an engine control unit model, also positioned inside a while loop. As may be seen, each of these VIs is coupled to a respective timed network interface, labeled "ECU Out Received" and "Engine Out Received", respectively, whereby the VIs may communicate with one another.

The configuration and programming of this network involves using a scheduling tool, e.g., a network configuration utility, as well as creating time-triggered variables and timing sources. FIG. 7G illustrates a network configuration utility 706 (below the two VIs), whereby communications between the two VIs may be configured via a timed network.

This prior art approach to distributed execution of graphical programs may be complex, difficult, and ungainly, given the numerous separate components whose configuration and operation must be managed.

FIG. 7H is an example system diagram that is directed to such distributed modeling according to one embodiment of the present invention. More specifically, the system diagram of FIG. 7H specifies or implements a system where respective models are targeted for respective execution on two execution targets, as specified by respective icons 600 (e.g., execution target icons) labeled "ECU (Master)" and "Engine".

As may be seen, the ECU (Master) icon contains a clock node, labeled uSec and displaying a clock signal symbol, which is configured to generate clock signals with a period of 1000 us (microseconds), and which may provide the clock signals to an ECU Model node, so labeled, via a timing wire (with a specified delay of 65 us) 601. The ECU Model node represents or includes an ECU model that simulates or emulates an engine control unit, e.g., for controlling an engine. The clock node represents the time-triggered network as a clock source and is used to configure the network to produce the desired cycle time. One benefit of this approach is that it may make mapping the application to another communications topology easier, i.e., modifying the application to execute on a different physical system or infrastructure than a time-triggered network. For example, one may wish to execute the application on two R Series cards plugged into the same PCI bus, or on two computers connected by an ordinary network. As another example, one may wish to run the ECU model on one core and the Engine Model on another core of a dual core CPU. Since the time-triggered app in the prior art example of FIG. 7G is so specific to running on a time-triggered network, to run that app on these other topologies, with the same timing, would require discarding most if not all of the original program and writing another one. In contrast, using the approach described herein, only the clock node has to be remapped.

As FIG. 7H also shows, the Engine icon includes an Engine Model node, so labeled, that represents or includes an engine model that simulates or emulates an engine, e.g., an internal combustion engine. Note that the clock node in the ECU (Master) icon is also coupled to the Engine Model node via a timing wire 601. The ECU Model node and the Engine Model node are connected via two buffered data transfer wires 603, thus forming a feedback loop, where the ECU Model node provides input to the Engine Model node, and the Engine Model node's output is provided back to the ECU Model node as input.

In some embodiments, the ECU Model node and the Engine Model node may each inherently provide the functionality of the semantic casts mentioned above with reference to FIG. 7F. Such nodes may be referred to as "harness" nodes, or simply as "harnesses". These nodes may thus serve as interfaces between the functional code contained within, e.g., the ECU model and the engine model, which may follow data flow semantics, and the wires connected to the nodes, which may not follow data flow semantics, as discussed above, depending on how the wires are configured.

In this embodiment, the clock node produces a timing signal with a specified period of 1000 us. The harnesses consume these signals and are configured to execute their respective "harnessed" VIs upon each rising edge of the timing signal after a fixed delay from the arrival of that rising edge. The ECU model waits 65 us from the rising edge before executing. The Engine Model waits 900 us from that rising edge before executing. Thus the execution of the two models is interleaved in time in such a way that network bandwidth for the data they each write is always available. In the prior art, this scheduling is performed via a network configuration utility, as illustrated in FIG. 7G.

Note the simplicity and clarity of the system diagram of FIG. 7H as compared to the VIs (and network configuration utility) of FIG. 7G. Thus, the use of icons that specify targeted execution of respective graphical program portions, e.g., in a system diagram, may substantially simplify the development and management of distributed graphical programs.

Figure 7I:
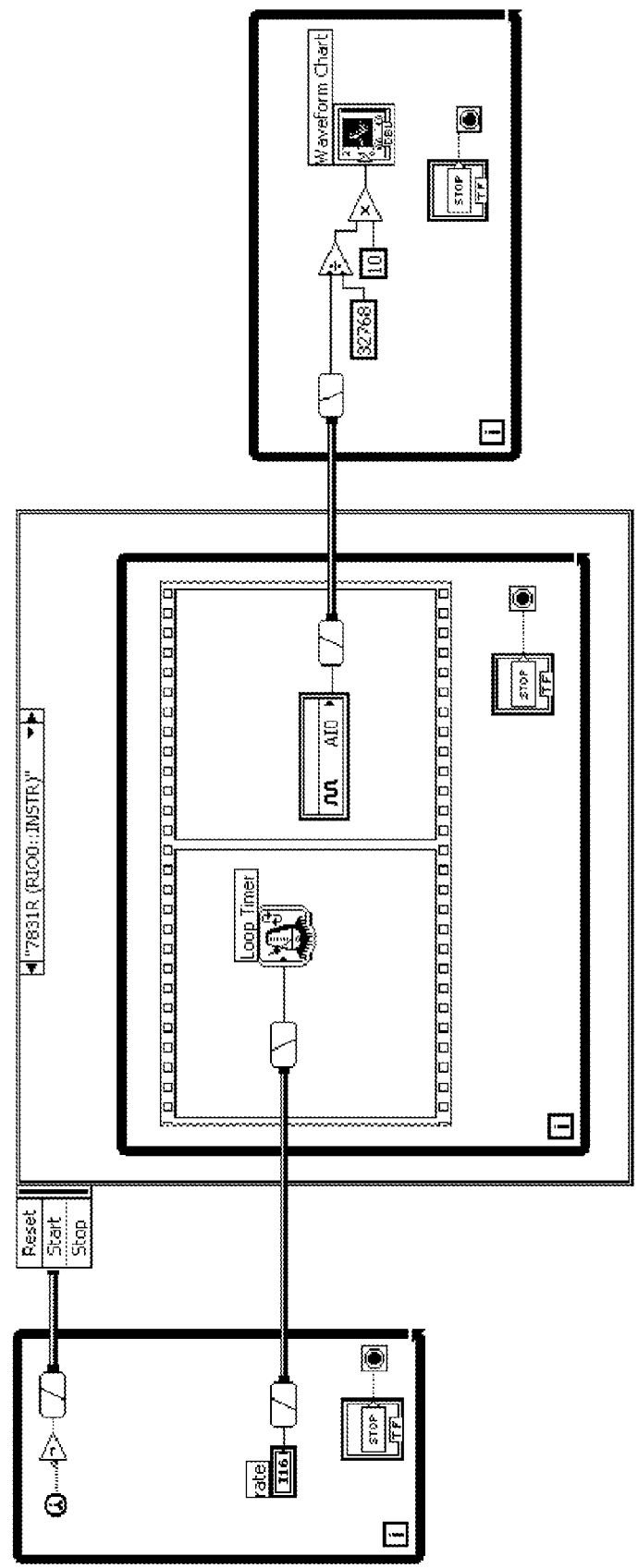
FIG. 7I illustrates an exemplary system diagram which includes an implicit execution context.

Finally, FIG. 7I illustrates a system diagram which includes dialogs for specification of procedures in the system as a whole. As shown on the target execution icon 7831R, a dialog including "Reset", "Start", and "Stop" may be displayed and may be wired to configure the respective resets, starts, and stops of the system. As shown, the 7831R device may begin execution upon receiving a signal via the wire connected to the "start" portion of the dialog. Additionally, FIG. 7I illustrates an implicit context for the graphical program portions on the left and right hand side of the system diagram. In this case, these graphical program portions may be executed by a controlling computer system.

Thus, FIGS. 7A-7I illustrate exemplary system diagrams.

Exemplary Physical Diagram

As described above, a physical diagram may refer to a diagram which indicates physical connectivity between physical devices in a system. For example, the physical diagram may visually indicate the connectivity of various physical devices in a measurement system, e.g., a computer connected to a measurement device via an Ethernet network. A physical diagram may show how executable functionality (e.g., of a graphical program or system diagram) is implemented in the real world. Thus, in primary embodiments, the physical diagram includes a plurality of interconnected icons, where each icon in the physical diagram corresponds to a physical device. Additionally, following these embodiments, connections between the icons in the physical diagram represents physical connectivity. For example, the wires between the icons in the physical diagram may represent Ethernet cables, USB connections, Firewire connections, and/or other physical media which connects devices in the system. In some embodiments, physical diagrams (and/or system diagrams) may also be useful for visualizing variable, channel, or network relationships among devices in the system. Note that a certain type of wire may also be used to represent a wireless connection.

Note that in some embodiments, configuration diagrams may have a similar appearance and/or use as physical diagrams. However, configuration diagrams may refer to diagrams which are not linked to physical reality as are physical diagrams. For example, one or more of the devices in a configuration diagram may not be physically present in the system (e.g., it may be simulated or implement on other devices in the system). Thus, physical diagrams represent physical components and physical connectivity of a system and configuration diagrams may represent physical components and/or virtual (or desired) components.

In some embodiments, the physical diagrams/configuration diagrams may be automatically populated or created by performing a discovery process. For example, the development environment may automatically discover all coupled devices as well as the connectivity between the devices. Correspondingly, all of the physical devices may be displayed in the physical diagram/configuration diagram. Discovery may include not only the connectivity and presence of devices, but also their identities, configurations, available resources, and/or other characteristics.

An exemplary physical diagram is shown in the bottom portion of FIGS. 8A and 8B (described in more detail below).

Figure 8A:
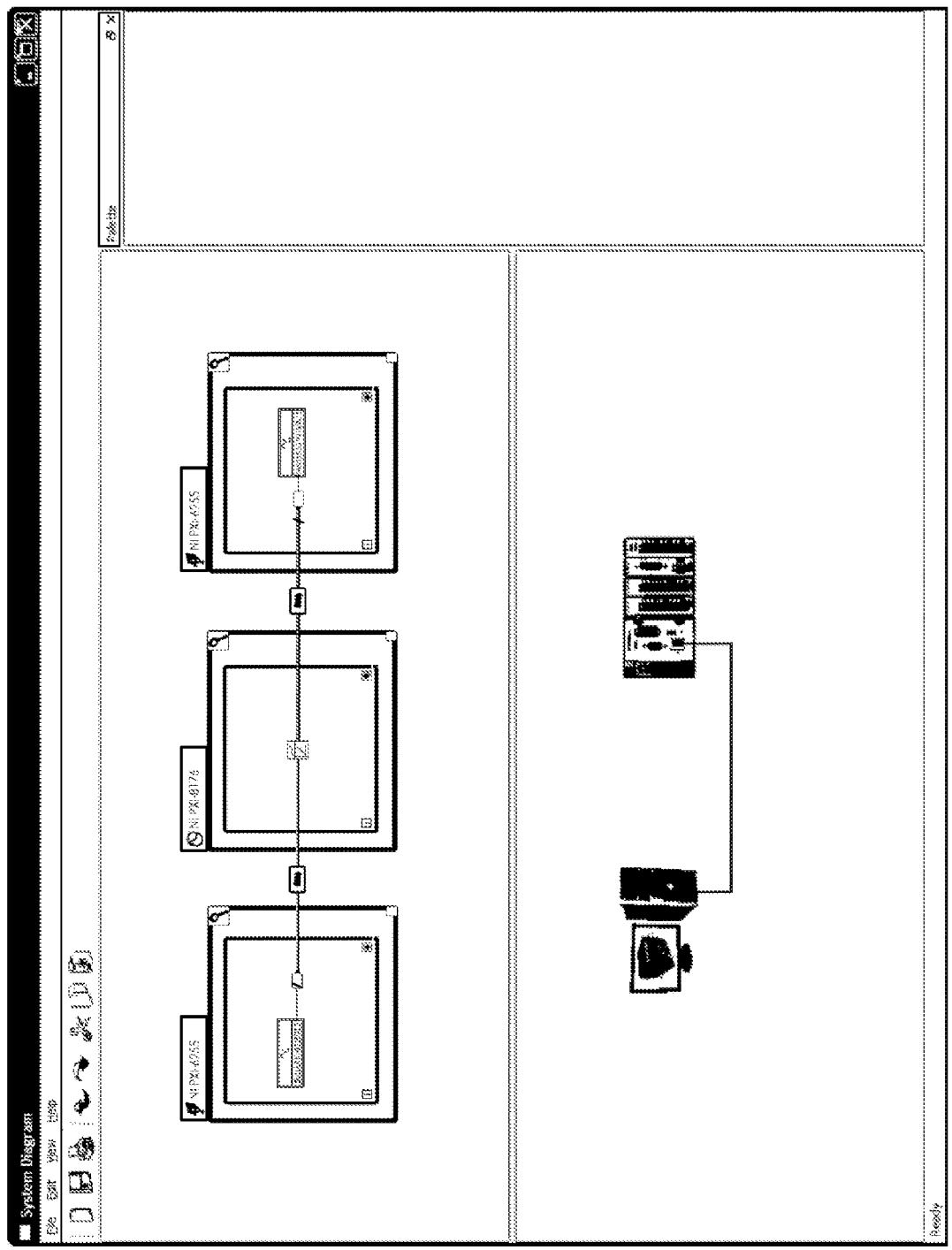
FIGS. 8A and 8B are screen shots of a split view of a system diagram and a physical diagram according to one embodiment.
Figure 8B:
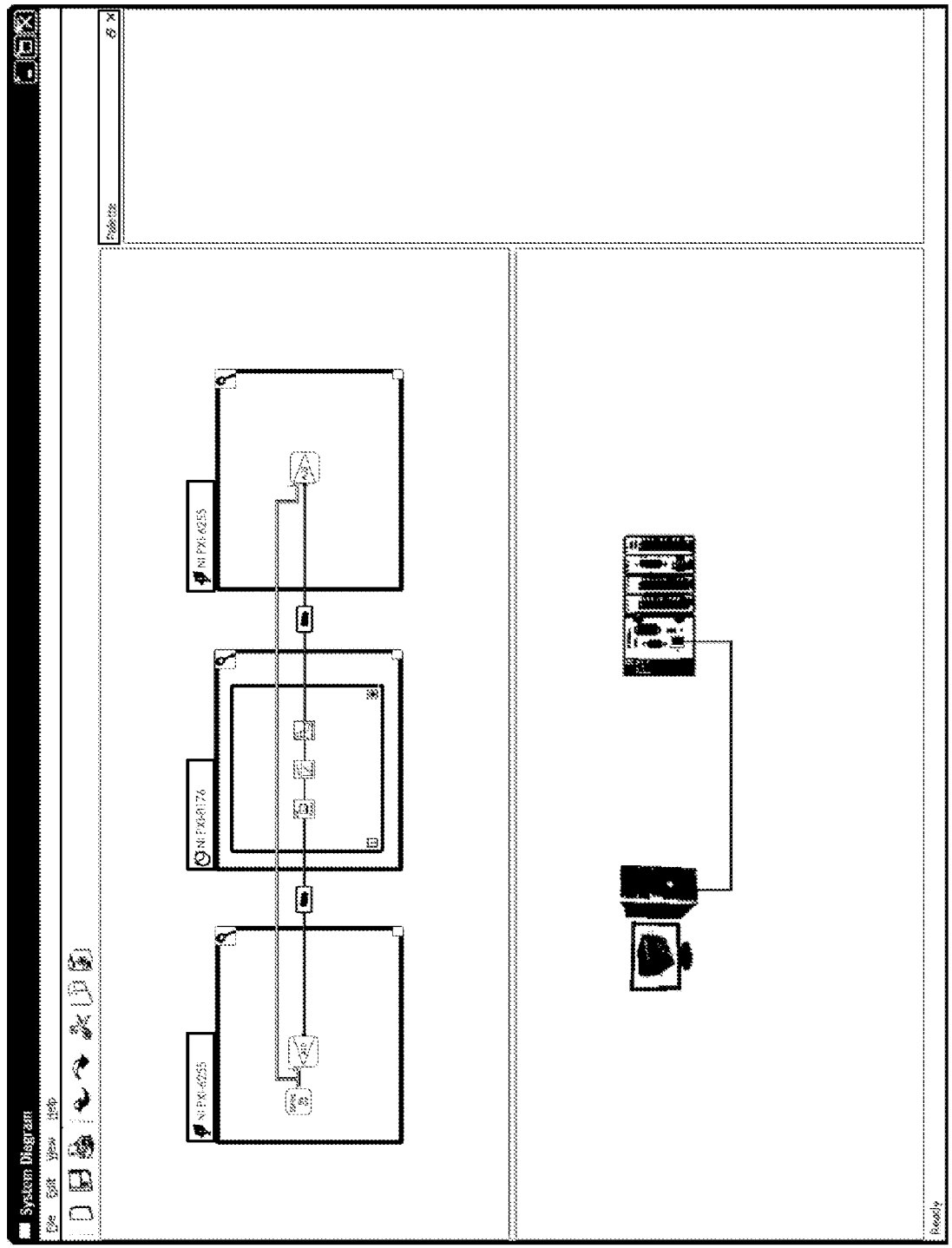

FIGS. 8A and 8B—Synergy of Multiple Diagrams

In some embodiments, it may be desirable to display or use multiple diagrams. For example, graphical programs may allow users to see a logical view of a system. Similarly, system diagrams may provide an easy and intuitive means for visualizing the logical view of a systems as well as locations of execution and relationships between other physical or virtual devices of the system. Thus, a system diagram may allow a user to easily understand functionality and logical flow of execution over an entire system. Physical diagrams and/or configuration diagrams, on the other hand, may allow users to view the physical components and connectivity of the physical components. Thus, each of the various diagrams may provide different views of a system.

In some embodiments, it may be desirable to allow a user to choose one or more of these diagrams or "views" of the system. For example, the user may want to see a purely logical view of a system. In this example, a graphical program may be displayed for the user, e.g., on the computer system 82. The graphical program may be displayed with or without graphical indications (e.g., target execution icons or configurable device icons) which visually indicate where portions of the graphical program are executed. Alternatively, the user may desire a system view of the system where both logical elements and execution indications are displayed. Additionally, the system view may include icons representing hardware devices (e.g., processing elements or configurable elements) that may not be present in the graphical programs. Finally, the user may want to view a physical representation of the system; correspondingly, the physical diagram may be displayed on the display of the computer system 82.

In some embodiments, the multiple diagrams or views may each take up the entirety of the display. Thus, the user may, in one embodiment, toggle between the different views. Alternatively, the diagrams or views may be displayed in a "split view" where a plurality of diagrams or views are shown on the display, or the different diagram are shown separately and concurrently on multiple display devices. For example, in one embodiment, a split view may be displayed where a system diagram or graphical program is displayed in a top portion and the physical view (physical diagram) may be displayed on the bottom portion. In another example, in one embodiment, a split view may be displayed where a system diagram or graphical program is displayed on a first display device and the physical view (physical diagram) may be displayed on a second display device. This may be especially useful for conveying overall system information to the user. Thus, in one embodiment, the user may see a logical view of the system which may or may not indicate where logical elements execute as well as a physical view of the system allowing intuitive understanding of the entire system in one view.

In some embodiments, the development environment may allow the user to see correlations between the logical view and the physical view. For example, following the split view embodiment from above, a user may be able to select a physical component in the physical view and corresponding graphical indications in the logical view may be visually modified to indicate where graphical program portions execute. For example, the user may select a computer system in the physical view and one or more target execution icons (or possibly icons comprised in the target execution icons themselves) may "pop" (e.g., appear to jump or bounce on the screen), change colors, become highlighted, marching ants, and/or otherwise be visually indicated. Similarly, the user may select various components in the logical view and corresponding hardware devices in the physical view may be highlighted or visually indicated. Thus, the user may easily discern which logical elements in the system diagram or graphical program correspond to the physical devices shown in the physical diagram.

Additionally, the user may be able to associate elements in the physical view with elements in the logical view or vice/versa. For example, the user may select a physical device in the physical diagram and invoke creation of an icon in the system diagram/graphical program. In one embodiment, the user may simply select one of the device and drag that device into the system diagram to invoke creation of an icon (e.g., an execution target icon or configurable device icon) in the system diagram which corresponds to that device. Alternatively, the user may select various logical elements or nodes in the system diagram and associate those icons or nodes with the devices in the physical diagram. As one example, the user may select one or more icons (e.g., a graphical program portion) in the system diagram and associate the icons with a device in the physical diagram (e.g., by dropping the icons on the device). Correspondingly, a new target execution icon or configurable icon (among others) that is associated with the device may be displayed in the system diagram with the one or more icons. Additionally, the target execution icon or configurable icon may be displayed according to connectivity of the device in the system, if desired.

As shown, FIGS. 8A and 8B illustrate exemplary split views of a system diagram and a physical diagram. Note that these Figures correspond to the system diagrams illustrated in FIGS. 7B-7E. As shown in 8A, the top portion illustrates the system diagram of FIG. 7B and the bottom portion shows the physical connectivity between the two devices of the system (in this case from a port of a chassis to a computer). More specifically, FIG. 8A depicts a data streaming application where data is read from the PXI-6255, streamed over DMA to the PXI-8176, which after modifying the data, streams data back to the PXI-6255 to be output. The FIFO affordance of the wire is used as an access point for configuring buffering policies for the configurable wire. This Figure also illustrates the concept that a single physical device (in this case the PXI-6255) can have multiple logical representations Similarly, FIG. 8B shows the same split view with an expanded system diagram (from FIG. 7C). Thus, FIGS. 8A and 8B show exemplary split views of a system diagram and physical diagram.

Figure 9A:
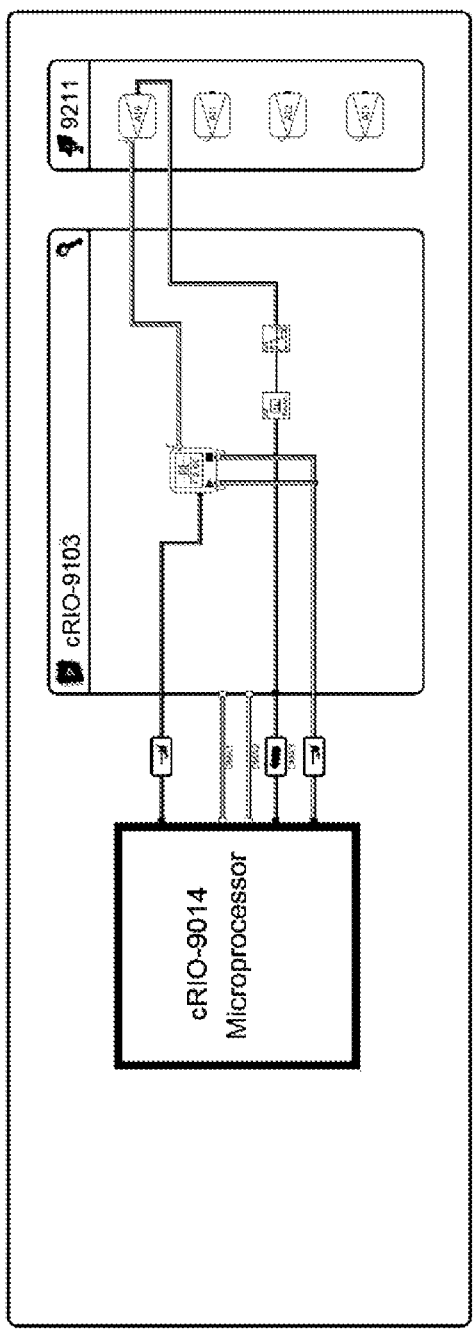
FIGS. 9A and 9B are screen shots of a composite view of a system diagram and a physical diagram according to one embodiment.
Figure 9B:
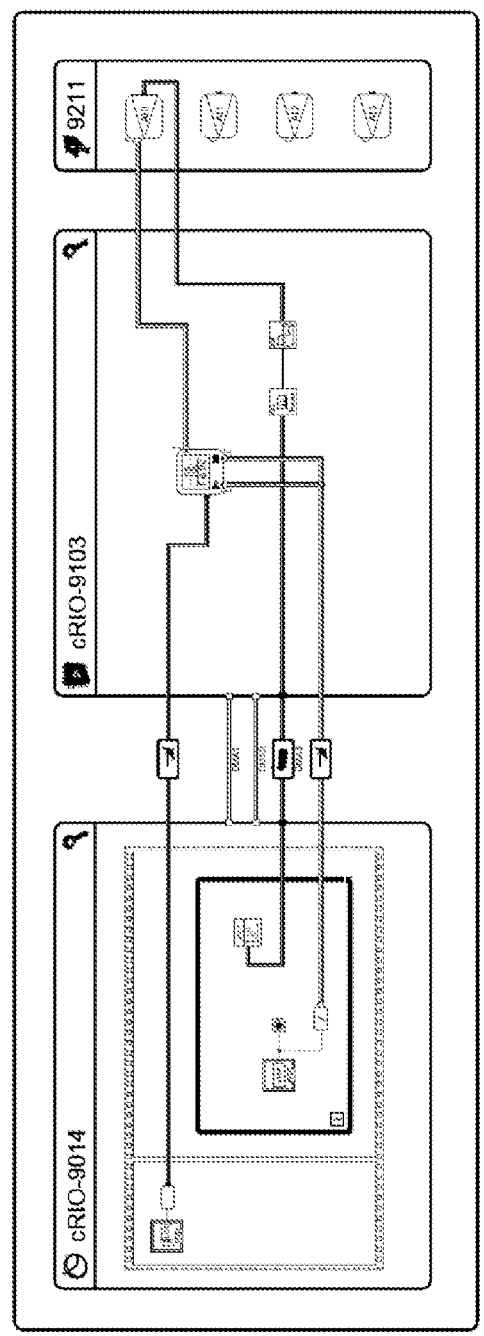

Note that the above described views are exemplary only and that other views are contemplated. For example, in some embodiments, there may be a single view, e.g., of a system diagram, where all physical and logical connectivity is indicated. Thus, in these embodiments, the user may easily understand the entirety of the system. FIGS. 9A and 9B illustrate exemplary diagrams of this case. As shown in FIG. 9A, the cRIO-9014 Microprocessor is connected to cRIO-9103 which is connected to 9211. In this case, instead of separating the logical components of the cRIO-9014 and cRIO-9103 separate target execution icons, the physical and logical relationship is shown in a single view. Similarly, FIG. 9B shows this single view, but also shows the logic of the cRIO-9014. Note that in various embodiments, the user may switch between any of the views/diagrams described above, as desired. Additionally, the user may choose to "morph" any available view to another view. For example, the user may be viewing a physical diagram of the system and may invoke a "morph" or graphical change in the diagram to a different view, such as the combined view described above. Alternatively, the user may invoke a conversion of the physical diagram to a logical view or system diagram, as desired. Note that these views/changes are exemplary only and that others are envisioned.

Alternatively, or additionally, more than two diagrams may be shown simultaneously. For example, two or more of a physical diagram, a configuration diagram, a system diagram, and/or a graphical program (among other diagrams) may be displayed at the same time. In some embodiments, various ones of the diagrams may be overlaid in an intelligent manner, to convey an intuitive understanding of the system to the user. For example, when two or more diagrams are overlaid, corresponding nodes or icons in the different diagrams may be shown in the same position on the display to indicate correspondence. In one embodiment, a diagram may be automatically modified to allow this correspondence to be readily displayed. Thus, the above described views are exemplary other, and other views are envisioned.

In one embodiment, one or more of the above described diagrams may be used for mapping system configurations to existing system configurations. For example, in one embodiment, the user may wish to map a diagram (e.g., containing specified physical and logical elements) to an existing (physical) system. For example, the existing diagram may have physical components (e.g., devices) which differ from the user's existing (physical) system. The development environment may be able to map the diagram (e.g., automatically) to the existing system and/or simulate the missing devices that are indicated in the diagram. Thus, diagrams may be mapped onto real systems by transferring functionality to existing systems or via simulation of the missing components (among others).

Thus, FIGS. 6A-9B illustrate exemplary diagrams/views of systems. The following sections describe configuration and display of data transfer functionality in the various diagrams described above (among others).

Execution Contexts

In some embodiments, the distributed execution of graphical program portions may rely on, or otherwise utilize, one or more data structures to specify and implement targeted execution of the graphical program portions. For example, each icon, e.g., each execution target icon, may be associated with a data structure via which the targeted execution of the graphical program portion in the icon is implemented. Below are described various embodiments wherein such data structures, referred to herein as "execution contexts", are used to specify and implement distributed execution of graphical programs, although it should be noted that this term, and the description below, are not intended to limit such data structures to any particular form, appearance, or function.

The description below is further directed to corresponding embodiments of the above-described icons specifying targeted execution, referred to as "context structures", although it should be noted that these context structures are meant to be exemplary embodiments of such icons, and are not intended to limit the icons to any particular form, function, or appearance. It should be noted that in various embodiments of the present invention, any of the features, attributes, aspects, or functionality described herein may be used as desired, e.g., any features described with respect to "context structures" and "execution contexts" may be used in other embodiments of the icons as desired, and vice versa. For example, the descriptions below regarding configuration and use of execution contexts may also be applied to the icons of FIGS. 5A and 5B.

Figure 10:
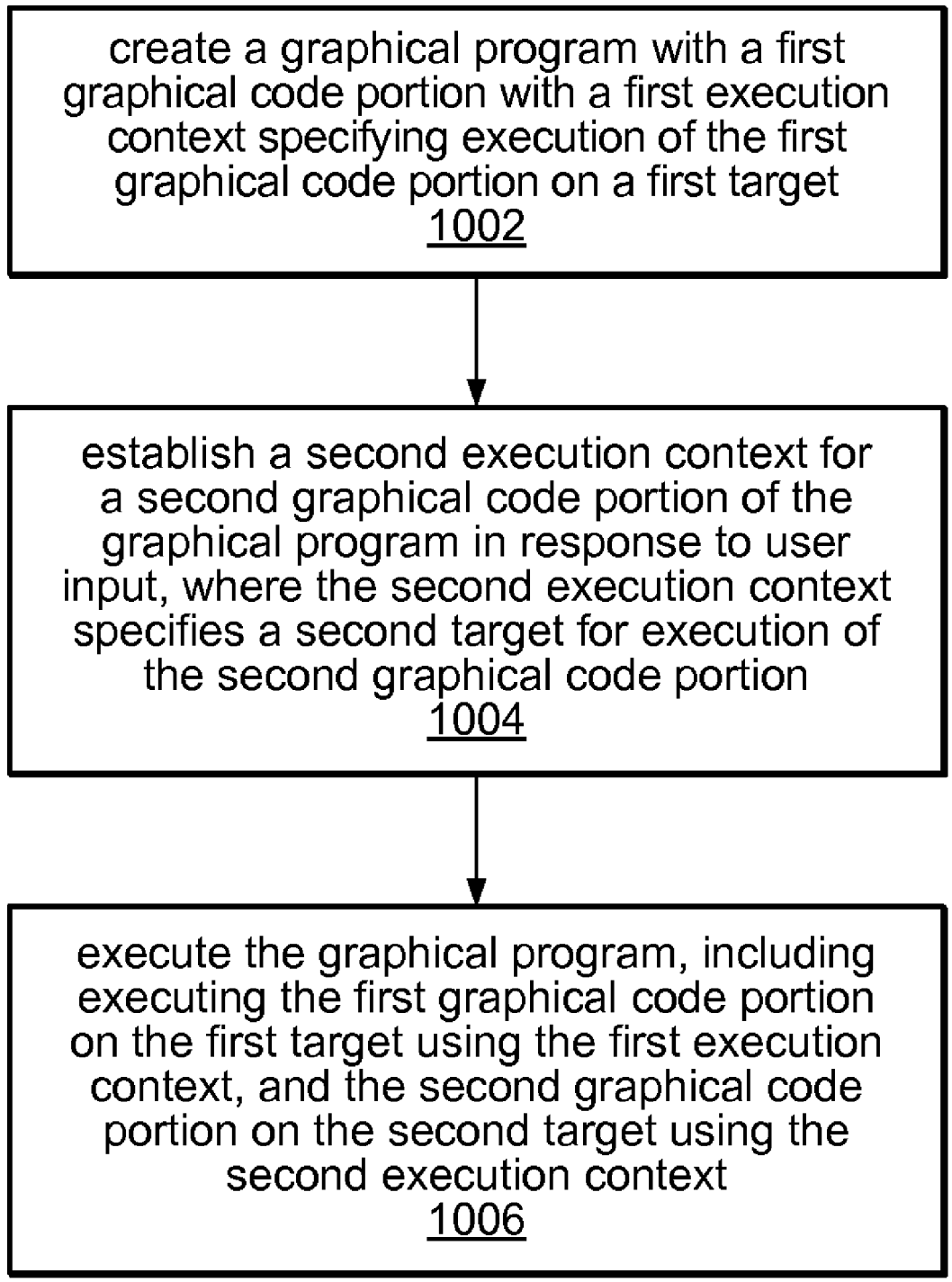
FIG. 10 is a flowchart diagram illustrating one embodiment of a method for creating a graphical program on a display having portions that execute on different targets.

FIG. 10—Flowchart of a Method for Creating a Graphical Program with Portions that Execute on Different Targets FIG. 10 illustrates one embodiment of a method for creating a graphical program on a display having portions that execute on a first target and a second target. The method shown in FIG. 10 may be used in conjunction with any of the computer systems or devices shown in the above Figures, among other devices. In various embodiments, some of the method elements shown may be performed concurrently, in a different order than shown, or may be omitted. Additional method elements may also be performed as desired. As shown, this method may operate as follows.

First, in 1002 a graphical program may be created on the computer system 82 (or on a different computer system), e.g., in response to user input. The graphical program preferably is a graphical data flow program, although in other embodiments, the graphical program may be another type of flow diagram, such as a control flow, or execution flow diagram. The graphical program may be created or assembled by the user arranging on a display a plurality of nodes or icons and then interconnecting the nodes to create the graphical program. In response to the user assembling the graphical program, data structures may be created and stored which represent the graphical program. The nodes may be interconnected in one or more of a data flow, control flow, or execution flow format. The graphical program may thus comprise a plurality of interconnected nodes or icons that visually indicates the functionality of the program. The graphical program preferably includes a first graphical code portion with a first execution context specifying execution of the first graphical code portion on the first target. The graphical program may be developed under a project (which itself may operate under a development environment), where the project is considered to reside and execute on a host system. The first execution context may specify the host system as the execution target for the first graphical code portion, or may specify a different target for execution of that code.

As noted above, the graphical program may comprise a block diagram and may also include a user interface portion or front panel portion. Where the graphical program includes a user interface portion, the user may optionally assemble the user interface on the display. As one example, the user may use the LabVIEW graphical programming development environment to create the graphical program.

In an alternate embodiment, the graphical program may be created in 1002 by the user creating or specifying a prototype, followed by automatic or programmatic creation of the graphical program from the prototype. This functionality is described in U.S. patent application Ser. No. 09/587,682 titled "System and Method for Automatically Generating a Graphical Program to Perform an Image Processing Algorithm", which is hereby incorporated by reference in its entirety as though fully and completely set forth herein. The graphical program may be created in other manners, either by the user or programmatically, as desired. The graphical program may implement a measurement function, an automation function, or a control function, among others, as desired.

As used herein the term "execution context" refers to a data structure (or a plurality of data structures) used to run an execution system. For example, there may be an execution context for each execution thread in which a graphical program or graphical program portion or section is executed. Each thread may call an Exec( ) function (or equivalent) with a pointer to an execution context for that thread.

In one embodiment, graphical code may be compiled into code sections each of which includes no parallelism, although it should be noted that multiple code sections may be executed in parallel, e.g., via threads running in parallel. An execution context preferably includes (among other items), a designation or specification of a target, i.e., an execution target for executing graphical code associated with the execution context. For example, the specification may include a network address of a remote execution platform, or a CPU (central processing unit) number, e.g., in a multi-processor system, among others. In one embodiment, an execution context may also include a run queue of queue elements (e.g., a pointer to a run queue), each of which represents a respective code section, as well as a pointer to (or other designation of) the currently executing queue element representing the currently executing code section.

Note that while there is generally an execution context per thread, different execution contexts may share run queues. Thus, a run queue may include a plurality of executable code sections from which one or more execution contexts can pull code sections for execution by respective threads. Note that, depending on the number of processors in the system, the threads may execute their respective code sections in parallel. Each queue element may include a pointer into the code section (i.e., a code pointer or program counter), comprising an address for the next instruction to execute, as well as a pointer to (or other indication of) a data space associated with code. To execute the code section, a register is loaded with the data space pointer, and the compiled code references the data via the data space pointer. Note that a code section may return from execution before the entire code section is executed, where the current code address (code pointer or program counter) points to the next instruction to be executed. The queue element may be placed back into the run queue, and subsequently pulled by an execution context for continued execution by a thread, where the code section resumes execution at the address indicated by the code pointer or program counter. Note that in some embodiments, each section of graphical code may be targeted to an arbitrary subset of targets, e.g., CPUs, and the program schedulers (execution scheduling processes) may use any scheduling algorithms as desired to assign a thread to a particular CPU.

As noted above, any type of execution target or platform may be designated for use by the execution context, i.e., any computing elements capable of executing code may be targeted as desired. Exemplary execution targets may include, for example, CPU-based systems, programmable hardware elements, e.g., field programmable gate arrays (FPGAs), digital signal processors (DSPs), micro-controllers, etc., as well as any combinations of the above, among others. For example, a target may include one or more FPGAs and one or more DSPs that may operate in conjunction.

In 1004, a second execution context for a second graphical code portion of the graphical program may be established in response to user input, where the second execution context specifies or indicates the second target for execution of the second graphical code portion of the graphical program. In one embodiment, establishing the second execution context may include displaying a context structure on the display in response to user input, where the context structure specifies or indicates the second execution context for graphical program code associated with the context structure. In various embodiments, the context structure may be any of various types of structure. For example, the context structure may be a timed structure, such as a timed loop structure or a timed sequence structure. For further details regarding timed loops, please see U.S. patent application Ser. No. 10/892,829, titled "A Graphical Program Which Executes a Timed Loop", which was incorporated by reference above. In one embodiment, the context structure may be a node structure that only or primarily specifies and manages execution of associated graphical code in an execution context, i.e., on a designated execution target. In some embodiments, the context structure may be considered an execution "portal", where graphical code displayed in a graphical program executing on a first target may be executed on a second target via the "portal", i.e., remotely, even though the code is still displayed in the "local" graphical program.

Figure 11:
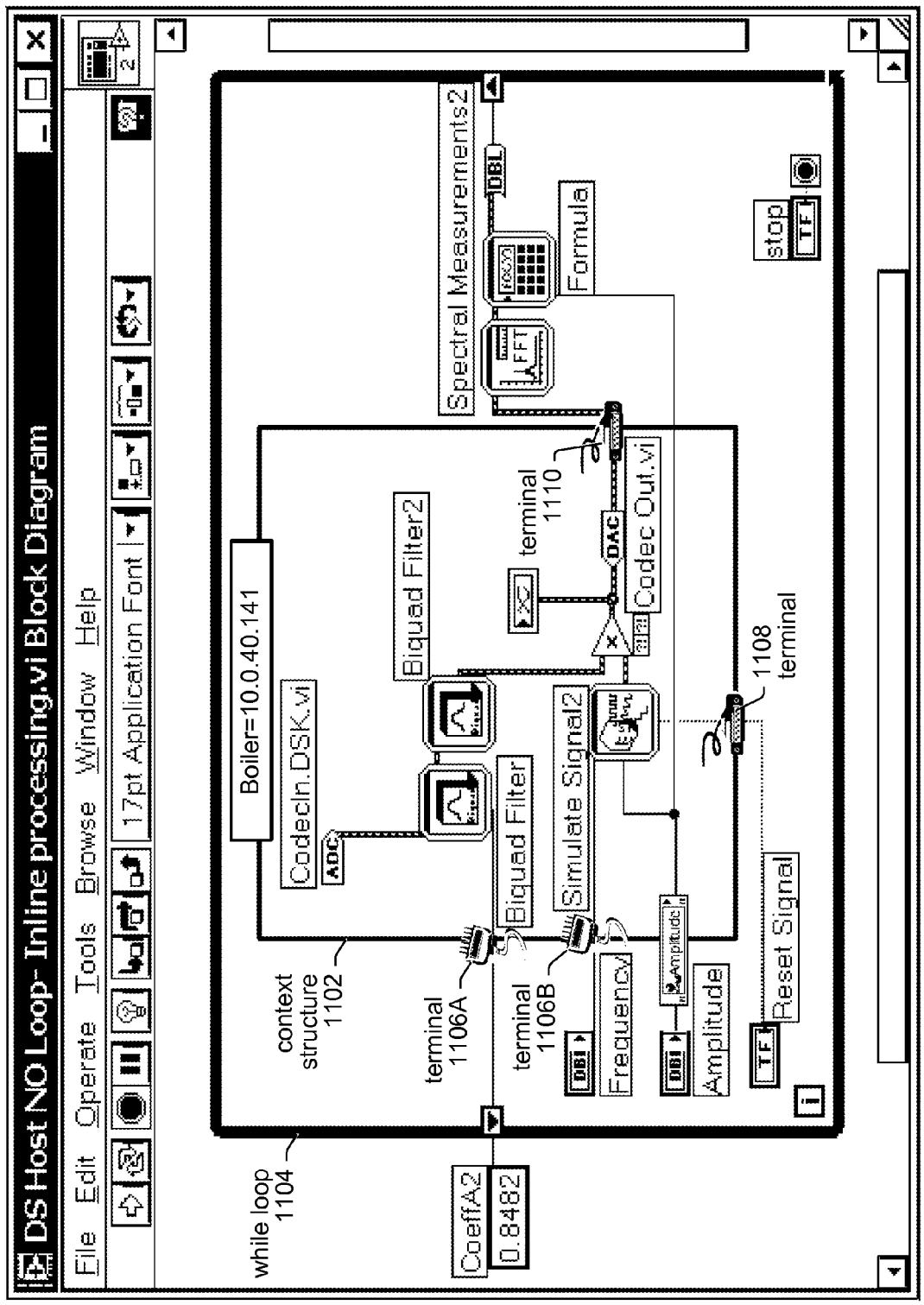
FIG. 11 illustrates an exemplary graphical program with an execution context structure, according to one embodiment.

FIG. 11 illustrates an exemplary graphical program that includes a context structure 1102 (inner rectangle), labeled "Boiler=10.0.40.141", enclosing an example graphical code segment, and a while loop structure 1104 (outer rectangle) that implements or manages iterative execution of the graphical program. As indicated, in this case, the context structure is configured to execute the enclosed graphical code on an execution platform or target at the indicated network address (10.0.40.141). As FIG. 11 shows, the enclosed graphical segment includes various graphical program nodes, including a Biquad Filter, so labeled, a second Biquad Filter, labeled "Biquad Filter2", a simulation node, labeled "Simulate Signal2", a multiply node—a triangle labeled with a "x", an analog to digital (ADC) node labeled "CodecIn.DSK.vi", and a digital to analog (DAC) node labeled "Codec Out.vi". Additional graphical program code resides outside the context structure, such as, for example, various numeric data nodes, labeled "CoeffA2", "Frequency", "Amplitude", etc., as well as a Fast Fourier Transform (FFT) node, so labeled, and an analysis node labeled "Formula", among others.

As may be seen, the context structure may include one or more configurable terminals for communication between graphical code inside the context structure and graphical code (or external elements or systems, including the user) outside the context structure. For example, in the embodiment shown, terminals 1106A and 1106B, here represented by terminal icons located on the left border of the context structure, may facilitate communication of the CoeffA2 and Frequency numeric values to nodes inside the context structure. Similarly, terminal 1108 may allow communication of a reset signal, e.g., input by a user via a front panel, to the Simulate Signal2 node inside the context structure. Finally, as shown, in this embodiment, a terminal 1110 may provide for communication of output data from inside the context structure to the outer nodes, e.g., the FFT node.

The second graphical code portion may be associated with the context structure in response to user input. This association may be made via any of a number of ways. For example, in one embodiment, the user may drag and drop the second graphical code portion into the context structure using a pointing device, such as a mouse. In another exemplary embodiments, the user may draw the context structure around the second graphical code portion. For example, the user may invoke a special mode, e.g., a drawing mode or equivalent, and simply draw a boundary, e.g., a polygon, circle, or freehand border, around the second graphical code portion. In one embodiment, the user may "drag" a (rectangular) bounding box (or circle or ellipse) around the code portion. Of course, any other means for associating the code portion with the context structure may be used as desired. For example, in one embodiment, the user may invoke a menu on the code portion and/or the context structure, and may specify the association via menu selection. In another embodiment, the user may invoke an association wizard, where the wizard leads the user through the association process via a number of dialogs, whereby the user provides input specifying the association.

In one embodiment, establishing the second execution context may include configuring the context structure. Of course, as mentioned above with respect to the icons of FIG. 5, any of various means may be used to configure the context structure. For example, the user may interact with a dialog box, property page, menu(s), or wizard to statically configure the context structure, e.g., the user may invoke a configuration dialog by invoking a "Configure" option (or its equivalent) on a context menu for the context structure or a configuration node, or by double-clicking on the border of the structure or the configuration node. The user may then interact with the configuration dialog to specify information such as the execution target. In one embodiment the user may utilize the configuration dialog to specify other properties of the context structure as well, such as a structure name, and/or other information that may be useful for managing the context structure.

Thus, in one embodiment, establishing the second execution context may include invoking a graphical user interface (GUI) with respect to the context structure, receiving user input to the GUI specifying the second execution context for the second graphical code portion, including specifying the second target for execution of the second graphical code portion, and automatically configuring the second execution context in accordance with the user input to the GUI. In various embodiments, the GUI may include one or more of: one or more dialogs, one or more property pages, one or more menus, and/or a wizard. For example, a configuration dialog or menu (or wizard) may be invoked on the context structure, e.g., via a project or environment menu or dialog invocation, which would be a static assignment of the configuration parameters. In one embodiment, automatically configuring the second execution context may include one or more of: creating a project, adding computing nodes to the graphical program, creating new nodes for the graphical program, creating new block diagrams for inclusion in the graphical program, copying one or more block diagrams in the graphical program, downloading one or more portions of the graphical program to an execution context, and/or adding variable configuration to the graphical program.

Thus, in some embodiments, the execution context may be configured through the project in which the graphical program is developed. For example, the type and/or definition of the target may be defined in the project under which the graphical program with the context structure is specified.

Since this configuration may occur at the project level, edit-time functionality regarding the graphical code associated with the execution context, e.g., included in the context structure, may be contingent upon the specified target. In other words, the editing environment and/or graphical program code, e.g., nodes, may adapt to the target specification in the project. For example, editing behavior within the context structure may be based on the type and configuration information of the specified target. In other words, the editing environment behavior may be automatically customized based on the target definition of the context structure (the target of the execution context). The environment or editor may provide help information, hints, and feedback to the user while the user is building/writing the code within the execution structure node. In one embodiment, the editor may prevent users from designing and building applications that cannot run on the specified target. For example, in one embodiment, the editor may flag errors when the user attempts to add or use nodes (functions) within the context structure that are not supported by, appropriate for, or relevant to, the specified target. In other words, the editor may enforce target specific syntax and semantic checking within the context structure.

As another example, in some embodiments, palettes from which the user may select (e.g., drag and drop) nodes for inclusion in the context structure may automatically present or display only those nodes or functions that are supported by or appropriate for the target. Alternatively, or additionally, the palettes may display all nodes available, but only allow supported or appropriate nodes to be included in the graphical code section in the context structure.

As a further example, the target specific environment or editor customization may include automatically locating and using correct instances of target specific libraries for built-in and user-defined functions (e.g., subVIs). For example, in an exemplary case, a user may drop a function called FFT (Fast Fourier Transform) into a context structure. If the target happens to require a specific implementation of the FFT function, e.g., an FPGA-specific implementation, the editor may retrieve the specific implementation instead of a generic version. In one embodiment, the visual appearance of the graphical code within the context structure may be specific to the specified target. For example, graphical program nodes directed to an FPGA may have different icons, labels, colors, etc., from those directed to a standard CPU based system.

In some embodiments, compilation and code generation with respect to the graphical program may be specific to the specified target. In other words, the graphical code associated with the context structure may be compiled in a manner that is specific to the target. Similarly, any code, e.g., C/C++ code, generated from the graphical code in the context structure may be specific or directed to the specified target. Moreover, in one embodiment, the environment and/or context structure may automatically manage elements external to the graphical program that portions of the graphical code within the context structure may be dependent on. In other words, in some embodiments, the graphical code within the context structure node may refer to external elements, e.g., to dynamic link libraries (DLLs), configuration files or variables (that are defined externally), hardware configurations, and/or other external entities, i.e., the graphical code section within the context structure may not be completely self contained, but rather may include references to entities or elements that are defined outside the graphical code section, or even the entire graphical program. In other words, the external entities are "used" within the graphical code section. These external elements or entities may be referred to as "dependencies", and may be required to be present in correct form at the target for the target to be able to execute the code. Thus, in some embodiments, the context structure and/or the environment may find such dependencies and compile and deploy the external dependencies accordingly.

In some embodiments, if some aspect of the context structure, graphical program distribution, or editor/environment configuration or functionality is ambiguous, the user may be automatically prompted to provide additional information or instructions to resolve the ambiguity.

Alternatively, or additionally, in some embodiments, the context structure may be configured dynamically, i.e., at or during runtime. For example, in one embodiment, the at least one graphical program element may include a front panel communicatively coupled to the context structure. The front panel may dynamically receive user input specifying the configuration information for the context structure, and may provide the configuration information to the context structure to configure the context structure. For example, the front panel may be coupled to the graphical program via a terminal, e.g., a front panel terminal, which may couple to the context structure via a terminal, e.g., a configuration or communication terminal, included in or on the context structure.

In some embodiments, establishing the second execution context may include connecting at least one graphical program element to the context structure, and the at least one graphical program element providing configuration information to the context structure, thereby configuring the context structure, where the configuration information includes a specification or designation of the second target for execution of the second graphical code portion of the graphical program. For example, in some embodiments, configuring the context structure may include connecting one or more wires to one or more terminals associated with the context structure in response to user input, where the one or more wires specify the configuration information. In other words, the wires may be operable to store and communicate the configuration information to the context structure. Said another way, the context structure may include one or more terminals to which the user can connect a wire or wires specifying the configuration information. For example, in one embodiment, the context structure may include an input node, also referred to as a configuration node, where the input node includes various terminals to which the user may connect wires to dynamically set the respective properties during execution of the graphical program. For example, a specific terminal may represent the specification or designation of the execution target for the context structure. Thus, the user can connect a wire to this terminal to specify the target for the context structure. The input node may also include other terminals for connecting wires to dynamically specify other aspects of the context structure. For example, in the case where the context structure is a timed loop, the terminals may be used to specify the loop's timing source, priority, offset, mode, and other timing information.

In some embodiments, the at least one graphical program element may include a node coupled to the context structure, where providing configuration information to the context structure may include the node providing the configuration information to the context structure to configure the context structure in accordance with attributes of the node. For example, a property node may be coupled to the context structure, where the property node includes one or more configuration parameter values for configuring the context structure. Similarly, a data node may be coupled to the context structure, where the data node provides configuration information to the context structure (thereby configuring the structure).

In one embodiment the user may have the option to set properties of the context structure both statically, e.g., by using a configuration dialog, menu, property page, etc., and dynamically by connecting wires to terminals on the block diagram of the graphical program. For example, in one exemplary embodiment, checking a "Use terminal" checkbox for one or more properties or attributes on a configuration dialog may cause the corresponding terminals to appear in the input (i.e., configuration) node for the context structure. The user may then connect wires to the terminals in the input or configuration node of the context structure to cause the respective properties to be set dynamically during execution of the graphical program. Thus, the user can connect wires to respective terminals for these properties to cause the properties to be set dynamically during execution of the graphical program, whereas other properties for the context structure may be statically configured through the configuration dialog or other GUI means.

In some embodiments, if the user configures one or more properties for the context structure (e.g., the execution target, name, etc.) using the configuration dialog then the specified values may appear in the configuration node of the context structure. This allows the user to see how the context structure is configured by simply looking at the block diagram of the graphical program, i.e., by looking at the configuration node of the context structure, as opposed to the user being required to invoke a dialog or other window to view the configuration information.

Thus in one embodiment the configuration node may display terminals for specific properties that the user requests (e.g., by checking a "Use terminal" checkbox in a configuration dialog as described above), where the user can connect wires to the terminals to cause the respective properties to be dynamically set. The configuration node may also display values for statically configured properties of the context structure, where the values were specified using a configuration dialog as described above. For example, the configuration node may include a plurality of displayed rows or fields, where each row or field represents one of the properties of the context structure. Some of the rows or fields, i.e., the ones corresponding to properties that are set dynamically, may visually indicate that they are terminals to which the user can connect wires. Other rows or fields, i.e., the ones corresponding to properties that are statically configured through the configuration dialog, may simply display the value specified by the user but may not visually indicate that they are terminals to which the user can connect wires.

However, in one embodiment the user may still be able to connect a wire to a row or field corresponding to a property that is statically configured, even though the row or field may not currently include or may not visually indicate a terminal for connecting a wire. The act of connecting a wire to the row or field may cause the row or field to change so that it includes or visually indicates a terminal. Thus, the respective property may be automatically changed from a statically configured property to a property that is dynamically set by data from the connected wire.

In one embodiment the user may also be able to configure how information in the configuration node is displayed. For example, the user may configure the properties shown in the configuration node to be represented either iconically and/or textually. In one embodiment each row or field in the configuration node may by default display a small icon that visually represents the respective property of the context structure. For example, in one embodiment where the context structure is a timed loop, a clock icon may represent the timing source of the context structure, and a staggered "3, 2, 1" icon may represent the priority of the context structure, etc. The user may be able to request that text names for the properties be displayed in addition to or instead of the icons, e.g., by selecting a menu item from a context menu for the configuration node.

Also, in one embodiment the user may be able to specify which properties of the context structure to show in the configuration node. For example, the user may want some of the properties to be displayed and others to be hidden to avoid clutter on the block diagram. In various embodiments the user may be able to specify which properties to show in the configuration node in any of various ways. For example, the user may be able to request that only the properties that are dynamically set, i.e., the ones to which wires are connected, be shown in the configuration node, or the user may interact with a dialog box to check boxes to specify which properties to show or hide.

In a further embodiment, the context structure may be configured via a call from a calling or parent program, which is another example of dynamic configuration. For example, in one embodiment, the context structure (and its contents) may be represented by a node in the graphical program, i.e. may be represented by a subVI (node), which, when executed in the graphical program, calls the context structure, much as a standard text-based program makes a function call by name, thereby invoking the program code of the function. Providing the configuration information to the context structure may thus include the node making a call to the context structure, and passing the configuration information to the context structure. For example, executing the subVI to call or invoke the context structure may include passing a designation or specification of the execution target to the context structure, in response to which the context structure and its contents may then execute on that target. In one embodiment, the configuration of the context structure (or the context structure itself) may be automatically set to that of the calling program or node, e.g., using a "same as caller" scheme.

In some embodiments, the block diagram or graphical program portion called by and represented by the subVI node, referred to herein as a sub-block diagram, sub-diagram, or sub-graphical program, may have an implicit context structure, i.e., where some or all of the configurable properties of the context structure are properties of the sub-diagram, thus obviating the need for an explicit context structure. In other words, in some embodiments, a sub-diagram may be considered to have or be its own context structure, i.e., the boundary of the sub-diagram may itself be considered to be a context structure. Said another way, the configuration of the execution context for the sub-diagram may be performed by configuring the sub-diagram directly, either statically or dynamically, as desired.

Note that in some embodiments, if the parent program's execution context is the same as that of the called subVI or context structure, the context structure may be "short circuited", i.e., may be omitted or rendered inoperable, since the functionality of the context structure is then superfluous.

Thus, the method may include configuring the context structure statically, i.e., at compile or edit time of the graphical program, and/or may include re-configuring the context structure dynamically at or during runtime of the graphical program.

It should be noted that such dynamic configuration may facilitate configuring the graphical program to dynamically change the configuration information for the context structure during execution of the graphical program, e.g., in response to user input, or programmatically. For example, by transmitting the configuration information to the context structure dynamically, e.g., via wires coupled to the context structure, the execution target for the context structure may be changed per iteration or execution of the code section included in the context structure. In other words, one or more terminals for dynamically changing the configuration information for the context structure may be associated with the context structure, where configuring the graphical program to dynamically change the configuration information for the context structure may include connecting one or more wires to the one or more terminals in response to user input. The context structure may then receive the configuration information dynamically, thereby configuring the context structure at or during runtime.

For example, in one embodiment, the context structure may include special data nodes that may be utilized for this purpose, e.g., the context structure may have a left data node attached to the left border of the context structure and a right data node attached to the right border of the context structure. In embodiments where the context structure is a timed loop structure, the left data node may provide configuration (e.g., timing) and status information about the current and/or previous loop iteration, including an execution target specification or designation. The user can wire data from the left data node to the right data node to cause future iterations of the context structure to be dynamically configured during execution of the graphical program, e.g., possibly changing the execution target from one iteration to the next.

In various embodiments the left data node may return any kind of data regarding execution of the context structure, e.g., data regarding execution of the previous iteration of the context structure or data specifying current property values, such as the current execution target, priority, etc., of the context structure (or any other information associated with the particular type of context structure used, e.g., timed loop properties and status information). In one embodiment the left data node may include a plurality of terminals, each corresponding to a different data item. For example, each data item may be represented as a separate row or field in the left data node. The user may be able to configure the left data node to display only the data items of interest, similarly as described above with reference to the configuration node, as noted above.

The user may connect wires to the terminals of the left data node to receive the respective values of the data items. The wires may provide the data item values to other nodes within the context structure and/or to the right data node. As one simple example, the user may connect one end of a wire to a terminal in the left data node to receive the current execution target of the context structure and may connect the other end of the wire to a data node within the context structure border. The data node may be configured to provide a next execution target, e.g., from a list of execution targets, and the node may be connected to an appropriate terminal in the right data node. (The right data node may include a plurality of terminals corresponding to various data items regarding execution of the context structure, similarly as described above for the left data node.) Thus, in this simple example, the execution target of the context structure may be dynamically set on each loop iteration. Future scheduling of the context structure may take the dynamically changed context structure properties into account, i.e., so that subsequent iterations of the context structure execute according to a new dynamically specified execution target, priority, etc.

In one embodiment, the context structure may be operable to pass on error or status information to other nodes in the graphical program. For example, the context structure may include an output node, that may be operable to return error information that the context structure receives, e.g., in an "Error In" input of an input node for the structure, or to return error information that the context structure itself generates during execution. For example, in one embodiment, if an external source causes the execution of the context structure to abort then the output node may return an error. In one embodiment, the output node may not return error information from any sub-diagram that executes within the context structure. In one embodiment, if the context structure receives an error, e.g., in the "Error In" input of the input node, then the context structure may not execute (i.e., the graphical source code associated with the context structure may not be executed), and the context structure may simply pass on the error.

Thus, in some embodiments, one or more nodes associated with the context structure may be configured to receive information regarding a previous iteration or execution of the context structure during execution of the graphical program, e.g., in response to user input or programmatically. Similarly, one or more terminals for dynamically receiving information regarding a previous iteration of the context structure may be associated with the context structure, where configuring the one or more nodes to receive the information may include connecting the one or more nodes to the one or more terminals, e.g., in response to user input, or programmatically.

Thus, configuration of the execution context may be performed via various means. More specifically, as described above, target definition or specification may be provided at several levels, such as by the project, by the context structure, dynamically by connecting wires to the context structure, and/or by a function call (a subVI call).

In some embodiments, the context structure may also determine or manage how graphical code within the context structure (either in compiled form or in source form) is deployed to the target, along with its dependencies (i.e., dependent external elements or entities). In the simplest case, deployment may simply mean copying the code to the target. However, depending on the target, deployment may be more complex. For example, while for some targets, the code may need to be copied to a hard drive of the target, while for other, e.g., embedded controllers, the code may need to be burned in to flash (non volatile RAM). Moreover, if the target is remote, it may be required to send the code to the target over the bus to which the target is coupled, e.g., the target may be connected to the host via a serial, Ethernet, PCI, or PCI express, bus, among others, and the context structure may automatically deploy the code appropriately, depending on the particular target for the code. Thus, for example, in the case that the specified target is an FPGA, the context structure may manage the deployment (and possibly creation) of a hardware configuration file or netlist implementing the graphical code onto the FPGA. In other words, the context structure may deploy the graphical code (or code derived from the graphical code) to the target in an appropriate manner, depending on the nature of the target.

In one embodiment, the context structure may also be operable to manage communications with respect to the graphical code inside the context structure, e.g., between the graphical code inside the structure and elements outside the structure. For example, the context structure may determine and manage how parameters are passed based on the configuration of the terminals of the context structure, e.g., whether the parameters are passed by reference or by value.

Note that in some embodiments, the terminal configuration of the context structure may redefine the nature of the wires that are connected to those terminals. For example, a terminal of the context structure may be configured for synchronous or asynchronous communications, where a wire connected to that terminal may then automatically be defined (or re-defined) as a synchronous or asynchronous wire, accordingly. As an example, say node A is connected to node B through a wire. If the wire is a synchronous wire, then data flow protocol will be followed, such that node A, which provides data to the wire for transmission to node B, must finish executing and produce a value on the wire before node B can start running. In contrast, if the wire is an asynchronous wire, then node A and node B can run simultaneously, regardless of each other's execution state. Thus, if the configuration of the context structure terminal defines the incoming wire to be asynchronous, the context structure can start executing immediately, and does not have to wait until the input is available on the wire. For further information regarding asynchronous wires, please see co-pending U.S. patent application Ser. No. 11/462,393, titled "Asynchronous Wires in a Graphical Programming System", and U.S. application Ser. No. 11/759,975, titled "Graphical Diagram Which Automatically Determines A Data Transport Mechanism For Wires Based On Configured Policies", which were incorporated by reference above, incorporated by reference above.

In some embodiments, configuring the context structure may include specifying, and possibly restricting, resources to be used when running the code under or on the target. For example, the context structure may allow specification of the number of CPUs to utilize on the target, or the particular CPU(s) to use, e.g., to use only one CPU on the target. As another example, the context structure may allow specification of how much bandwidth of a processor or CPU to use in executing on the target. As yet another example, the user may be able to specify (via the context structure configuration) how much RAM (random access memory) to use on the target. Of course, in other embodiments, any other type of resource use specification or management for the specified target may be configured as desired. Thus, target resource allocation and use may be configured and managed or implemented via the context structure.

In one embodiment, the first execution context mentioned above may include a default execution context for the graphical program. In other words, in contrast with the second execution context, whose configuration is described above according to various approaches, the first execution context may have a default configuration, and thus, may not need to be configured by the user. Of course, in other embodiments, the first execution context may be configured using any of the approaches described above, among others.

Finally, in 1006, the graphical program may be executed, where during execution of the graphical program, the first graphical code portion executes on the first target using the first execution context, and the second graphical code portion executes on the second target using the second execution context. Thus, the context structure may be operable to invoke execution of the second graphical code portion on the specified second target, thereby causing the second graphical code portion to run on the second target, while the first graphical code portion executes on the first target (in accordance with the first execution context).

In some embodiments, the binding between the two portions may be such that one may execute even when the other is inoperable. For example, the first and second code portions may be loosely bound such that the first code portion can execute when the second code portion is inoperable. Thus, even if the second graphical code portion fails to execute on the second target, e.g., due to inoperable code in the second graphical code portion, or due to the context structure not being able to attach or be associated with the execution context, the first graphical code portion may continue to execute on the first target.

In one embodiment, the context structure may be operable to "re-attach" the project and/or graphical code executing on the host system to a running execution context or graphical code executing on a different target. For example, if the first target is considered to be the host system, where the first graphical code portion and the project is resident on the host system, the second graphical code portion may be executing on the second target when the project for the graphical program is closed (e.g., on the first target or host system). When the project is later opened or loaded (on the first target), the context structure may automatically re-attach the project, including the first graphical code portion, to the running execution context of the second target, i.e., to the second graphical code portion. Note that the re-attach process preferably puts the edit-time representation(s) of the second graphical code portion on the host system into the same state as the run-time version on the target. For example controls/indicators of the graphical program that include I/O for the second graphical code portion may update to the latest values on the target e.g., for the user to view.

As a more specific example, consider a main graphical program to be running on target A, where the graphical program has a context structure with a graphical code portion targeted to "target B". When the graphical code portions are running, the user can view the latest values on the controls/indicators of the graphical program on the host/development machine. The project may be closed, leaving the graphical code portions running on their respective targets. Upon subsequent opening of the project on the host system, the context structure may automatically detect that the graphical code portions are already deployed and running under the respective targets and so there is no need to do it again. The context structure may then re-connect/re-attach the project and/or any portion of the graphical program on the host system to the graphical code portions that are already running on the respective targets.

The context structure may also facilitate debugging of the code contained in the context structure, i.e., the second graphical code portion. For example, in preferred embodiments, all the standard debugging features may be available with respect to the graphical code in the structure. Examples of debugging features supported may include, but are not limited to, single stepping into the context structure from outside the context structure, stepping through functions or nodes within the context structure, and stepping out of the context structure, as well as such stepping into, over, and out of other nodes in the graphical program. Further examples of debugging features that may be supported include execution highlighting, and probes, e.g., conditional probes, which may be connected to or associated with wires (or nodes) in the graphical program to provide "debug out" functionality, i.e., to allow the user to view the value of data being stored or transmitted on the wire. Of course, any other debugging functionality used in programming, especially graphical programming, is also contemplated as being within the scope of the present invention. Note that in preferred embodiments, the debugging may be performed from the host computer, e.g., from the normal execution target of the graphical program, i.e., the first target. In other words, the second graphical code portion may run on the second target, but can be debugged by the user on the first target.

Thus, various embodiments of the present invention may facilitate distributed execution of portions of a graphical program on respective targets.

Described in a slightly different way, in one embodiment, a method for creating a graphical program on a display having portions that execute on a first target and a second target may include displaying a context structure on the display in response to user input, where the context structure indicates a first execution context for graphical program code associated with the context structure, and where the first execution context is a different execution context from other graphical program code in the graphical program. A first graphical code portion may be associated with the context structure in response to user input, and the first graphical code portion may be specified for execution on the first target. A second graphical code portion may be displayed on the display, where the second graphical code portion has a second execution context different from the first execution context, and where the second execution context specifies execution of the second graphical code portion on the second target. During execution of the graphical program on the second target, the first graphical code portion executes on the first target using the first execution context.

Figure 12A:
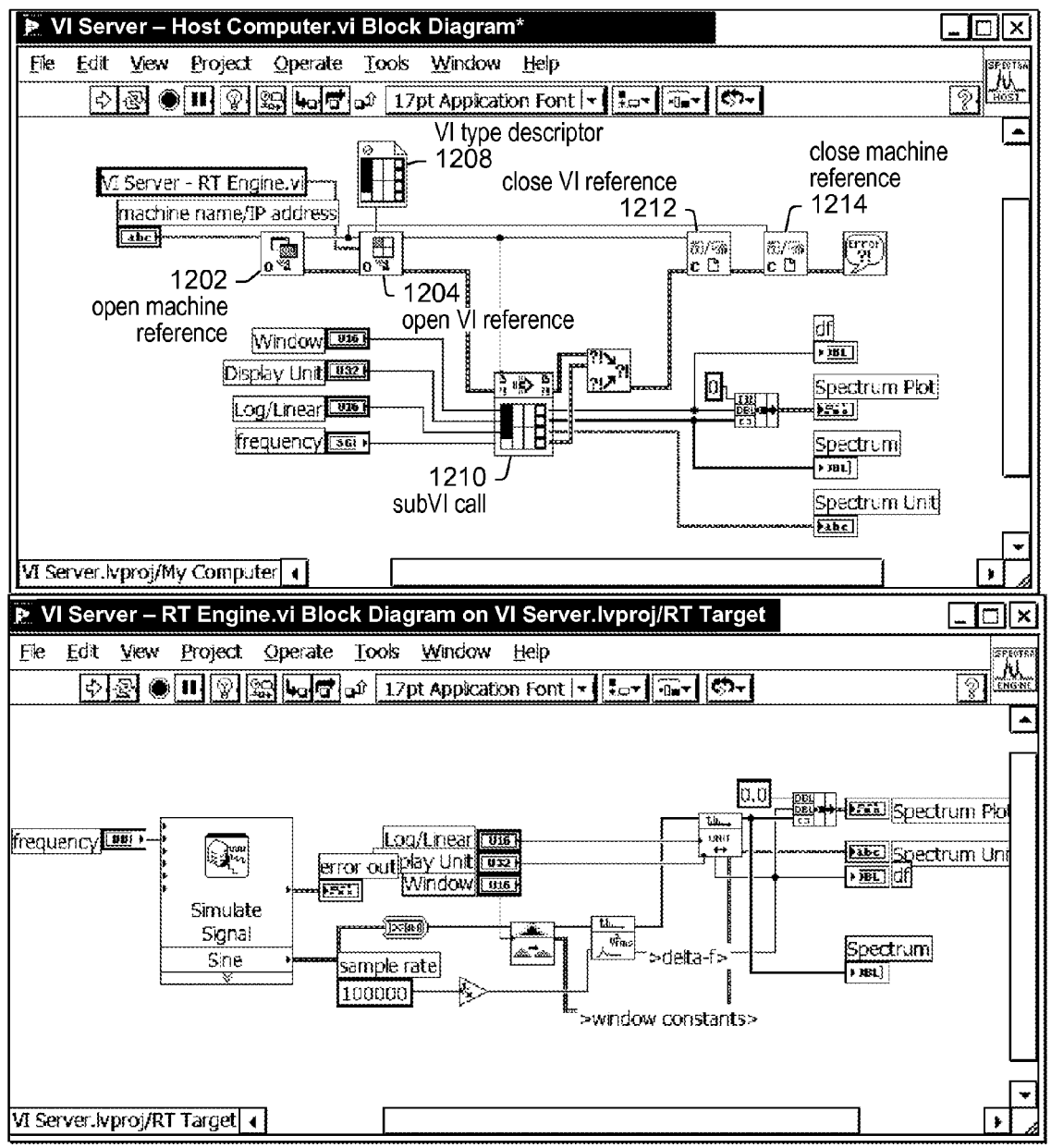
FIG. 12A illustrates an exemplary graphical program with distributed execution, according to the prior art.
Figure 12B:
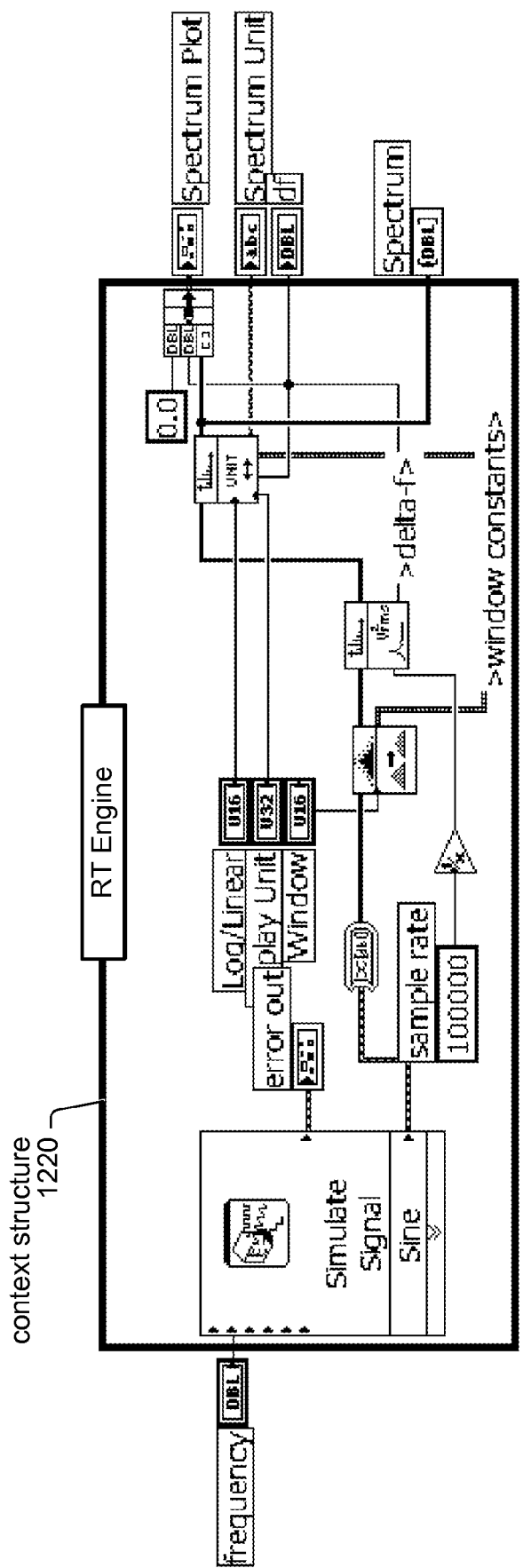
FIG. 12B illustrates an exemplary graphical program with distributed execution, according to one embodiment of the present invention.

FIGS. 12A and 12B—Comparison of Prior Art and an Embodiment of the Present Invention FIGS. 12A and 12B illustrate a comparison of a prior art approach to distributed execution of a graphical program and an embodiment of the present invention. More specifically, FIG. 12A illustrates two block diagrams (graphical programs or graphical program portions), where a first (top) block diagram calls a second graphical program via a subVI node, where the first block diagram executes in a first execution context targeted at a host computer, and the second (bottom) block diagram executes in a second execution context targeted at a real time (RT) engine that is separate and distinct from the host computer. The first (top) block diagram includes various graphical program nodes facilitating distributed or remote execution of the second (bottom) block diagram. For example, as may be seen, the first diagram includes an "open machine reference" node 1202 that may operate to open or establish a connection to the remote execution target or platform. This node 1202 is coupled to an "open VI reference" node 1204, operable to open or establish a connection to the second block diagram or graphical program (portion). As also shown, the block diagram includes a VI type descriptor node 1208 that may operate to identify or indicate the type of node whereby the second block diagram is invoked or called. Such a node that represents another graphical program or block diagram, and whereby the other block diagram may be called (for execution) may be referred to as a subVI node. As shown, such a node, specifically, subVI node 1210, is also included in the first block diagram. In symmetry with the preparatory nodes (for the remote execution of the second block diagram) described above, the first block diagram also includes a "close VI reference" node, which may operate to close or terminate the connection to the second block diagram, as well as a "close machine reference node" 1214, which may operate to close or terminate a connection to the (remote) execution target or platform. Note that these various nodes are all required (in this prior art approach) simply to call and execute the second block diagram on the designated target.

As may also be seen, the second (bottom) block diagram or graphical program (portion) includes various graphical program code (e.g., interconnected nodes) for generating a simulated signal and manipulating/analyzing the signal. Thus, the purpose of the first block diagram is simply to facilitate and invoke execution of the second block diagram on the specified target.

FIG. 12B illustrates a corresponding graphical program that performs similar functionality as those of FIG. 12A, but does so in accordance with one embodiment of the present invention. As may be seen, the block diagram of FIG. 12B is substantially the same as that of the second block diagram of FIG. 12A, but where the graphical program code is enclosed in a context structure 1220. Note that the various nodes and connections of the first block diagram of FIG. 12A have effectively been replaced with the context structure 1220, greatly simplifying the program. Note that in this embodiment, the name or designation of the (remote) execution target (RT Engine) is clearly labeled on the context structure, so that the user can clearly and easily see that the enclosed graphical code is specified or targeted for execution on the RT Engine.

Thus, various embodiments of the present invention may simplify both the graphical program code required, and the visual representation of the functionality of the graphical program, for distributed execution of graphical programs. For example, a graphical program that might normally have to be separated into various different block diagrams for respective execution on different execution targets may be presented as a single block diagram, where distributed execution of different portions of the graphical program may be simply and clearly designated and implemented by use of embodiments of the context structures disclosed herein.

It should be noted that while the above descriptions have been directed to distributed execution of a graphical program across two platforms or execution targets, the techniques described herein may be applied to an arbitrary number of execution targets. In other words, using embodiments of the techniques disclosed herein, execution of a graphical program may be distributed across any number of specified execution targets. Moreover, the execution distribution may be dynamic, where the execution assignments for various graphical code sections or portions may change during execution of the graphical program. For example, in a distributed computation system, the respective portions of the graphical program executing on each of a plurality of execution targets may change dynamically based on load balancing among the targets, i.e., based on the respective computational loads for each of the targets, where, for example, the computational loads may be adjusted to maximize, optimize, or stabilize overall efficiency or throughput.

Although the embodiments above have been described in considerable detail, numerous variations and modifications will become apparent to those skilled in the art once the above disclosure is fully appreciated. It is intended that the following claims be interpreted to embrace all such variations and modifications.

We claim:

1. A non-transitory computer accessible memory medium that stores program instructions executable by a processor to:

display a first icon on a display, wherein the first icon has an interior, wherein the first icon is associated with a first execution target, and wherein the first icon specifies execution of a graphical program portion positioned in the interior of the first icon on the first execution target;

display a first graphical program portion in the interior of the first icon, wherein the first graphical program portion comprises a plurality of interconnected nodes that visually indicate functionality of the first graphical program portion;

display a second icon on the display, wherein the second icon has an interior, wherein the second icon is associated with a second execution target, and wherein the second icon specifies execution of a graphical program portion positioned in the interior of the second icon on the second execution target; and display a second graphical program portion in the interior of the second icon, wherein the second graphical program portion comprises a plurality of interconnected nodes that visually indicate functionality of the second graphical program portion; and display one or more wires connecting the first graphical program portion and the second graphical program portion;

wherein during execution of the graphical program, the first graphical program portion executes on the first execution target, the second graphical program portion executes on the second execution target, and the first graphical program portion and the second graphical program portion communicate as specified by the one or more wires.

2. The non-transitory memory medium of claim 1, wherein said displaying the first graphical program portion in the interior of the first icon comprises:

displaying the first graphical program portion on the display; and drawing the first icon around the first graphical program portion.

3. The non-transitory memory medium of claim 1, wherein said displaying the first graphical program portion in the interior of the first icon comprises:

dragging and dropping the first graphical program portion onto the first icon.

4. The non-transitory memory medium of claim 1, wherein the program instructions are further executable to:

execute the graphical program, including executing the first graphical program portion on the first execution target, and executing the second graphical program portion on the second execution target.

5. The non-transitory memory medium of claim 1, wherein the one or more wires connecting the first graphical program portion and the second graphical program portion comprise one or more of:

a timing wire, operable to specify timing information between the first graphical program portion and the second graphical program portion;

a data transfer wire, operable to transmit data between the first graphical program portion and the second graphical program portion; or an event wire, operable to transmit event information between the first graphical program portion and the second graphical program portion.

6. The non-transitory memory medium of claim 5, wherein the timing information comprises one or more of:

a timing signal; or one or more data packets comprising the timing information.

7. The non-transitory memory medium of claim 5, wherein the data transfer wire comprises a configurable buffered wire.

8. The non-transitory memory medium of claim 7, wherein the configurable buffered wire is operable to implement or operate according to a specified protocol or specified semantics.

9. The non-transitory memory medium of claim 5, wherein each of the one or more wires has an appearance corresponding to the type of the wire.

10. The non-transitory memory medium of claim 1, wherein the one or more wires connecting the first graphical program portion and the second graphical program portion comprise one or more wires connecting at least one node in the first graphical program portion to at least one node in the second graphical program portion.

11. The non-transitory e memory medium of claim 1, wherein the program instructions are further executable to:
configure the first and/or second icon, including specifying the first and/or second execution target.

12. The non-transitory memory medium of claim 11, wherein the first and second icons each has a default configuration, wherein said configuring the first and/or second icon comprises overriding the default configuration.

13. The non-transitory memory medium of claim 11, wherein said configuring the first and/or second icon comprises one or more of:
specifying deployment time of the second graphical program portion;
specifying start time of the second graphical program portion; or
specifying stop time of the second graphical program portion.

14. The non-transitory memory medium of claim 13, wherein said configuring the first and/or second icon is performed based on program instructions associated with the first graphical program portion.

15. The non-transitory memory medium of claim 1, wherein the program instructions are executable to:
automatically detect physical resources coupled to the memory medium; and
display icons representing the physical resources; and
receive input selecting an icon from the icons representing the physical resources;
wherein said displaying the first icon is performed based on said receiving input selecting the icon from the icons representing the physical resources.

16. The non-transitory memory medium of claim 1, wherein at least one of the first and second graphical program portions operates in accordance with data flow semantics.

17. The non-transitory memory medium of claim 16, wherein the first and second graphical program portions are connected by at least one non-data flow wire, and wherein data flow semantics do not apply to the conjunctive execution of the first and second graphical program portions.

18. The non-transitory memory medium of claim 1, wherein each of the first and second icons is associated with a respective execution context, wherein the respective execution context comprises one or more data structures used to run an execution system, and wherein the respective execution context specifies the associated execution target.

19. A method, comprising:
displaying a first icon on a display, wherein the first icon has an interior, wherein the first icon is associated with a first execution target, and wherein the first icon specifies execution of a graphical program portion positioned in the interior of the first icon on the first execution target;
displaying a first graphical program portion in the interior of the first icon, wherein the first graphical program portion comprises a plurality of interconnected nodes that visually indicate functionality of the first graphical program portion;
displaying a second icon on the display, wherein the second icon has an interior, wherein the second icon is associated with a second execution target, and wherein the second icon specifies execution of a graphical program portion positioned in the interior of the second icon on the second execution target; and
displaying a second graphical program portion in the interior of the second icon, wherein the second graphical program portion comprises a plurality of interconnected nodes that visually indicate functionality of the second graphical program portion; and
displaying one or more wires connecting the first graphical program portion and the second graphical program portion;
wherein during execution of the graphical program, the first graphical program portion executes on the first execution target, the second graphical program portion executes on the second execution target, and the first graphical program portion and the second graphical program portion communicate as specified by the one or more wires.

* * * * *